US011775990B2

(12) United States Patent
Mitchell et al.

(10) Patent No.: US 11,775,990 B2
(45) Date of Patent: *Oct. 3, 2023

(54) INTEGRATED WEATHER GRAPHICAL USER INTERFACE

(71) Applicant: Intercontinental Exchange Holdings, Inc., Atlanta, GA (US)

(72) Inventors: Stephen John Mitchell, Houston, TX (US); Andrew Castellani McSween, Chicago, IL (US); Marc Batten, San Jose, CA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,715

(22) Filed: Sep. 13, 2022

(65) Prior Publication Data
US 2023/0139462 A1 May 4, 2023

Related U.S. Application Data

(63) Continuation of application No. 17/696,323, filed on Mar. 16, 2022, now Pat. No. 11,521,219, which is a
(Continued)

(51) Int. Cl.
*G06Q 30/0201* (2023.01)
*G01W 1/00* (2006.01)
*G06F 3/0482* (2013.01)

(52) U.S. Cl.
CPC ......... *G06Q 30/0201* (2013.01); *G01W 1/00* (2013.01); *G06F 3/0482* (2013.01)

(58) Field of Classification Search
CPC .... G06Q 30/0201; G01W 1/00; G06F 3/0482
See application file for complete search history.

(56) References Cited

U.S. PATENT DOCUMENTS

| 11,170,390 B2 | 11/2021 | Mitchell et al. |
| 11,308,507 B2 | 4/2022 | Mitchell et al. |

(Continued)

FOREIGN PATENT DOCUMENTS

| WO | 2009/158445 A2 | 12/2009 |
| WO | 2018/005363 A1 | 1/2018 |

OTHER PUBLICATIONS

Shah et al., "Towards Development of Spark Based Agricultural Information System Including Geo-Spatial Data," 2017 IEEE International Conference on Big Data (BIGDATA), 2017, pp. 3476-3481.
(Continued)

*Primary Examiner* — Toan M Le
(74) *Attorney, Agent, or Firm* — DLA Piper LLP (US)

(57) ABSTRACT

Data integration and distribution systems. A system includes a graphical user interface (GUI). Weather and market data are collected. A weather symbology including symbol elements linked to segments of the collected weather data and rules for generating weather symbology instructions are stored. The GUI is generated for display on a user device. A weather symbology instruction is determined based on at least one requested symbol element indicated in a weather data request and the rules. A weather forecast dataset is created from among the collected weather data based on the weather symbology instruction. A presentation package comprising the weather forecast dataset and the collected market data is generated such that the weather forecast dataset is integrated with the collected market data. The presentation package is presented on the GUI and updated concurrent with changes at least one of the weather data, the market data and user input.

24 Claims, 36 Drawing Sheets

Related U.S. Application Data continuation of application No. 17/490,015, filed on Sep. 30, 2021, now Pat. No. 11,308,507, which is a continuation of application No. 17/186,122, filed on Feb. 26, 2021, now Pat. No. 11,170,390.

(60) Provisional application No. 62/982,235, filed on Feb. 27, 2020.

(56) References Cited

U.S. PATENT DOCUMENTS

| | | |
|---|---|---|
| 11,521,219 B2 * | 12/2022 | Mitchell ............ G06Q 30/0201 |
| 2007/0038362 A1 | 2/2007 | Gueziec |
| 2007/0282560 A1 | 12/2007 | Anderson |
| 2010/0042527 A1 | 2/2010 | Mitchell et al. |
| 2012/0147030 A1 | 6/2012 | Hankers et al. |
| 2012/0258697 A1 | 10/2012 | Fitzpatrick et al. |
| 2013/0297531 A1 | 11/2013 | Becker et al. |
| 2019/0372345 A1 | 12/2019 | Bain et al. |
| 2023/0139462 A1 | 5/2023 | Mitchell et al. |

OTHER PUBLICATIONS

IEEE Xplore Search Results, Jul. 14, 2021, 1 page.
Google Search Results, Jul. 14, 2021, 1 page.
Extended European Search Report dated Jan. 4, 2022, of counterpart European Application No. 21716256.9.
International Preliminary Report on Patentability and Written Opinion dated Sep. 9, 2022, of corresponding International Application No. PCT/US2021/019929.
International Search Report and the Written Opinion of the International Searching Authority dated May 6, 2021, of corresponding International Application No. PCT/US2021/019929.
Kezunovic et al., "Predicting Spatiotemporal Impacts of Weather on Power Systems Using Big Data Science," Springer International Publishing, 2017, https://www.dabi.temple.edu/external.zoran/papers/jelenabook2017.pdf, retrieved Apr. 26, 2021.
Singapore Official Action dated Sep. 19, 2022, of counterpart Singapore Application No. 112021035785.

* cited by examiner

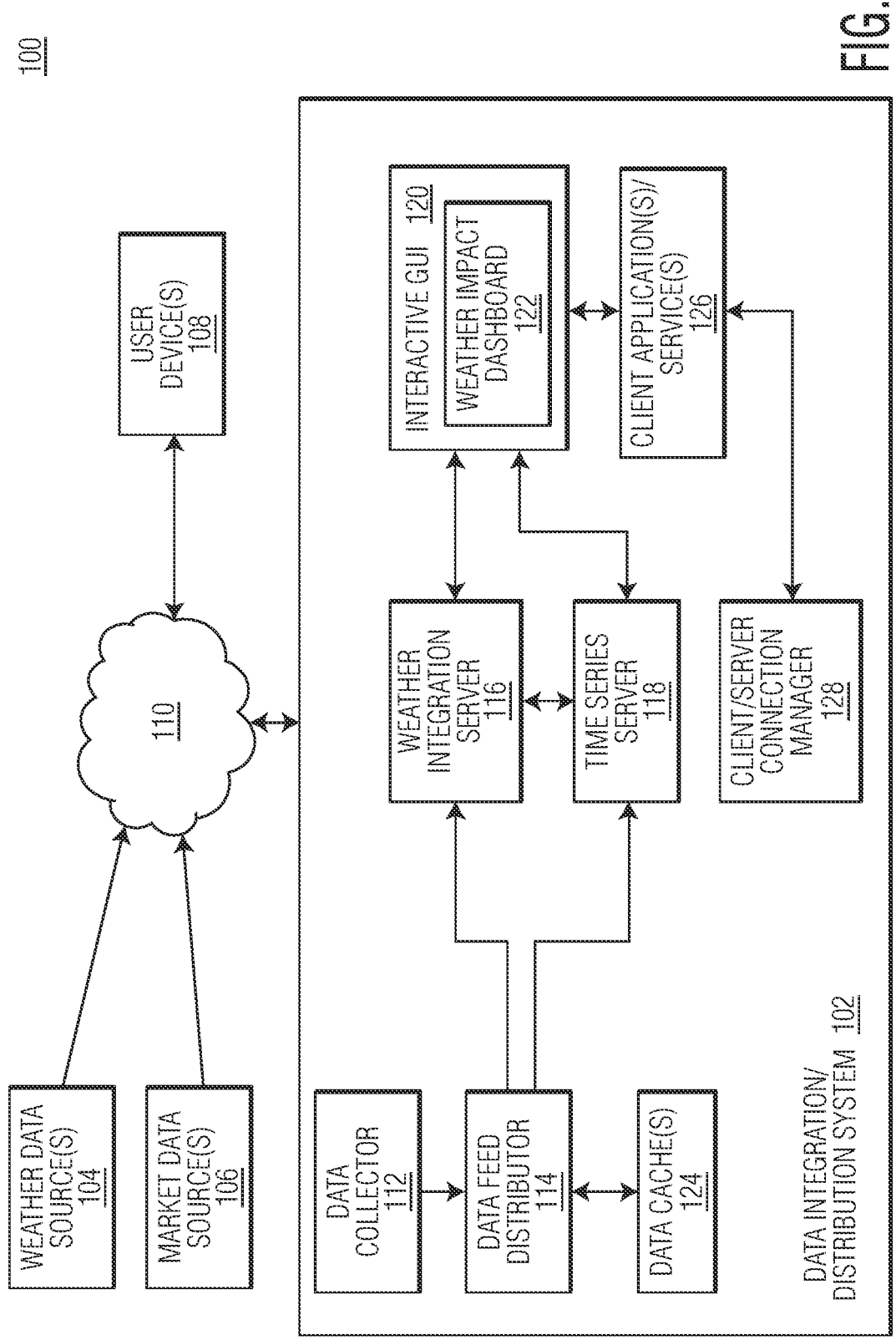

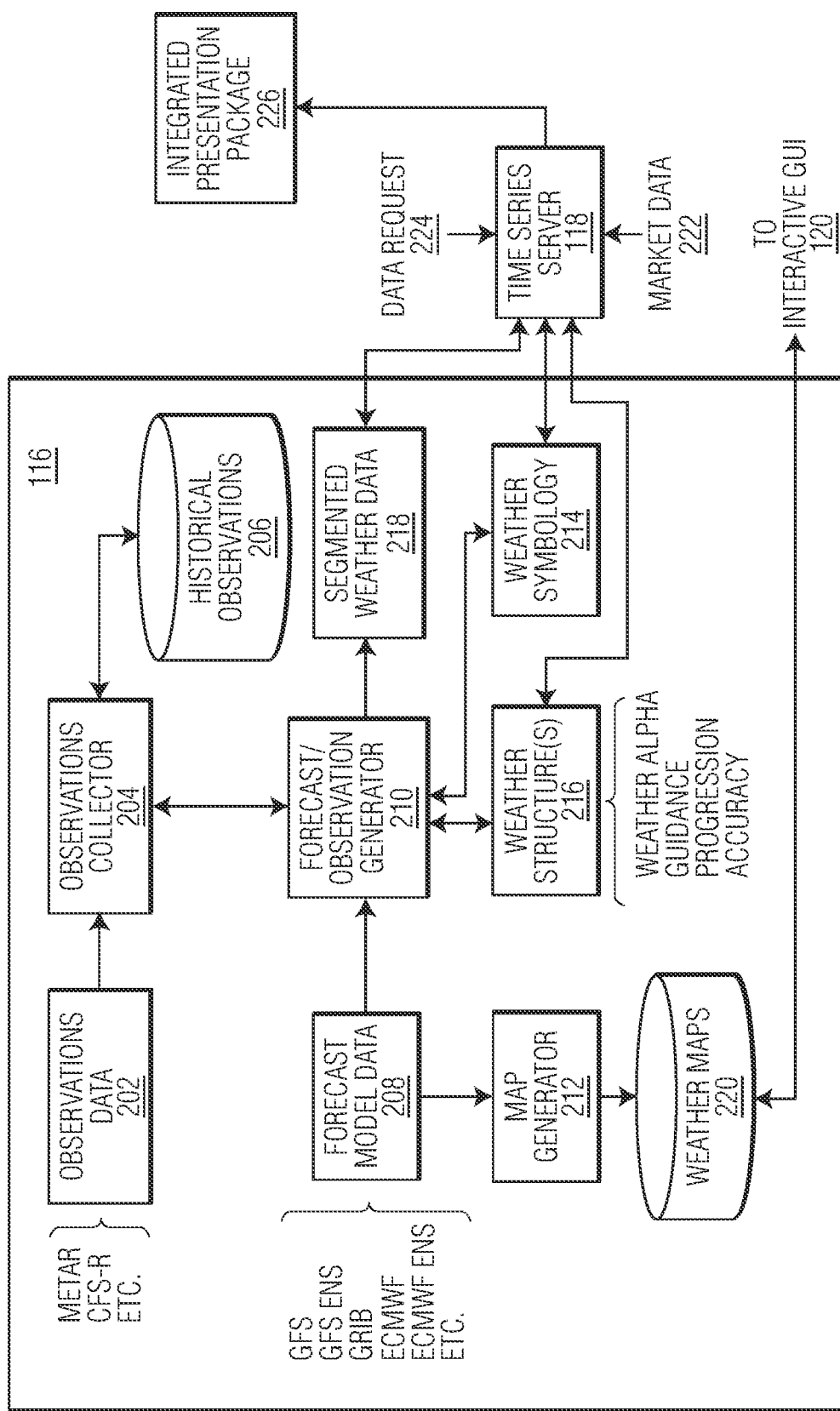

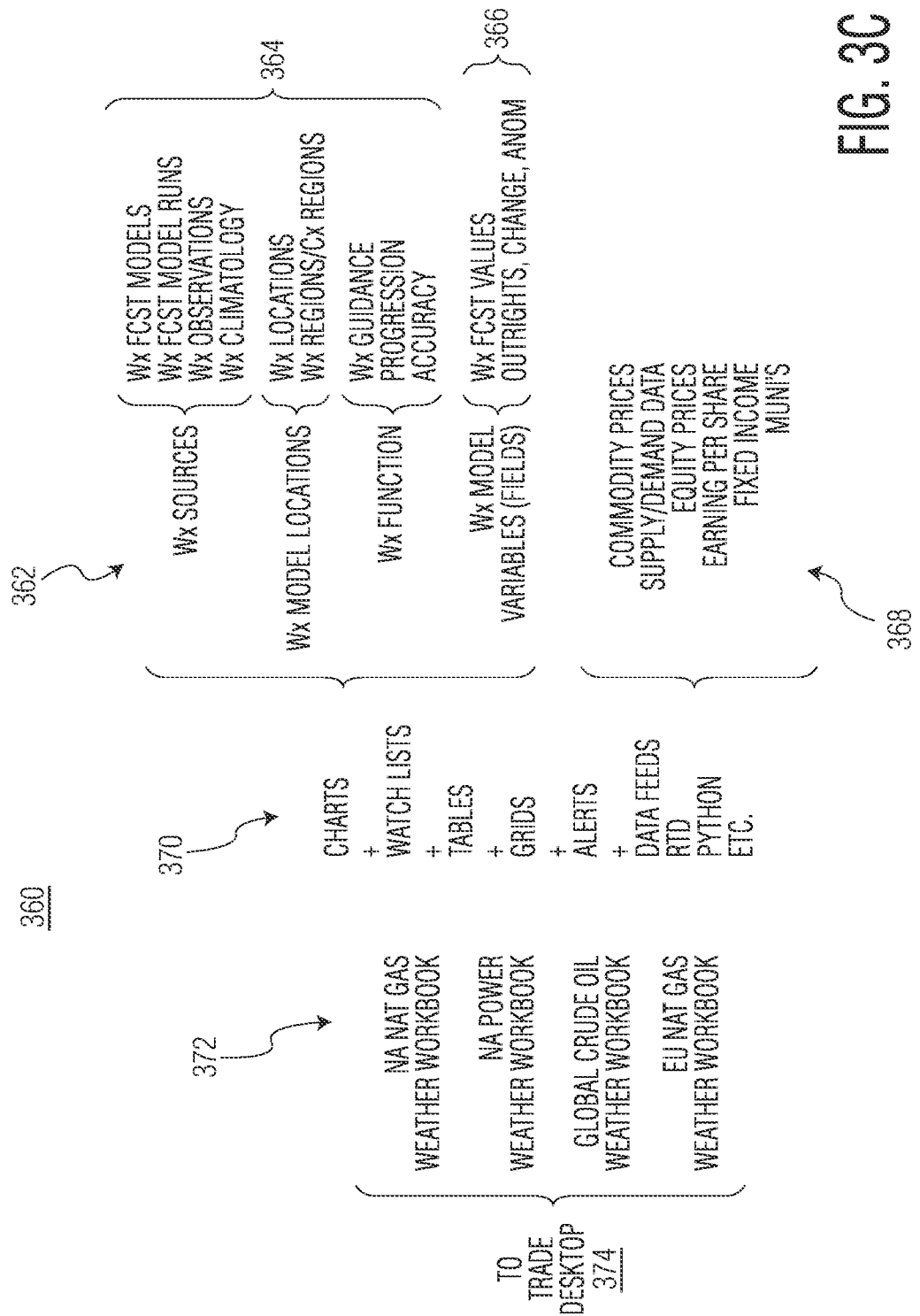

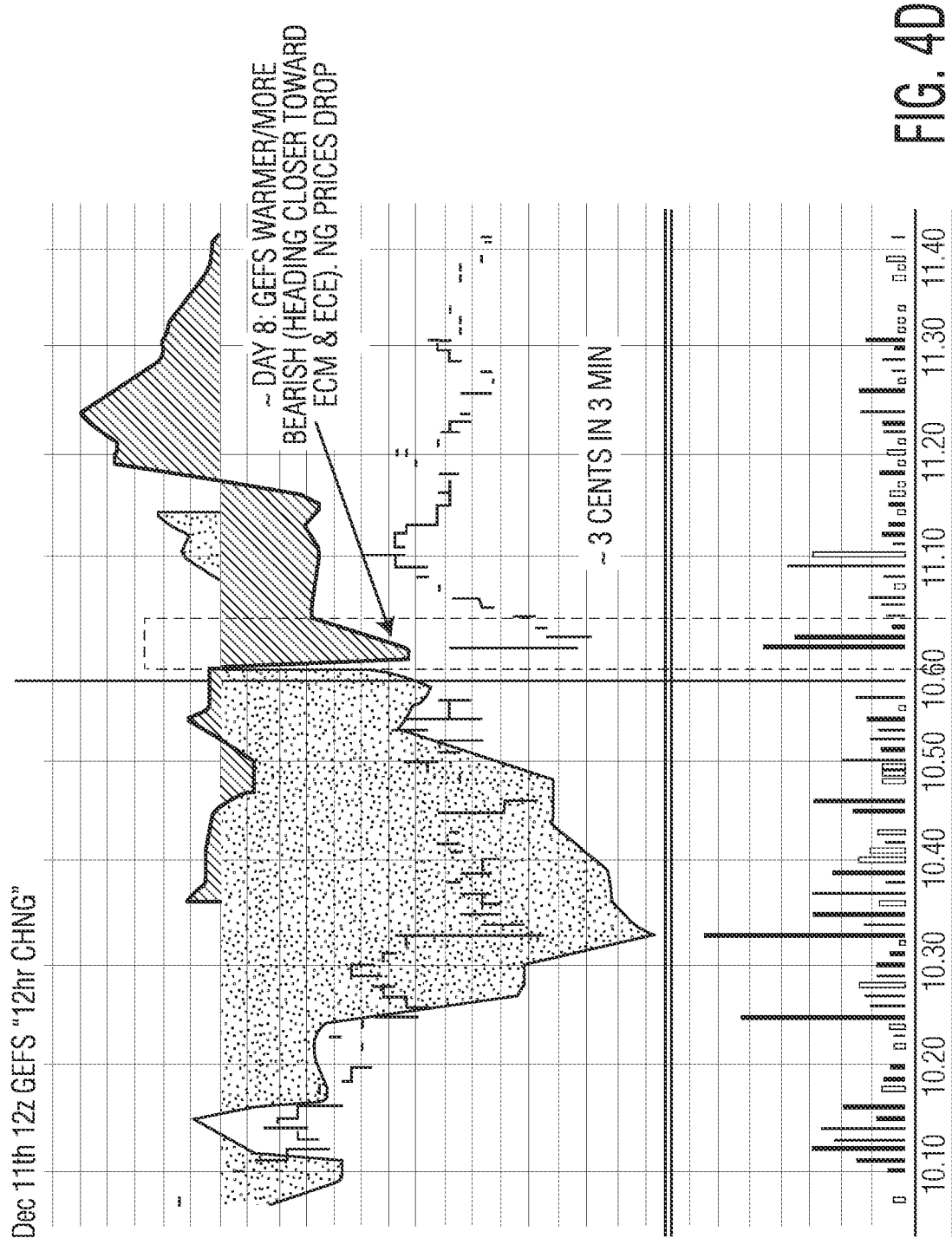

| Model Name | select multiple | | | | | | | | | | | | | | | |
|---|---|---|---|---|---|---|---|---|---|---|---|---|---|---|---|---|
| Model Runs | select multiple | | | | | | | | | | | | | | | |
| FV Date/day | Calendar | | | | | | | | | | | | | | | |
| Fcst Variable | MaxT, MinT, AvgT, GWDD | | | | | | | | | | | | | | | |
| Study time | 14 days, 7 days, 5 days | | | | | | | | | | | | | | | |

| BIAS | | | | | | | | | | | | | | | | |
|---|---|---|---|---|---|---|---|---|---|---|---|---|---|---|---|---|
| Models | 14 days | | | | | | | | | | | | | | | |
| | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| RMSE | | | | | | | | | | | | | | | | |
|---|---|---|---|---|---|---|---|---|---|---|---|---|---|---|---|---|
| Models | 14 days | | | | | | | | | | | | | | | |
| | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| ERROR | | | | | | | | | | | | | | | | |
|---|---|---|---|---|---|---|---|---|---|---|---|---|---|---|---|---|
| Models | 14 days | | | | | | | | | | | | | | | |
| | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| STD OF ERROR | 14 days | | | | | | | | | | | | | | | |
|---|---|---|---|---|---|---|---|---|---|---|---|---|---|---|---|---|
| Models | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

FIG. 7A

| Date | FDD | 2/20/20 | 2/19/20 | 2/18/20 | 2/17/20 | 2/16/20 | 2/15/20 | 2/14/20 | 2/13/20 | 2/12/20 | 2/11/20 | 2/10/20 | 2/9/20 | 2/8/20 | 2/7/20 | 2/6/20 | 2/5/20 | 2/4/20 |
|---|---|---|---|---|---|---|---|---|---|---|---|---|---|---|---|---|---|---|
| GWESC-METR.GWDD | METAR | | | | | | | | | | | | | | | 25.4659 | 20.6791 | 10.3266 |
| GWESC.FCD1_12Z-GEFS.GWDD | 1 | | | | | | | | | | | | | | 26.2 | 34.485 | 25.768 | 12.411 |
| GWESC.FCD2_12Z-GEFS.GWDD | 2 | | | | | | | | | | | | | 21.374 | 27.615 | 32.101 | 23.061 | 12.22 |
| GWESC.FCD3_12Z-GEFS.GWDD | 3 | | | | | | | | | | | | 12.442 | 22.729 | 27.582 | 31.963 | 24.896 | 13.528 |
| GWESC.FCD4_12Z-GEFS.GWDD | 4 | | | | | | | | | | | 15.386 | 13.084 | 22.742 | 27.052 | 33.589 | 24.647 | 13.747 |
| GWESC.FCD5_12Z-GEFS.GWDD | 5 | | | | | | | | | | 21.943 | 17.286 | 14.756 | 24.163 | 26.378 | 32.353 | 26.37 | 12.369 |
| GWESC.FCD6_12Z-GEFS.GWDD | 6 | | | | | | | | | 24.254 | 21.893 | 15.858 | 18.506 | 24.807 | 29.189 | 34.845 | 21.146 | 15.091 |
| GWESC.FCD7_12Z-GEFS.GWDD | 7 | | | | | | | | 23.06 | 18.299 | 16.053 | 14.101 | 20.382 | 23.933 | 30.006 | 24.951 | 25.557 | 16.985 |
| GWESC.FCD8_12Z-GEFS.GWDD | 8 | | | | | | | 27.955 | 19.455 | 12.05 | 12.997 | 14.662 | 17.667 | 22.331 | 25.432 | 26.349 | 27.948 | 17.449 |
| GWESC.FCD9_12Z-GEFS.GWDD | 9 | | | | | | 26.168 | 29.386 | 12.041 | 16.348 | 13.833 | 14.516 | 18.08 | 21.994 | 26.572 | 27.555 | 26.71 | 21.061 |
| GWESC.FCD10_12Z-GEFS.GWDD | 10 | | | | | 19.373 | 32.39 | 15.352 | 21.411 | 13.655 | 16.63 | 14.146 | 18.221 | 23.304 | 24.01 | 26.828 | 28.591 | 23.003 |
| GWESC.FCD11_12Z-GEFS.GWDD | 11 | | | | 16.257 | 27.866 | 17.228 | 20.056 | 16.04 | 19.377 | 14.299 | 15.814 | 21.911 | 22.311 | 23.642 | 27.907 | 31.389 | 21.968 |
| GWESC.FCD12_12Z-GEFS.GWDD | 12 | | | 18.362 | 24.736 | 18.718 | 15.069 | 15.232 | 21.119 | 15.862 | 18.667 | 22.231 | 25.274 | 22.786 | 26.01 | 31.515 | 30.09 | 22.735 |
| GWESC.FCD13_12Z-GEFS.GWDD | 13 | | 21.483 | 23.276 | 19.803 | 15.395 | 14.592 | 18.986 | 15.212 | 22.414 | 24.099 | 29.52 | 23.54 | 24.084 | 27.411 | 30.884 | 30.73 | 24.514 |
| GWESC.FCD14_12Z-GEFS.GWDD | 14 | 23.068 | 25.71 | 19.322 | 17.766 | 13.71 | 18.616 | 19.457 | 25.004 | 28.653 | 31.959 | 21.931 | 23.073 | 24.318 | 26.761 | 29.739 | 27.931 | 21.058 |

| SYMBOL VALUE MARKER: | ARROW ▼ | MARKER LOCATION: | CHART EDGE ▼ |
| STUDY VALUE MARKER: | ARROW ▼ | MARKER LOCATION: | PRICE SCALE ▼ |

ADD CONDITION ALERTS ✕

EXPRESSION: [                    ]
COMMENT:    [                    ]

[ OK ]  [ CANCEL ]

FIG. 9F

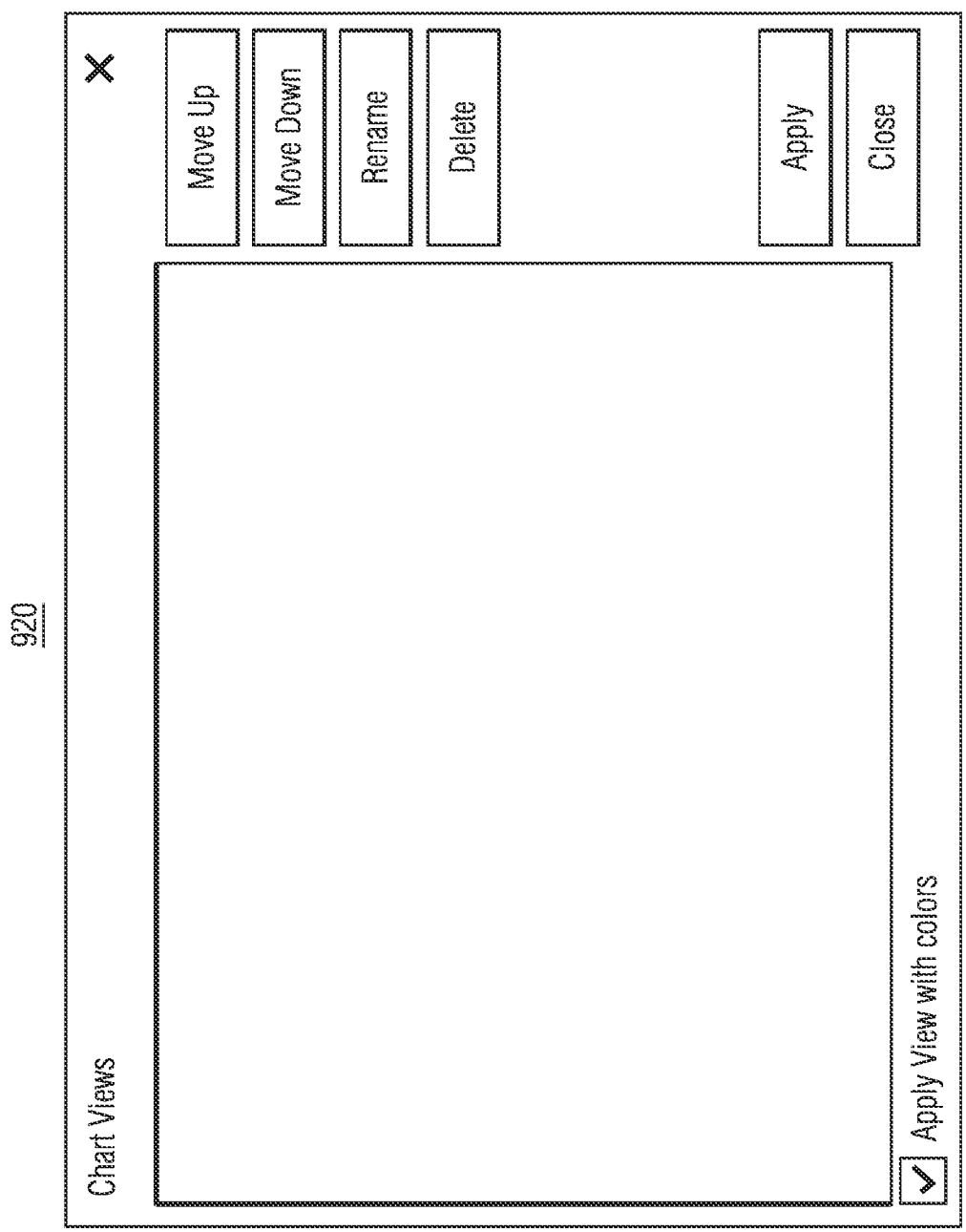

922

| Model Hr | Model Day | GFS 12z % Comp | Average UTC Time | Local Time |
|---|---|---|---|---|
| 0 | 0 |  | 15:23:41 | 9:23 AM |
| 3 | 0 |  | 15:26:31 | 6:02 AM |
| 6 | 0 |  | 15:28:47 | 6:05 AM |
| 9 | 0 | 62.50% | 15:30:54 | 6:07 AM |
| 12 | 0 | 75% | 15:33:12 | 6:09 AM |
| 15 | 0 | 87.50% | 15:34:06 | 6:10 AM |
| 18 | 0 | 100% | 15:35:06 | 6:11 AM |
| 21 | 1 |  | 15:35:55 | 6:12 AM |
| 14 | 1 |  | 15:36:55 | 6:13 AM |
| 27 | 1 |  | 15:37:47 | 6:14 AM |
| 30 | 1 | 62.50% | 15:38:35 | 6:14 AM |
| 33 | 1 | 75% | 15:39:36 | 6:15 AM |
| 36 | 1 | 87.50% | 15:40:28 | 6:16 AM |
| 39 | 1 | 100% | 15:41:19 | 6:17 AM |
| 42 | 2 |  | 15:42:13 | 6:18 AM |
| 45 | 2 |  | 15:43:09 | 6:19 AM |
| 48 | 2 |  | 15:44:02 | 6:20 AM |
| 51 | 2 |  | 15:44:58 | 6:21 AM |
| 54 | 2 | 62.50% | 15:45:57 | 6:22 AM |
| 57 | 2 | 75% | 15:46:51 | 6:23 AM |
| 60 | 2 | 87.50% | 15:47:44 | 6:24 AM |
| 63 | 2 | 100% | 15:48:40 | 6:24 AM |
| 66 | 3 |  | 15:49:33 | 6:25 AM |
| 69 | 3 |  | 15:50:29 | 6:26 AM |
| 72 | 3 |  | 15:51:26 | 6:27 AM |
| 75 | 3 |  | 15:52:20 | 6:28 AM |
| 78 | 3 | 62.50% | 15:53:19 | 6:29 AM |
| 81 | 3 | 75% | 15:54:14 | 6:30 AM |
| 84 | 3 | 87.50% | 15:55:04 | 6:31 AM |
| 87 | 3 | 100% | 15:56:00 | 6:32 AM |
| 90 | 4 |  | 15:56:47 | 6:33 AM |
| 93 | 4 |  | 15:57:47 | 6:34 AM |
| 96 | 4 |  | 15:58:41 | 6:35 AM |
| 99 | 4 |  | 15:59:42 | 6:36 AM |
| 102 | 4 | 62.50% | 16:00:36 | 6:36 AM |
| 105 | 4 | 75% | 16:01:26 | 6:37 AM |
| 108 | 4 | 87.50% | 16:02:17 | 6:38 AM |
| 111 | 4 | 100% | 16:03:16 | 6:39 AM |
| 114 | 5 |  | 16:04:21 | 6:40 AM |
| 117 | 5 |  | 16:05:11 | 6:41 AM |
| 120 | 5 |  | 16:06:05 | 6:42 AM |
| 123 | 5 |  | 16:07:10 | 6:43 AM |
| 126 | 5 | 62.50% | 16:08:02 | 6:44 AM |
| 129 | 5 | 75% | 16:08:53 | 6:45 AM |
| 132 | 5 | 87.50% | 16:09:52 | 6:46 AM |
| 135 | 5 | 100% | 16:10:26 | 6:46 AM |

FIG. 9H

| Weather Model Status | | | | | | | | | | Real-time status ▼ | GFS 12Z | GFS Ens. 12Z | ECMWF 12Z | ECMWF Ens. 6Z | Time Step: 1 hr | 3 hr | 6 hr | Zulu Offset: 0 ▼ | | |
|---|---|---|---|---|---|---|---|---|---|---|---|---|---|---|---|---|---|---|---|---|
| Model Day | % Complete | | | | | | | | | Date | Day of Week | 3am | 6am | 9am | 12pm | 3pm | 6pm | 9pm | 12am |
| 1 | 100 | | | | | | | | | 11/27/20 | Fri | 15 | 18 | 21 | 0 | 3 | 6 | 9 | 12 |
| 2 | 100 | | | | | | | | | 11/28/20 | Sat | 39 | 42 | 45 | 24 | 27 | 30 | 33 | 36 |
| 3 | 100 | | | | | | | | | 11/29/20 | Sun | 63 | 66 | 69 | 48 | 51 | 54 | 57 | 60 |
| 4 | 100 | | | | | | | | | 11/30/20 | Mon | 87 | 90 | 93 | 72 | 75 | 78 | 81 | 84 |
| 5 | 100 | | | | | | | | | 12/1/20 | Tue | 111 | 114 | 117 | 96 | 99 | 102 | 105 | 108 |
| 6 | 100 | | | | | | | | | 12/2/20 | Wed | | | | 120 | 123 | 126 | 129 | 132 |

Green = model hour is complete  Yellow = model hour late more than 1 standard deviation  Red = model hour is missing

FIG. 10D

| Regional GWDD | NG Futures Contracts | + | | | |
|---|---|---|---|---|---|

Symbol List ▼ | Custom ▼ | Watch List ▼

| Symbol | Description | 2... | H... | C... | 1... |
|---|---|---|---|---|---|
| Gas Weighted L-48 – CONUS | | | | | |
| ▼ Gas Weighted L-48 – CONUS | | | | | |
| "GWUS" is the code for the lower 48- (a summary of 100 cities) each weig... | | | | | |
| estimated impact on US natural gas consumption | | | | | |
| HDDs + CDDs with adjustments to the traditional degree day formula to... | | | | | |
| GWUS MR0!-GFS | GWUS CONUS – GFS all runs | | | | |
| GWUS METR | GWUS CONUS – METAR Observation | | | | |
| Gas Weighted State | | | | | |
| ▶ Gas Weighted State [98] | | | | | |
| Gas Weighted Electricity Region | | | | | |
| ▶ Gas Weighted Electricity Region [28] | | | | | |
| Gas Weighted Census Region | | | | | |
| ▶ Gas Weighted Census Region [18] | | | | | |
| Gas Weighted EIA Storage Region | | | | | |
| ▶ Gas Weighted EIA Storage Region [12] | | | | | |
| Gas Weighted EIA Storage Sub Region | | | | | |
| ▶ Gas Weighted EIA Storage Sub Region [22] | | | | | |
| ▶ Vote to alter list [2] | | | | | |

1010

Select Natural Gas Contract | +

| GWUS-METR | HNG 1!-IUS ▼ | <-- Select NG Contra |
|---|---|---|
| | 12Z ▼ | |
| | GFS ▼ | |
| | MR4! ▼ | |

Weather Alert ✕

┌─ Alert Condition ──────────────────────────────────────────── 1018
│ Alert Name  │ KORD 4 and 6 Magic │
│ Location(s) │ [KORD ✕] ▼ │
│ Forecast Parameters (Hover over digit field for UoM) │
│ 1020 ↗ │
│ [2M Daily Avg Temp 12 Hr Change ✕] ▼ │ Greater Than ▼ │ 4.0  │ Or  ▼ 🗑 │
│ [2M Daily Avg Temp 12 Hr Change ✕] ▼ │ Less Than    ▼ │ -4.0 │ And ▼ 🗑 │
│ [2M Daily Avg Temp official 30yr Anomaly ✕] ▼ │ Greater Than ▼ │ 6.0 │ Or ▼ 🗑 │
│ [2M Daily Avg Temp official 30yr Anomaly ✕] ▼ │ Less Than    ▼ │ -6.0 │ Or ▼ 🗑 │
│ Add Parameter                              Threshold Helper │
│ Note      │ KORD 4 CHNG + 6 ANOM │
│ Commodity │ HNG 1!-IUS ▼ │
│ Action    │ Bearish    ▼ │

┌─ Model Settings ─────────────────────────────────────────────
│ Models              0z  6z  12z  18z
│ 1022 ↗
│          ECMWF      ☐   ☐   ☑   ☐
│          ECMWF ENS Mean  ☐   ☐   ☑   ☐
│          GFS        ☐   ☐   ☑   ☐
│          GFS ENS Mean    ☐   ☐   ☑   ☐
│
│ Forecast Periods   ○ Days 1-5    ○ Days 6-10   ○ Days 1-17
│                    ○ Next day    ○ Days 1-17   ○ Forecast day [   ] To [   ]
│
│ Forecast When   │ Greater Than ▼ │ 75.0 │ % Complete ┌─ Notification ─────────────────────────────────────────────── 1024
│ Day of use   ☑ Monday   ☑ Tuesday   ☑ Wednesday   ☑ Thursday
│              ☑ Friday   ☐ Saturday  ☐ Friday To change UoM Tools -> Preferences -> Currency and Unit    [ OK ]  [ Cancel ]

FIG. 10G

Add Weather... ✕ — 1026

Type — 1028
[ Guidance ] [ Accumulation ] [ Progression ] [ Alpha Micro ] [ Alpha Macro ]

Location(s)
[ KORD ✕                                            ▼ ] — 1030
☐ Plot Average of Selected Locations

Time Interval
[ Hourly ] [ Daily ] — 1032

Parameter(s)
[ 2M Hourly Temp ✕                                  ▼ ]

Interpolation: [ Interpolated Data ▼ ]
Preliminary Daily Values: [                    ▼ ]

Model(s) — 1034

| GFS Op. 25 Deg | GFS ENS Mean | GFS ENS Summary Stats | GFS ENS Percentile Rank |
| ECMWF | ECMWF ENS Mean | ECMWF ENS Summary Stats | ECMWF ENS Percentile Rank |

The ECM, ECE & ECEX data is based on data and products of the European Center for Medium-Range Weather Forecast (ECMWF)

Run(s)
[ Current ] [ 0z ] [ 6z ] [ 12z ] [ 18z ]
[ Curr - 6hr ] [ Curr - 12hr ] [ Curr - 18hr ] [ Curr - 24hr ]

Climatology
[ + 10yr ] [ + 15yr ] [ + 30yr ] [ Official 30yr ]   ☐ Add Summary statistics

Observations
[                                                    ▼ ]

☑ Observations Real-time (METAR) — 1036
☐ Summary statistics (Convert data to OHLC)
Wayback (Forecast as of): [ Wayback         ]

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ▼ ] [ Apply ▼ ] [ Close ]

Add Weather...  ✕

Type
| Guidance | Accumulation | Progression | Alpha Micro | Alpha Macro |

Location(s)
[ GWUS ✕ ]  ▼

Parameter(s)
[ GWDD ✕ ]  ▼

Model(s)
| GFS Op. 25 Deg | GFS ENS Mean | ECMWF | ECMWF ENS Mean |

The ECM, ECE & ECEX data is based on data and products of the European Center for Medium-Range Weather Forecast (ECMWF)

Run(s)
| Current | 0z | 6z | 12z | 18z |
| Curr - 6hr | Curr - 12hr | Curr - 18hr | Curr - 24hr |

Climatology
| +10yr | +15yr | +30yr | Official 30yr |

Observations
[                                                    ] ▼

Wayback (Forecast as of): [ Wayback ]  ☐
Period: [ 10/01/2020 ] ☐ — [ 10/31/2021 ] ☐

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ▼ ]  [ Apply ▼ ]  [ Close ]

| Add Weather... | ✕ |

Type
| Guidance | Accumulation | Progression | Alpha Micro | Alpha Macro |

Location(s)
[ GWUS ✕ ]

☐ Plot Average of Selected Locations

Parameter(s)
[ GWDD ✕ ]

Target Date: [ -1 day ▼ ] ☐

Model(s)

| GFS Op. 25 Deg | GFS ENS Mean | GFS ENS Summary Stats | GFS ENS Percentile Rank |
| ECMWF | ECMWF ENS Mean | ECMWF ENS Summary Stats | ECMWF ENS Percentile Rank |

The ECM, ECE & ECEX data is based on data and products of the European Center for Medium-Range Weather Forecast (ECMWF)

Run(s)
| Current | 0z | 6z | 12z | 18z |

☑ Observations Real-time (METAR)

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ▼ ] [ Apply ▼ ] [ Close ]

| Add Weather... | ✕ |

Type
[ Guidance ] [ Accumulation ] [ Progression ] [ Alpha Micro ] [ Alpha Macro ]

Location(s)
[ GWUS ✕ ] ▼

Parameter(s)
[ GWDD 12 Hr Change ✕ ] [ GWDD official 30yr Anomaly ✕ ] [ GWDD ✕ ] [ 2M Hourly Temp ✕ ] ▼

Interpolation: [ Interpolated Data ▼ ]

Preliminary Daily Values: [ ▼ ]

Model(s)
[ GFS Op. 25 Deg ] [ GFS ENS Mean ] [ ECMWF ] [ ECMWF ENS Mean ]

The ECM, ECE & ECEX data is based on data and products of the European Center for Medium-Range Weather Forecast (ECMWF)

Run(s)
[ Current ] [ 0z ] [ 6z ] [ 12z ] [ 18z ]
[ Curr - 6hr ] [ Curr - 12hr ] [ Curr - 18hr ] [ Curr - 24hr ]

Wayback (Forecast as of): [ Wayback ] ☐
Commodity: [ HNG 1!-IUS ▼ ] 🔍

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ] [ Apply ] [ Close ]

FIG. 10K

INTEGRATED WEATHER GRAPHICAL USER INTERFACE

TECHNICAL FIELD

The present disclosure generally relates to improving data structure distribution and, in particular to distribution systems, interactive graphical user interfaces (GUIs) and methods for the integration of disparate data structures for interaction, including real-time integration of weather and market data structures.

BACKGROUND

Problems exist in the field of digital distribution platforms. In general, a digital distribution platform may manage digital data content (e.g., digital goods, digital information, etc.) and distribute the content to various end-users. Conventional platforms may distribute digital data content from one or more data sources (e.g., data feeds, data files, user input and the like) that may be distributed across one or more networks, may include different data types, different data formats, different data communication requirements, different network security, different availability time periods and the like. Moreover, distribution platform may distribute data content in one or more distribution formats (e.g., in a data file, on a user interface, in a spreadsheet and the like), to particular end-users with varying amounts of data and/or personalized data and the like. Conventional platforms also exist that may provide the ability for user-interaction with the distributed data (e.g., data analysis tools, actions that may be performed with the data and the like) in addition to the presentation of distributed digital data content.

All of the above variables associated with data distribution make it technically difficult to manage data distribution and interaction for real-time distribution. Yet further, distribution of digital data content in real-time becomes increasingly difficult as the volume of digital data content to be distributed increases and/or as the digital data content changes more rapidly over time (e.g., with increasing volatility of the data content). For example, it may become increasingly technically difficult for a distribution platform to continually update an interactive user interface with the most up-to-date data content, when the data volume increases and/or the data content itself changes rapidly. In such instances, any transmission delays over one or more networks to obtain the data content coupled with any data handling delays by the distribution platform for handling the received data content (e.g., to convert a data format of received data content, to normalize any data content, to remove any data content not suitable for presentation, to generate data for distribution in one or more distribution formats, create aggregated output data, generate any user interfaces and the like) may introduce significant errors in distributed data and the ability by the end-user to interact with the distributed content. For example, the distributed data content may not provide the most up-to-date information, leading to a situation in which a user may perform an action based on stale information (e.g., an auction for an object at a price that no longer exists, respond to older data content when newer content exists, etc.).

Another significant technical problem that still exists in data distribution platforms includes the integration of data content for distribution that includes disparate data types. For example, while it may be possible to simply display disparate data types on user interface side-by-side, it may be difficult to integrate disparate data types in an intelligent manner, e.g., where the integration of the disparate data types provides meaningful information about the combination of disparate data types. For example, a first data type may include data values that are based on one set of underlying index values whereas a second (different and independent) data type may be based on a completely different and unrelated set of underlying index values. Thus, it may be technically difficult to suitably align and integrate disparate data types. It may be still more difficult to integrate disparate data types with real-time, rapidly changing data.

Accordingly, there is a need for a system (including a novel interactive GUI), and method for integrating and distributing disparate data types in a fully-automated (or near fully-automated) manner. All of this, without significant increases to the computational burden, cost, system complexity, re-programming requirements and system maintenance.

SUMMARY

Aspects of the present disclosure relate to data integration and distribution systems, methods and non-transitory computer readable medium. A system includes one or more weather data source systems, one or more market data source systems, at least one user device associated with at least one user and a data distribution system. The data distribution system is in communication with the one or more weather data source systems, the one or more market data source systems and the at least one user device via at least one network. The data distribution system includes an interactive graphical user interface (GUI) for interactively presenting integrated weather and market data. The data distribution system is configured to collect weather data among the one or more weather data source systems and collect market data among the one or more market data source systems. The data distribution system is also configured to store, in at least one database, one or more symbol elements linked to segments of the collected weather data and one or more pre-defined rules for generating weather symbology instructions having a pre-defined instruction structure. The data distribution system is further configured to generate the interactive GUI for display on the at least one user device, receive a weather data request from the at least one user device via the interactive GUI and determine a weather symbology instruction based on at least one requested symbol element indicated in the received weather data request and in accordance with the one or more pre-defined rules. The data distribution system is further configured to create at least one weather forecast dataset from among the collected weather data based on the weather symbology instruction, generate a presentation package comprising the weather forecast dataset and a portion of the collected market data such that the weather forecast dataset is integrated with said portion of the collected market data, present the presentation package on the interactive GUI and update the presentation package on the interactive GUI concurrent with changes to one or more of the weather data, the market data and user input via the at least one user device.

Aspects of the present disclosure also relate to data integration and distribution systems, methods and non-transitory computer readable medium. A system includes one or more weather data source systems configured to generate one or more weather data streams, one or more market data source systems configured to generate one or more market data streams and a data distribution system in communication with the one or more weather data source systems and the one or more market data source systems via at least one network. The data distribution system is configured to store, in at least one database, a weather symbology comprising one or more pre-defined symbol elements linked to one or more segments of the one or more weather data streams, receive the one or more weather data streams among the one or more weather data source systems via at least one data feed and receive the one or more market data streams among the one or more market data source systems via the at least one data feed. The data distribution system is also configured to segment the received one or more weather data streams based on the one or more pre-defined symbol elements to form at least one segmented weather data stream, receive a weather data request from at least one user device via the at least one network, identify at least one symbol element among the one or pre-defined symbol elements indicated in the received weather data request, extract one or more segments of at least one segmented weather data stream based on the at least one identified symbol element to form at least one extracted weather stream, create a real-time weather dataset from the at least one extracted weather stream based on the weather data request and generate an integrated presentation package comprising the real-time weather forecast dataset and the received one or more market data streams. The data distribution system is further configured to at least one of expose the integrated presentation package to at least one application programming interface (API) and present the presentation package on a display of the at least one user device, and update the integrated presentation package concurrent with changes to one or more of the one or more weather data streams and the one or more market data.

BRIEF DESCRIPTION OF DRAWINGS

FIG. 1 is a functional block diagram of an example data distribution environment, according to an aspect of the present disclosure.

FIG. 2 is a functional block diagram of an example weather integration server, according to an aspect of the present disclosure.

FIG. 3C is a hierarchical diagram illustrating an example weather symbology and use of the weather symbology to form various presentation packages, according to an aspect of the present disclosure.

FIG. 4D is a screenshot of an example weather alpha workflow chart as a function of exchange time, according to an aspect of the present disclosure.

FIG. 7A is an example initiation screen for generating an accuracy chart, according to an aspect of the present disclosure.

FIG. 7B is an example accuracy chart associated with an accuracy weather perspective, according to an aspect of the present disclosure.

FIG. 8A is an example user interface illustrating examples of symbology construction, according to an aspect of the present disclosure.

FIGS. 9A, 9B, 9C, 9D, 9E, 9F, 9G and 9H are screenshots of an example interactive GUI for providing interactive tools for viewing and interacting with integrated weather and market data, according to an aspect of the present disclosure.

FIGS. 10A, 10B, 10C, 10D, 10E, 10F, 10G, 10H, 10I, 10J and 10K are screenshots of an example interactive GUI for providing interactive tools for viewing and interacting with integrated weather and market data, according to another aspect of the present disclosure.

DE TAILED DESCRIPTION

Figure 3A:
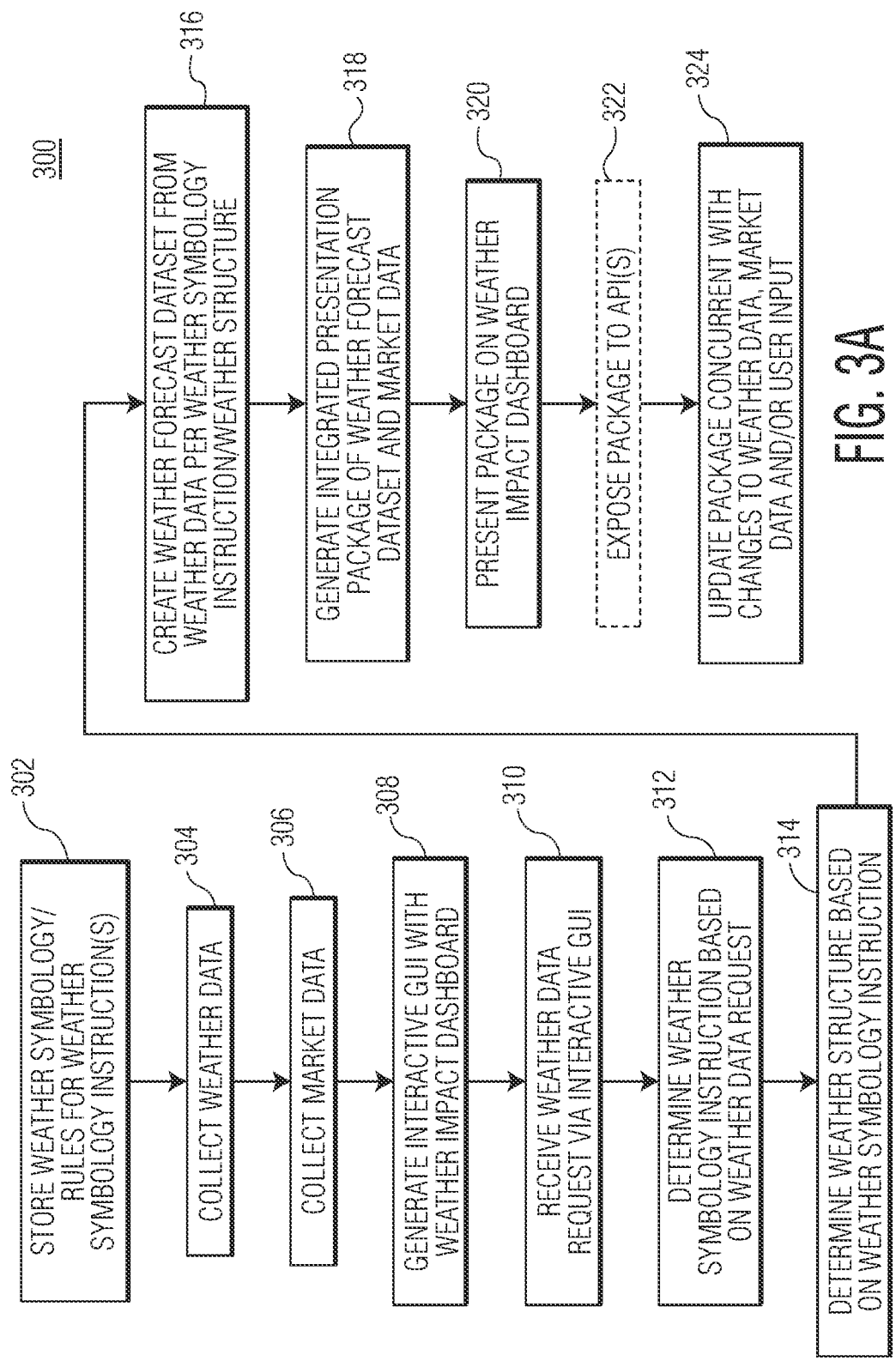
FIG. 3A is a flowchart diagram of an example method of generating integrated weather and market data, according to an aspect of the present disclosure.

As discussed above, problems exist in the integration and distribution of disparate data types, including in a fully-automated (or near fully-automated) manner. One such combination of disparate data types involves weather data and market data. Each of these disparate data types may include historical data values, current (e.g., streaming/live) data values and future (e.g., forecast) data values. Each of these disparate data types also rely on underlying data and information that may be rapidly changing. Yet further, each of these disparate data types involve large volumes of data. For example, market data typically involves tens, if not hundreds, of thousands of live indications available to display at any given time, and where changes to market data may occur hundreds, if not thousands of times in a second. Similarly, weather data may involve continually changing weather observations from among a large number of locations (e.g., on a global scale, on a country-level scale, on a state-level scale, etc.), as well as weather forecast model data that may include a number of different models, and which models may be updated at different update intervals. All of the above variables make it technically difficult to manage data distribution and interaction for real-time distribution. Because weather and market data are also disparate data types, it becomes still further technically difficult to integrate both data types in an intelligent and meaningful manner in an interactive display, to provide insights into both data types (e.g., any correlations, predictive effects of one data type on the other data type and the like).

Market data, such as market price data may be accessed in watchlists, data tables, data grids, spreadsheets (e.g., Microsoft® Excel® via (real time data (RTD) links embedded into Excel), as well as interactive charts. These are basic functions of many conventional trading desktops (e.g., trading desktops provided by Bloomberg, Refinitiv™ (e.g., Eikon™), Global View, DTN Exchange® and others) within the electronic financial trading community. These trading desktops were born in the 1980's and continue to evolve into highly specialized tools, designed to instantly display market data (using a time series server based technology) which was optimized for data delivery speed for viewing and interacting with market price data. Some conventional systems support plotting real-time market prices in real-time with updating charting tools.

Weather data has also experienced a similar evolution. Conventional interactions with weather data has been primarily using weather maps, considering it was the most efficient manner to view large amounts of data using a single image. Over the years, processing became more powerful and bandwidth became more plentiful, and both processing and bandwidth have become more affordable. The weather forecast models themselves became significantly larger in file size and the speed to process these larger weather forecast files, into maps, for internet based delivery (as opposed to fax) became the focus. At the same time, the increased computational power also allowed for the extraction of raw weather forecast 'data' from these computer-based files, could quickly convert the forecast files (e.g., in a native file format such as gridded binary format (GRIB) files) and deliver city or zip code based weather forecasts in a few minutes. From this raw 'data', the creation of timely weather forecast charting tools to display a specific city's weather forecast, over the next few days, became popular, for example, on webpages and eventually cellphones.

The present disclosure is the first to combine these two existing charting capabilities into a unique weather charting and analysis tool that integrates both weather and market data (i.e., disparate data types), including in some examples both streaming weather data and streaming market data. In some examples, time series server based technology inside a trading desktop may be leveraged and used to uniquely create a one of a kind weather "weather symbology." The specialized symbology allows weather forecasts to be plotted "in exchange time", meaning the specific time when that weather forecast "element" was made available into the public domain (e.g., a forecasted temperature, wind, humidity, etc. and/or a value-added calculation which may convert forecasted temperature into a value representing forecasted natural gas consumption called a Gas Weighted Degree Day (GWDD), etc.) as opposed to an "Interval start" time which displays the same forecast "element" (e.g., a predetermined number of days, such as 16 days forward). Importantly, the system of the present disclosure may contain pre-defined information in the symbology such as a weather model name, weather location, a "Forecast Valid Date (or Forecast Valid Day), Time of Day" and model hour in the future. The unique capability created by the present disclosure and offered inside a trading desktop of the present disclosure is the ability to instantly and easily visualize "Weather Alpha", which is the weather's financial impact on various traded market prices. For example, if a weather forecast for say "Forecast Valid Day 9" was significantly colder than the previous weather forecast and was released into the public domain at 10:31:12 am, which that streaming information (in some examples) then caused the price of Natural Gas, traded on an electronic Exchange, to move 5 cents in the following 10 seconds (after the release of this weather news/forecast data), users of a trading desktop of the present disclosure (also referred to herein as ICE Connect or ICE Connect's Trading Desktop) would have valuable insight over weather users, who simply review weather maps, or interact with weather data via some disparate source, which is not integrated with electronically traded market prices.

While this process of matching the "exchange time" (aka data receipt times) of both weather forecast data and market price data may appear simple on the surface, there are many complexities. The problems arise because conventional trading desktops were originally designed to handle prices for stocks, which involves plotting the market price with an "exchange time" (aka receipt time). Futures and forward contracts were subsequently incorporated and specialty views were created to accommodate an instrument which has a current market price in "exchange time" (aka receipt time) but also represents some point in the future. So a new symbol structure was created to represent these futures/forward contracts which represent future times the traded contract will expire, (such as a January natural gas contract, February, natural gas, etc.). These monthly futures contracts can also be stitched together to see a "forward curve" view (e.g., the January contract+February contract+March+etc.) and all those individual market prices may be updated in real-time respectively.

The present disclosure handles weather data in a similar manner; in which a 16 day weather forecast (for example) is formed similar to a "forward curve." Each weather forecast may be stitched together (as it updates multiple times per day) thus creating a "forward curve" of a "forward curve." In some examples, the present disclosure allows users to interact with this weather data in one or more (e.g., three) primary user-weather perspective(s) to help organize the potentially multiple aspects of time related to the (e.g., streaming) data). The weather perspective(s) represent a type of (software) workflow that may provide access (e.g., visualization, observation and/or interaction tools) to weather data from different perspectives (e.g., slices of a database of weather data), thereby enhancing the symbology structure and respective user-experience. In some aspects, the present disclosure may create a particular weather symbology to provide weather visualization/observation/interaction tools including one or more weather perspectives (e.g., three), and a weather alpha workflow that combines weather and market data. Significantly, such a weather alpha workflow has not been accomplished prior to the present disclosure. Advantages of the present disclosure include an integrated presentation package (including in some examples one or more weather forecast charts, tables, grids (e.g. where a user may select a particular area of the grid and a predetermined (e.g., streaming) view of weather and market data may be generated responsive to the selection), etc. integrated (e.g., overlaid) with market data). In some examples, the weather perspectives may be configured to provide more efficient access to weather data in an optimal manner, resulting in user interfaces that quickly render any suitable chart, table, analytic value extremely fast using static, periodic, aperiodic and/or streaming data.

In some examples, aspects of the present disclosure relate to weather integration systems and interactive GUIs that improve streaming weather data in an efficient manner into an electronic trading desktop (as well as other client applications). Weather integration systems of the present disclosure are unique in that the functionality of streaming weather forecast data into a trading desktop and combining (integrating) the weather data with streaming market data (e.g., streaming price data) to create actionable knowledge does not exist outside of the present disclosure. The weather integration system is able to provide more credible weather forecast models that may be made available from a greater number of weather data sources. The weather integration system may also provide forecasts that extend farther out in time and may be configured to update the weather forecast data with higher temporal and spatial resolution creating larger and larger file sizes, It is understood that the ability to handle and process an ever growing amount of data is a technical problem, thus the ability to handle and process streaming raw data, and convert this streaming data into actionable knowledge via an interactive GUI (as performed by the systems of the present disclosure) represent a technical solution to a technical problem.

In some examples, weather integration systems and interactive GUIs of the present disclosure provides a unique technique of integrating data in an exchange time to line up changing perceptions of weather forecast model(s) with changes in market prices. The weather integration system creates a unique weather symbology that is optimally designed to blend with other data streams which are configured to operate within a time series server. In general, the weather symbology may be configured for both weather data streams and non-weather (e.g., market data) data streams. The weather integration system of the present disclosure may be configured to provide access to raw data via optimally arranged dataset(s) in a manner that may be helpful for indicating an impact of weather data on market data, such as providing user interfaces for back-testing changing market prices as they are associated with changing weather perspectives. In some examples weather data (e.g., streaming and/or static data) may utilize the novel symbology of the present disclosure, which allows weather data (live and/or historical data) to flow seamlessly through a trading desktop (e.g., for interactive presentation on a GUI), as well as for providing weather data to external systems (e.g., for further analysis, visualization, etc.). The symbology of the present disclosure is unique in that it employs the smallest possible building blocks to organize weather data in nearly any possible (user-customizable) manner. The highly granular symbology of the present disclosure allows users of a trading desktop to review weather data in a manner similar to market price data as well as combine any element of weather with any granular element of market price data.

The weather integration systems and interactive GUIs of the present disclosure provide users with unique advantages, including indicating precisely how changing weather perspectives may directly influence market prices. The weather integration system may provide various weather maps, various weather data and various value-analytics.

The weather maps may include, in some examples, weather maps as part of a robust weather maps application which may stream thousands of maps for each forecast hour from various government entity weather models being released into the public domain. The weather maps provided by the weather integration system may be provided very rapidly, and may configured to provide comprehensive information in a manner that is easy to use (e.g., user-friendly). Weather data provided by the weather integration system may be provided quickly and in a manner to be easily assessable. In some examples, the weather data may include, without being limited to, one or more of a forecast confidence (risk), a forecast volatility, a forecast accuracy; a forecast alpha and a rich history of historical forecasts and/or observations. The weather integration system may provide value-added analytics be configured to instantly convert weather data into accurate and actionable knowledge, tailored specifically for traded instruments, including, in a non-limiting example, to one or more of Gas Weighted Degree Day (GWDD), Electricity Weighted Degree Day, Propane Weighted Degree Day, Heating Oil Weighted Degree Day and the like.

In some examples, the weather integration system of the present disclosure may be configured to convert extremely large streams of weather and price data into actionable knowledge, including in a manner that is faster than conventional systems, and provides improved technical features including improved data speed, reliability, comprehensive data, a unique weather symbology that does not exist outside of the present disclosure and unique transformative weather workflows.

In some examples, the weather integration system may be configured to provide a data speed to ingest, process and deliver global government weather forecast (e.g., raw) data, to users, in both data and map formats with low latency. In some examples, the weather integration system may be provide improved reliability of weather data, including the ability to acquire, render and transmit (raw) weather data in a low latency fashion into various types of weather delivery mechanisms. In some examples, the weather integration system may provide comprehensive weather data, by using high (including highest) resolution data and accurate (including most accurate) data versions, of the most critical global weather forecast models (which few (if any) other weather providers currently offer), as well as an enhanced temporal and spatial resolution.

In some examples, the weather integration system may provide a unique weather symbology having unique symbol elements (also referred to herein as "Weather Legos"). The Weather Legos may be configured to breakdown streaming weather data into the smallest possible building blocks to power a time series server-based trading desktop, allowing users to instantly and easily interact with both weather and price data (e.g., through time & space). In some examples, "Weather Legos" allow users to create any weather display imaginable, or easily replicate a favorite display from another source. In some examples, the weather integration system may provide transformative weather workflows, which workflows may provide an improved speed of understanding the impact of weather including on market data. The workflows may leverage the "Weather Legos" and improved data speed, together with the full power of an electronic trading desktop, to create unique displays that allow users to more quickly and more precisely understand how changes in perceived weather may directly influence market prices. The unique displays of the present disclosure transform how market prices interact with weather data in the financial community. The displays of the present disclosure allow users to convert more weather and price data into actionable knowledge, and in a manner that is faster than conventional systems.

The weather integration system of the present disclosure are also unique in that it fully integrations two unique workflows (weather and market data, an example of disparate data structures) that are conventionally handled in a completely separate manner, because conventional systems were unable to integrate the two streaming workflows due to the technical complexities of the weather and market workflows. Instead, at best, some conventional trading desktops may simply provide access to weather (e.g., via i-frames) but cannot provide integrated weather and market data (e.g., weather data overlaid with market data). The weather integration system of the present disclosure (including the end-to-end infrastructure) is the first and only weather integration system of its kind. In some examples, the weather integration system may provide opportunities to scale electronic trading operations geared to leverage changing weather perspectives across many different asset classes, and may provide unique displays that improve identification of trading opportunities, including faster identification of trading opportunities.

In some examples, the weather integration system may derive one or more preliminary daily forecast variables (e.g., daily average temperature, gas weighted degree day (GWDD), heating degree day (HDD), cooling degree day (CDD), etc.), and may provide a "% Complete" value prior to the particular model's completion of that forecast day. In other words, each forecast day may have twenty four forecast model hours. When the noon forecast arrives, twelve of the twenty four possible forecast model files exist, in the public domain, so that the forecast day is 50% complete. When the 1 pm forecast model data arrives, the forecast day is now 54% complete, and so on. This innovative approach provides users valuable preliminary daily forecast data which may be directionally accurate. In other words, users may be presented a forecast day before (e.g., approximately about 4 minutes before) other weather vendors post their daily forecast data (from the same government weather forecast model).

In some examples, the weather integration system may provide an improved speed of understanding of weather and market data. The unique weather workflows (weather alpha and perspective workflows, described further below) allows users to make more informed and faster weather and price decisions. The same centralized weather workflows may easily allow a user to scale this unique process across an electronic trading floor and across electronically traded instruments, thereby allowing each trader to more easily monitor multiple traded markets, as it relates to changing weather perspectives (e.g., with greater accuracy and faster speed).

In some examples, the weather integration system may provide comprehensive model data, including higher resolution forecast data from government entity models. Because the weather integration system may provide a low latency infrastructure, the weather integration system, in some examples, may be configured to move large amounts of data around the world in seconds. This unique infrastructure may be leveraged to extract higher resolution versions of various forecast data including, in some examples, higher resolution versions of the GFS, GFS ENS, ECMWF and ECMWF ENS models. In some examples, the weather integration system may provide model data with enhanced spatial resolution (e.g., ¼ degree, whereas conventional resolution may be ½ degree) and enhanced time (temporal) resolution. In some examples, enhanced spatial resolution may provide a slightly more accurate weather model version (e.g., picking up on micro climates) which lower resolution versions may not be able to provide. In some examples, enhanced temporal resolution may include hourly time steps, meaning that users may receive forecast updates, for example, every 20 seconds. In contrast, conventional temporal resolution may be about three hourly updates which may occur every 60 seconds. In addition, in some examples, twenty four model hours (e.g., time steps) may be included in the first five days (120 hrs) of the GFS weather forecast model.

In some examples, the weather integration system may leverage the unique weather symbology combined with streaming market price data (e.g., market data stream(s) together with a trading desktop functionality to create an almost limitless combination of symbol element ("Weather Legos") designs to provide unique interactive GUIs, client applications, client services and trading desktop applications. In some examples, the weather symbology is configured to treat weather data like a traded instrument, so any weather symbol may be entered directly into a chart, table, watchlist, etc.. to view the weather data directly. In some examples, the weather symbology may be configured to operate in trading desktops, spreadsheet applications and with one or more object-oriented programming languages (e.g., Python™).

In some examples, weather data may be accessed in real-time using the symbol elements, and the weather integration system may be configured to leverage both streaming weather data and streaming price data inside an electronic financial desktop. The unique weather symbol elements may also allow weather data to be accessed from one or more separate directions, including, in some examples three primary weather perspectives, including guidance, progression and (forecast) accuracy perspectives.

In some examples, the guidance perspective may be configured to assess weather forecast risk and confidence. For example, if all of the weather forecasts agree, there is less risk embedded into the market prices. Alternatively if there is a wide range in the forecasts, then there is greater risk (less confidence) in the perceived future weather, presenting greater price volatility of the market prices. In some examples, the progression perspective may be configured to assess a 'run-to-run' forecast volatility as well as how all weather forecast models relate to each other. In some examples, the progression perspective may use the principles of convergence and mean reversion to help users spot short-term and longer-term electronic trading opportunities. In some examples, the accuracy perspective may be suitable for users who take (or make) physical delivery of weather-related instruments such as power, natural gas, natural gas liquids and the like. For example, often there is a disconnect between the perception of the weather, at the time a monthly futures contract expires, versus what weather will actually occur inside of that month. It is important to understand the probability a weather forecast will be accurate (or inaccurate). The accuracy perspective may aid in such an understanding.

Referring now to FIG. 1, a functional block diagram of an example data distribution environment 100 (environment 100 herein) is shown. Environment 100 may include data integration/distribution (DID) system 102, one or more weather data sources 104, one or more market data sources 106 and one or more user devices 108 (associated with at least one user). In some examples, one or more components of environment 100 (e.g., DID system 102, weather data source(s) 104, market data source(s) 106 and/or user device(s) 108) may be communicatively coupled via one or more networks 110. Network(s) 110 may include, for example, a private network (e.g., a local area network (LAN), a wide area network (WAN), intranet, etc.) and/or a public network (e.g., the Internet).

Weather data source(s) 104 may include, without being limited to, weather forecast model sources, one or more weather observations data sources associated with one or more locations and the like. In some examples, sources for weather forecast model(s) may provide weather model data for generating weather forecasts for one or more geographical regions. In one non-limiting example, the weather forecast model source(s) may include one or more of National Oceanic and Atmospheric Administration (NOAA) United States (US) Global Forecast System (GFS), NOAA GFS global ensemble (GFS ENS), NOAA GFS global ensemble Extension (GFS ENS EXT), NOAA's Climate Forecast System Ensemble model (CFS ENS), European Center for Medium-Range Weather Forecast (ECMWF), ECMWF Ensemble, ECMWF Ensemble Extension (ECMWF EXT), ECMWF Seasonal model (SEAS) and its corresponding extension model (SEAS EXT) and other gridded binary format (GRIB) weather forecast model source(s). In general, a weather forecast model source may run a weather forecast model (e.g., periodically such as quarterly, monthly, multiple times per week, one or more times per day, asynchronously, in response to a predetermined condition, etc.) and may provide weather forecast data for up to a predetermined number of days. For example, the model for the GFS is run four times a day and may produce forecasts for up to 16 days in advance and run, for example, four times per day. As another example, the CFS ENS may run daily and may forecast out nine months into the future. In one non-limiting example, source(s) for weather observations data may include one or more of Meteorological Aerodrome Report (METAR) data and Climate Forecast System (CFS) data including CFS Reanalysis (CFS-R) data for one or more locations (e.g., one or more airports, weather stations, etc.). In some examples, CFS-R data may be used to provide global observation estimates, for an even greater number of weather parameters, as estimates which METAR sensors and/or limited physical locations may not provide. In general, weather observations data may be updated periodically (e.g., hourly, daily, monthly, quarterly, etc.), and may include various weather data (e.g., temperature, dew point, wind direction, wind speed, precipitation, cloud cover, visibility, barometric pressure and the like, as well as derived values such as GWDD) for one or more weather observation locations. In general, weather data source(s) 104 may include any suitable weather data sources for weather forecast model(s) and weather observations data associated with one or more locations. In general, weather data source(s) 104 that may be in communication with DID system 102 may comprise a server computer, a desktop computer, a laptop, a smartphone, or any other electronic device known in the art configured to capture data, receive data, generate weather forecast model data, store data and/or disseminate any suitable weather data.

Market data source(s) 106 may include, in general, any electronic source for market data (e.g. price data and/or trade-related data associated with one or more tradeable financial instruments). Non-limiting examples of types of market data that may be provided by market data source(s) 106 may include one or more of equities data, derivatives data, data associated with one or more indices, market depth data, energy market data, fundamental data, inter-dealer broker (IDB) data and over-the-counter (OTC) market data. In some examples, market data source(s) 106 may also include one or more news sources that may provide information associated with market data (e.g., observations on market data trends, news stories that may affect market data and the like). In some examples, fundamental data may include one or more sources which contain structured and/or non-structured data which may provide information associated with market data impacting supply, demand and/or transportation (such as shipping data, electricity emissions, natural gas pipeline flows, etc.). In general, market data source(s) 106 that may be in communication with DID system 102 may comprise a server computer, a desktop computer, a laptop, a smartphone, or any other electronic device known in the art configured to capture data, receive data, store data and/or disseminate any suitable market data.

User device(s) 108 may include, without limit, any combination of mobile and/or stationary communication device such as mobile phones, smart phones, tablets computers, laptop computers, desktop computers, server computers or any other computing device configured to capture, receive, store and/or disseminate any suitable data. In some examples, user device(s) 108 may include one or more external computer systems configured to receive weather and/or market data as processed by DID system 102, and may provide additional analysis, user interaction and/or distribution functionality. In one embodiment, user device(s) 108 may include a non-transitory memory, one or more processors including machine readable instructions, a communications interface which may be used to communicate with DID system 102, a user input interface for inputting data and/or information to user device(s) 108 and/or a user display interface for presenting data and/or information on user device(s). In some examples, the user input interface and the user display interface may be configured as a graphical user interface (GUI) (such as interactive GUI 900 shown in FIGS. 9A-9H). User device(s) 108 may also be configured to provide interactive GUI 120 of DID system 102 on the GUI of user device(s) 108. In some examples, user device(s) 108 may include computer system 1100 (shown in FIG. 11).

DID system 102 may include data collector 112, data feed distributor 114, weather integration server 116, time series server 118, interactive GUI 120, one or more data caches 124, one or more client applications and/or services 126, one or more data caches 124, and client/server connection manager 128. In some examples, one or more components 112-128 of DID system 102 may communicate with each other via a data and control bus (not shown). Although DID system 102 is shown in FIG. 1 as one component (e.g., a server), DID system 102 may include one or more components (e.g., one or more servers), whether co-located or linked across one or more networks.

Although not shown, DID system 102 may include at least one processor (e.g., processing device 1102 shown in FIG. 11) and non-transitory memory (e.g., memory 1106 shown in FIG. 11) storing one or more routines and or algorithms for performing the functions of DID system 102 described herein. An example implementation of one or more components of DID system 102 is shown by computer system 1100 (shown in FIG. 11).

In some examples, DID system 102 may obtain weather data and market data from among respective weather data source(s) 104 and market data source(s) 106 via data collector 112. Although not shown, data collector may include one or more input and/or output interfaces (e.g., an electronic device including hardware circuitry, an application on an electronic device) for communication with other components of environment 100 (e.g., weather data source(s) 104 and market data source(s) 106 (and, in some examples user device(s) 108).

Data collector 112 may be configured to obtain weather and market data through any suitable electronic data collection technique. For example, data collector 112 may obtain data through or more data feeds (including streaming (live) data feed(s)), one or more file transfers (including, in some examples, one or more secure file transfers), by data being pushed to DID system 102 and/or by DID system 102 pulling and/or extracting data and/or information from among weather data source(s) 104 and/or market data source(s) 106. In some examples, data collector 112 may include security protection (e.g., encryption, decryption) to protect the integrity of the obtained data.

In some examples, data collector 112 may perform one or more of filtering, data normalization, data reformatting, data aggregation and the like. In some examples, electronic data that may be obtained by data collector 112 may include data that may be unable to be processed, data that includes one or more errors and the like. In some examples, different sources among weather data source(s) 104 and market data source(s) 106 may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by data collector 112 may include excluding null data values, excluding corrupted data, excluding outlier data values (e.g., a data value outside of a pre-defined value range, outside of a pre-defined time range) and the like. In some examples, data collector 112 may reformat the collected data to one or more common formats and/or normalize the collected data. In some examples, data collector 112 may be configured to aggregate and/or combine at least a portion of the collected data (e.g., according to one or more pre-defined categories (such as a type of data, one or more predetermined time periods, etc.)).

Data feed distributor 114 may be configured to receive the collected data from data collector 112. Data feed distributor 114 may also be configured to communicate with weather integration server 116 and time series server 118. In some examples, data feed distributor 114 may also be configured to communicate with client application(s)/service(s) 126. In some examples, data feed distributor 114 may also be configured to communicate with data cache(s) 124.

In general, data feed distributor 114 may be configured to process the received data (e.g., the collected market and weather data), and may distribute the received data to one or more among weather integration server 116, time series server 118, data cache(s) 124 and client application(s)/service(s) 126 (not all connections with data feed distributor 114 shown). Data feed distributor 114 may determine which component to distribute the received data to, based on one or more characteristics of the received data (e.g., data type, one or more predetermined conditions, one or more predetermined parameters and the like). In general, data feed distributor 114 may distribute weather data among the received data (collected from weather data source(s) 104) to weather integration server 116, and may distribute market data among the received data (collected from market data source(s) 106) to time series server 118.

Weather integration server 116 may be configured to receive weather data from data feed distributor 114, including weather forecast model data from among one or more weather forecast data models and weather observation data from one or more locations. Weather integration server 116 may be configured to communicate with time series server 118 and interactive GUI 120. Weather integration server 116 may be configured to segment (e.g., separate and/or index) the received weather data (from among the weather observations data and the weather forecast model data) into one or more segments in accordance with a predetermined weather symbology. (Weather symbology is described further below). In some examples, weather integration server 116 may also store at least a portion of the segmented weather data. Weather integration server 116 may provide the segmented weather data to time series server 118. In some examples, weather integration server 116 may also generate (and store) one or more weather maps from the weather forecast model data. In some examples, weather integration server 116 may provide weather map(s) to interactive GUI 120. In general, weather integration server 116 may provide segmented weather data to time series server 118 (as well as weather map(s) to interactive GUI 120) that may include real-time (e.g., streaming) data, near-real-time data, historical (e.g., static data) and/or any combination thereof.

In some examples, the segmented weather data may be generated to provide (weather symbology-segmented) weather data to time series serve 118 as a function of exchange time and/or interval time. Importantly, the segmented weather data, as generated by weather integration server 116, is in a format that can be readily integrated with market data within time series server 118. In some examples, the segmented weather data may be automatically updated based on (i.e., updated concurrent with) changes to the received weather data (e.g., new observation data, any updates to the weather forecast model data, etc.).

Time series server 118 may be configured to receive market data from data feed distributor 114 and segmented weather data t from weather integration server 116. Time series server 118 may also receive at least one weather data request (e.g., via interactive GUI 120, via client application(s)/service(s) 126). In some examples, the weather data request may be associated with at least one symbol element, and may be converted to weather symbology instruction. Time series server 118 may extract one or more portions of the segmented weather data (received from weather integration server 116) in accordance with the weather symbology instruction. In general, the weather symbology instruction may include one or more symbol elements (such as forecast location, weather perspective, weather model). In some examples, the weather symbology instruction may also include one or more variables (e.g., field(s) and/or condition(s)). (Examples of weather symbology instructions and weather perspectives are described further below.) Time series server 118 may be further configured to integrate the extracted weather data (in accordance with the weather symbology instruction) with at least a portion of market data (e.g., received from data distributor 114) to form an integrated presentation package. The integrated presentation package may be provided to interactive GUI 120 and/or client application(s)/service(s) 126 (including, in some examples, at least one application programing interface (API)).

In some examples, time series server 118 may include a tick engine and at least one database, for processing large amounts of market data that may change rapidly (e.g., user orders, market events, quotes, etc.). Time series server 118 may also include a presentation tool for generating presentation packages, including integrated weather and market data presentation packages. For example, time series server 118 may combine the extracted weather data (including, for example, weather forecasts, weather observations, weather symbology indications) with at least a portion of the market data (e.g., based on user input, pre-defined parameters, etc.) to form at least one integrated presentation package suitable for presentation (and interaction) (e.g., on interaction GUI 120, via an API, etc.). Although examples are described where presentation package includes both weather and market data, in some examples, at least one presentation package may be generated that includes (packaged) extracted weather data.

Figure 11:
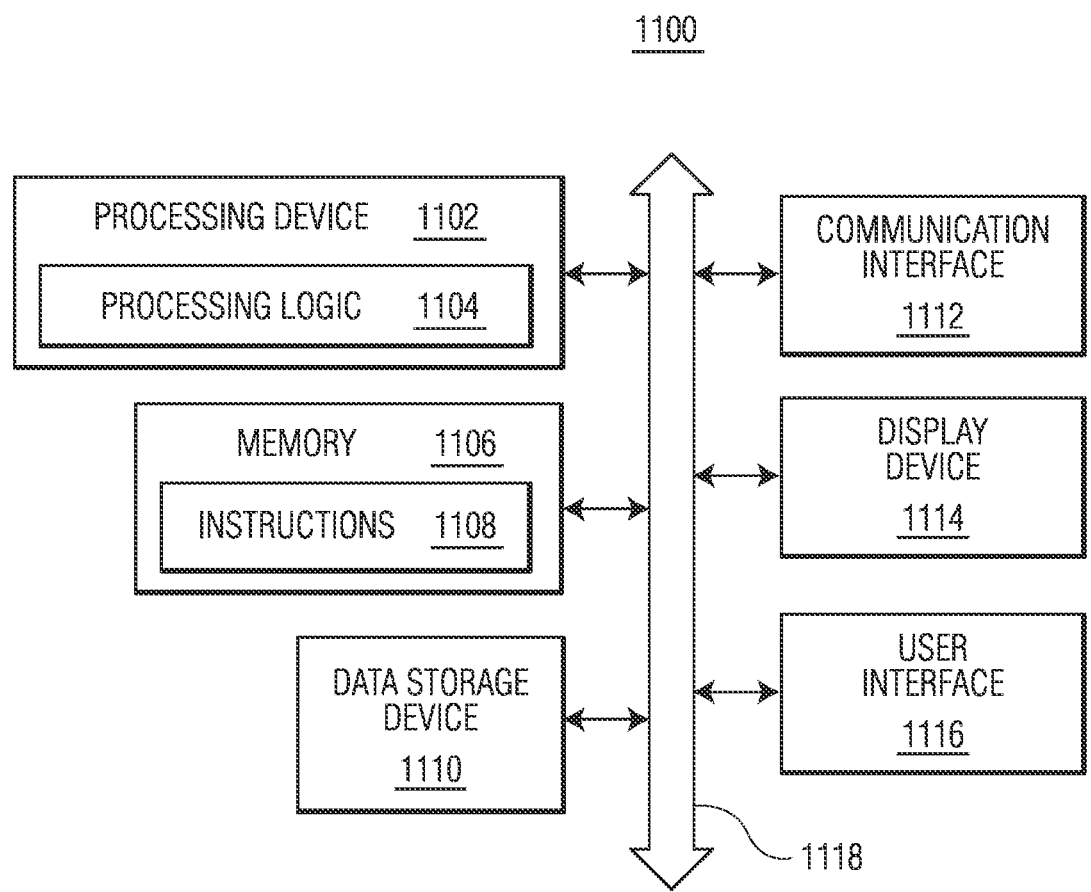
FIG. 11 s a functional block diagram of an example computer system according to an aspect of the present disclosure.

Although not shown, time series server 118 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions of time series server 118 described herein. An example implementation of one or more components of time series server 118 is shown by computer system 1100 (shown in FIG. 11).

The integrated presentation package may include any suitable data and/or information (including weather data, market data, other suitable data and/or any combination thereof) configured in a manner for presentation and/or user interaction, including, but not limited to, one or more of at least one chart, at least one map, at least one watchlist, at least one alert, at least one grid application, at least one table, user input options including weather symbology input options and the like, In some examples, at least a portion of the data and/or information presented in the integrated presentation package may be user-customizable (including via the use of weather symbology). In some examples, the data and/or information in the presentation package may include one or more (live) data streams, such that the data and/or information presented by the presentation package may be updated concurrently with the data in the data stream(s). In some examples, the presentation package may also include historical (e.g., static data). In some examples, the presentation package may include at least one interactive weather grid that may be configured to allow user selection of a portion of the grid (e.g., clicking on a particular area with a pointing device). Responsive to the user selection, interactive GUI 120 may generate a predetermined streaming view of weather and market data associated with the selected portion.

An example of weather integration server 116 together with time series server 118 is described further below with respect to FIG. 2.

Interactive GUI 120 may be configured to generate weather impact dashboard 122 having a uniquely configured arrangement of one or more input regions, one or more notification regions and one or more display regions. In some examples, one or more portions of weather impact dashboard 122 may be automatically updated (including in real-time such as streaming data or near real-time) responsive to changes in weather data and/or market data. In some examples, the display region(s) may include an interactive display that permits/prompts user input and may be automatically updated in response to user input.

In some examples, weather impact dashboard 122 may include different configurations based on an underlying application and/or service (e.g., among client application(s)/service(s) 126 for which it is launched. For example, weather impact dashboard 122 may have a first configuration for a mobile application, may have a second (different) configuration for a desktop application and may have a third (different) configuration for a spreadsheet application. In some examples, weather impact dashboard 122 may include one or more windows with different configurations depending upon a particular weather perspective. In some examples, weather impact dashboard 122 may provide user input of a weather symbology instruction directly (e.g., a weather data request may include a weather symbology instruction itself). In some examples, weather impact dashboard 122 may provide one or more user input prompts that may be converted to a weather symbology instruction.

Examples of interactive GUI 120 are described further below with respect to FIGS. 9A-10F.

In some embodiments, DID system 102 may include data cache(s) 124 (e.g., a hardware component and/or software component) for storing data and/or information associated with the various functions of DID system 102. Data cache(s) 124 may be configured to store collected data (e.g., by data collector 112 and distributed by data feed distributor 114), including, for example, weather data from among weather data source(s) 104 and market data from among market data source(s) 106. In some examples, data cache(s) 124 may store requested weather datasets (generated by weather integration server 116) and/or integrated presentation package(s) (generated by time series server 118). In general, data cache(s) 124 may be configured to store any data in which faster data retrieval of the data for future requests may be useful. In some examples, data cache(s) 124 may include a data manager (DM) (not shown) for controlling collection and/or retrieval of data in data cache(s) 124.

In some examples, DID system 102 may include storage (e.g., one or more databases) to store any parameters, configurations, functions and/or other suitable data and/or information that may be useful for one or more of components 112-128. In some examples, the storage may be configured to store data distributed by data feed distributor 114 and/or data collected by data collector 112.

In some examples, DID system 102 may include client application(s)/service(s) 126 for creating instances of application(s) and/or service(s) for distributing data to user device(s) 108. In one non-limiting example, client application(s)/service(s) 126 may include one or more of a trading desktop, a spreadsheet application, a mobile application (e.g., an application that may be suitable for display screen of a mobile device such as a smartphone) streaming (e.g. raw, normalized, filtered and/or aggregated) data feeds and/or one or more APIs for receiving data in one or more object-oriented programming languages (e.g., Python™, R, etc.). In some examples, client application(s)/service(s) 126 may create instance(s) of application(s) and/or service(s) including interactive GUI 120 having at least one configuration of weather impact dashboard 122. In some examples, DID system 102 may be configured to expose a presentation package to one or more API(s) among client application(s)/service(s) 126.

In some examples, DID system 102 may include a client/server connection manager 128 (also referred to as connection manager 128) configured to manage client to server connection requests. In general, connection manager 128 may manage connection request(s) of user device(s) 108 to DID system 102, to access client application(s)/service(s) 126.

Referring next to FIG. 2, a functional block diagram of example weather integration server 116 is shown. Weather integration server 116 may include observations collector 204, one or more databases 206, forecast/observation generator 210, map generator 212, weather symbology storage 214, storage 216 for one or more weather structures and one or more databases 220. In some examples, one or more components 204-216 and 220 of weather integration server 116 may communicate with each other via a data and control bus (not shown).

Although not shown, weather integration server 116 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions of weather integration server 116 described herein. An example implementation of one or more components of weather integration server 116 is shown by computer system 1100 (shown in FIG. 11).

Observations collector 204 may be configured to obtain weather observations data 202 associated with one or more weather observation locations (e.g., from among weather data source(s) 104). In a non-limiting example, weather observations data 202 may include METAR, CFS-R observations data and CFS-R generated climatological data (e.g., a trailing 10 year climatology, a trailing 15 year climatology, a trailing 30 yr Climatology, etc.). In some examples, observations collector 204 may be configured to separate METAR and CFS-R observations data, CFS-R climatology data, and may process each type of data separately. In some examples, observations collector 204 may be configured to parse weather observations data 202, to identify one or more elements of weather observation data 202 that may be useful for generating segmented weather data 218. In some examples, observations collector 204 may generate one or more identifiers for the identified elements of the (parsed) weather observations data 202. In some examples, the identifier(s) may include an observation date, a time as to when the weather observation was observed and/or a timestamp indicating when a particular value/set of values was received.

Observations collector 204 may also store observations data 202 (after parsing) in database(s) 206 (e.g., as historical observations). Database(s) 206 may store observations data in any suitable format/arrangement for efficient data storage and retrieval. In some examples, database(s) 206 may store (parsed) weather observations data 202 based on identifiers generated by observations collector 204. Observations collector 204 may also provide at least a portion of weather observations data 202 (e.g., after parsing and/or from database(s) 206 to forecast/observation generator 210.

Forecast/observation generator 210 may be configured to obtain weather forecast model data 208 (e.g., from among weather data source(s) 104). In a non-limiting example, weather forecast model data 208 may include weather forecast models from GFS, GFS ENS, GFS ENS EXT, CFS ENS, ECMWF, ECMWF ENS, ECMWF ENS EXT, SAEAS and SEAS EXT forecast model sources. In one example, one or more (in some examples all) forecast models may originate in a GRIB file format and may be instantly converted into city level data for forecast valid times for a number of weather forecast variables, which may then be immediately run though time series server 118 so the data can stream through DID system 102. Forecast/observation generator 210 may also obtain weather observations data 202 from observations collector 204 (and/or form database (s) 206). Forecast/observation generator 210 may also be configured to communicate with weather symbology storage 214 and weather structure(s) storage 216. In general, forecast/observation generator 210 may be configured to use pre-defined symbol elements (stored in weather symbology storage 214) to segment forecast model data 208 and/or observations data 202 (e.g., via observations collector 204 and/or stored observation(s) via database(s) 206) into one or more pre-defined segments of weather data, to form segmented weather data 218. In some examples, at least a portion of forecast model data 208 may be stored in one or more databases (not shown), and forecast/observation generator 210 may use at least a portion of previously stored forecast model data to generate segmented weather data 218. Segmented weather data 218 may be provided to time series server 118.

Weather symbology storage 214 may be configured to store a pre-defined weather symbology. The pre-defined weather symbology may include one or more pre-defined symbol elements, one or more pre-defined variables (e.g. pre-defined condition(s) and/or fields) and one or more pre-defined rules for combining and/or arranging symbol elements into at least one weather symbology instruction having a pre-defined instruction structure. The symbol elements may be linked to respective segments of the weather data (including, in some examples, segments of weather data streams). The weather data may be segmented, (by forecast/observation generator 210) in accordance with the symbol elements of the weather symbology stored in storage 214. An example weather symbology is shown in FIG. 3C. In some examples, a weather symbology instruction may be used to extract portions of segmented weather data (e.g., by time series server 118) to create integrated presentation package 226.

Weather structure(s) storage 216 may be configured to store one or more pre-defined weather structures having one or more respective pre-defined rules (e.g., software workflows) for generating one or more pre-defined weather alpha workflows and one or more pre-defined weather perspectives. Time series server 118 may use the pre-defined weather structure(s) to create integrated presentation package 226. In general, the pre-defined weather perspective(s) may represent workflows (e.g., having one or more pre-defined rules) for converting segmented weather data 218 into user-customizable actionable knowledge (e.g., providing one or more different ways to assess various aspects of segmented weather data 218 that may not be directly observable by simply presenting weather forecast(s) and/or weather observation(s)). In a non-limiting example, the weather perspective(s) may include one or more pre-defined rules for generating integrated presentation package 226 in accordance with one or more of a guidance workflow, a progression workflow and an accuracy workflow. Examples of weather perspectives are described further below. In a non-limiting examples, the one or more pre-defined weather alpha workflows may include pre-defined rules for generating at least one of a weather macro alpha and a weather micro alpha (described further below).

In general, a weather symbology instruction (associated with weather data request 220), may be formed (e.g., by time series server 118) having the pre-defined instruction structure, using weather symbol element(s) and variable(s) in accordance the pre-defined rule(s) stored in weather symbology storage 214. In some examples, the weather symbology instruction may include a weather structure (e.g., a perspective) , an observation location and a weather forecast model. The weather symbology instruction may include additional condition and/or function information, such as one or more of a model run, forecast valid days, forecast valid hours, etc. In some examples, the weather symbology instruction may be created based on one or more data requests 224 (e.g., received via user device(s) 108). Pre-defined rule(s) associated with the weather structure (of the weather symbology instruction) may be obtained from weather structure(s) storage 216 and may be used to create integrated presentation package 226. In some examples, integrated presentation package 226 may include at least a portion of segmented weather data 218 (e.g., based on a weather alpha workflow and/or a weather perspective) integrated together with market data 222 (received by time series server 118). In some examples, integrated presentation package 226 (at least a portion) may include at least a portion of segmented weather data 218 (e.g., without any market data 222).

Although weather symbology storage 214 and weather structure(s) storage 216 are shown as being part of weather integration server 116, storage components 214 and/or 216 may be external to weather integration server 116. As shown in FIG. 2, time series server 118 may be communicatively coupled to storage components 214 and 216.

Map generator 212 may receive at least a portion of forecast model data 208, and may render one or more weather forecast maps via any suitable well-known rendering technique. Map generator 212 may also store one or more weather forecast maps in database(s) 220. Database(s) 220 may store weather forecast map(s) in any suitable format/arrangement for efficient data storage and retrieval. One or more weather maps may be provided to interactive GUI 120 (e.g., via database(s) 220 and/or via map generator 212). Examples of types of maps that may be rendered are described further below with respect to FIG. 10C.

In operation, forecast/observation generator 210 may create segmented weather data of the collected (e.g., streaming) forecast and/or observations data) in accordance with the pre-defined symbol elements (and in some examples, symbology variables) stored in storage 214. In some examples, the weather data may be segmented by indexing portions of the weather data to the (linked) symbol elements (and symbology variables in some examples) and/or separating the weather data into subsets linked to the symbol elements (and symbology variables in some examples). In some examples, at least a portion of segmented weather data 218 may also be stored in one or more databases (not shown). Time series server 118 may receive at least one (weather) data request 224 (e.g., from user device(s) 108 via interactive GUI 120). Response to data request 224, time series server 118 may convert data request(s) 224 to a corresponding weather symbology instruction, based on pre-defined weather symbology rule(s) in weather symbology storage 214 (or may receive the weather symbology instruction directly in data request 224). Time series server 118 may determine which segment(s) of segmented weather data 218 to extract based on the symbol element(s) in the weather symbology instruction (that are linked to segment(s) of segmented weather data). Time series server 118 may also determine a particular weather structure among weather structure(s) stored in storage 216, based on the weather symbology instruction. Time series server 118 may create integrated presentation package 226 in accordance with corresponding pre-defined weather structure rules (e.g., workflow) for the particular weather structure. In some examples, time series server 118 may stitch together a weather forecast in accordance with the weather symbology instruction, by extracting segment(s) of segmented weather data 218 according to the particular weather structure. Moreover, time series server 118 may generate integrated presentation package 226 as a function of multiple time series formats, including exchange time and interval time, such that extracted segment(s) of segmented weather data 218 may be easily integrated with market data 222 by time series server 118, so that end users (e.g., via interactive GUI 120, via client application(s)/service(s) 126) may readily identify any impacts of weather data on market data 222.

In some examples, integrated presentation package 226 may be generated based on predetermined parameters (e.g., determined by weather integration server 116, determined by time series server 118, defined by the user, etc.), without receiving any data request 224 (and/or independent of any data request 224). For example, an initial launch page on weather impact dashboard 122 of interactive GUI 120 may be generated based on the predetermined parameters (via extracting portions of segmented weather data 218 in accordance with the predetermined parameters). A user of user device(s) 108 may then modify and/or customize integrated presentation package 226 that is ultimately presented on weather impact dashboard 122 by data request(s) 224.

Weather Workflows Overview

Before describing details of the symbology structure, an overview of example weather workflows (e.g., weather alpha and weather perspectives) of the present disclosure for interacting with weather data is provided. The weather alpha and weather perspectives workflows are unique to the present disclosure and have never been integrated into a trading desktop or any system (including any streaming system) containing market prices prior to the present disclosure. Although the present disclosure describes three primary weather perspective workflows, it is understood that the present disclosure is not limited to the example workflows described below, and that any suitable weather workflow for interacting with weather and market data to provide meaningful indications of weather impact on market data are also within the scope of the present disclosure. In some examples, the weather perspective and weather alpha workflows may be used by any suitable end-user including, without being limited to, traders, analysts, meteorologists, trading floor quants, investors, hedgers and the like.

Weather Alpha: A system which allows for a data display or charting display of weather forecast variables (like temperature, Degree Day, GWDD, wind, humidity, etc..) from a specific weather forecast model or multiple weather forecast models, initialized and released at a specific time of day (model run) from which a specific location or locations (e.g., city or region) which may (or may not) include preliminary estimated forecast values such as "Yo complete" or 'Fast& Full' or partial week month or seasonal aggregations called "Progress" or pre-calculated (streaming) values (i.e. "Change" from previous, "Anomaly/Difference" from Climatology) to be displayed in real-time, alongside market prices for any traded instrument which includes but is not limited to one or more traded commodities, equity or bond instruments which may or may not include futures, forward and/or various types of option contracts. The 'weather symbology' of the present disclosure allows the user a method to easily access weather forecast data in at least one of a "Seasonal", "Monthly" "Weekly", "Daily" and "Hourly" format in a manner consistent for data Analysis or Charting and/or aligning with other market data. See FIGS. 4A-4D (discussed further below). In general, an objective of weather alpha may include providing one or more tools to quickly understand the vast amount of streaming data specifically related to changing weather perceptions and a magnitude of weather forecast changes directly to (changing) prices of any traded instruments (e.g., on an electronic exchange system and/or offline of an electronic exchange system).

The example three primary weather perspective workflows may include:

1) Guidance: A system which allows for a data display, or charting display, of a weather forecast variable (like temperature, Degree Day, GWDD, wind, humidity, etc..) from MULTIPLE weather forecast models, initialized and released at one or more specific times of day (model runs) from which a specific location or locations (e.g., city or region) which may (or may not) include preliminary estimated forecast values such as "Yo complete" or 'Fast& Full' or partial week, month or seasonal aggregations called "Progress" or pre-calculated (streaming) value(s) (e.g., "Change" from previous and/or "Anomaly/Difference" from Climatology) to be displayed in real-time or its history, allowing the user to closely examine weather forecast risks, by visualizing if all weather forecasts are in agreement or disagreement with each other over the forecast duration. The 'weather Symbology' of the present disclosure allows the user a method to easily access weather forecast data in a manner consistent for data Analysis or Charting and/or aligning with other market data. See FIG. 5 (discussed further below). In some examples, Daily or Hourly represent weather forecast fields. The symbology allows weather forecasts to be treated as a continuation contract (e.g., such as a prompt month natural gas contract) or revert to previous weather forecasts. Data (including in some examples all data) in DID system 102 may be displayed as a function of receipt time or interval start time. In some examples, the Symbology may include an MR0 format (described herein).

2) Progression: This style of chart may hold a particular Forecast Valid Date/Time of Day on that specific Date constant (called a "Target Date") and shows how the weather forecast models have changed overtime, leading up to that "target date". The system which allows for either a data display or charting display of a weather forecast variable (like temperature, Degree Day, GWDD, wind, humidity, etc.) from MULTIPLE weather forecast models, and any number of model runs, for a specific location (city or region) which may (or may not) include preliminary estimated values such as '% complete' or 'Fast& Full' or partial week, month or seasonal aggregations called "Progress" or pre-calculated forecast value (i.e. "Change" from previous and/or "Anomaly/Difference" from Climatology) to be displayed in real-time, allowing the user to closely examine weather forecast changes over time (to a point at which they all may converge). The 'weather Symbology' of the present disclosure allows the user a method to easily access weather forecast data in either a "Seasonal", "Monthly" "Weekly", "Daily" or "Hourly" format in a manner consistent for data Analysis and/or Charting and aligning with other market data. See FIGS. 6A-6C (discussed further below).

3) Accuracy: This style of chart or data query may look back at historical weather forecast 'model run dates' and 'model runs' and hold a Forecast Valid Day constant. For example 'Forecast Day #1' could be examined over the last 30 days of weather forecasts from a particular weather forecast model. Each of these Day 1 weather forecasts (which refer to a different Forecast Valid Date) can then be subtracted from their respective weather observation (then all (e.g., 30) data points may be averaged) to derive an average weather forecast Bias (hotter/colder) or other performance statistics. The 'weather Symbology' of the present disclosure allows the user a method to easily access weather forecast data in either a "Daily" or "Hourly" format in a manner consistent for data Analysis or Charting and/or aligning with other market data. See FIGS. 7A and 7B (discussed further below).

Overview of Weather Symbology

To accomplish the example weather perspective and weather alpha workflows (which may be important, for example, to traders, analysts, meteorologist and trading floor quants, investors, hedgers), lies an underlying comprehensive 'weather symbology'. This symbology structure is desirable for weather data to function inside a streaming time series server-based trading desktop (such as time series server 118), where the time series server also accommodates a fast streaming delivery of market prices. It is not the order of the elements listed in the 'weather symbology' but rather the function of what weather 'elements' can be extracted and applied to client application(s)/service(s) 126 (such as a trading desktop) which hosts market prices. To describe the methodology of the 'weather symbology', a unique structure is established by the present disclosure to mimic each of the three primary weather perspective workflows.

1) Guidance based weather symbology may use a 'location', a 'Weather Model Name' along with a specific 'Weather Model Run Date' and a 'Weather Model Run' to extract any weather forecast, initialized and produced any time of day, for either current running forecasts or historical weather forecasts. Along with that functionality, users may have shortcut codes, meaning a user may obtain the most current weather forecast for that 'Location', 'Weather Model Name' or 'Weather Model Run'. In addition, the Guidance based weather symbology structures may allow for either "specific" or "rolling" symbols, meaning a user can request a specific 'Weather Model Run Date' and/or specific 'Model Run' or "rolling". From that core information, the Guidance weather symbol can be further extended to include calendar, seasonal, monthly, weekly hourly or daily weather forecast data fields, for any specific location, for any weather forecast variable, for any preliminary estimated values such as "Yo complete" or 'Fast& Full' or progress, or pre-calculated values (e.g., "Change" from previous and/or "Anomaly/Difference" from Climatology) or Ensemble based statistics in the symbol itself. All of this weather information can then be easily combined in a manner consistent for data Analysis, Charting and/or aligning with other market data in either "Exchange Time" or "Interval Start" time. See FIG. 5 and the description herein for constructing the weather symbology.

2) Progression based weather symbology may use a 'location', a 'Weather Model Name' and an optional 'Weather Model Run' to extract all weather forecasts initialized and produced for a specific "target Date". The Progression based weather symbols can accommodate any weather forecast, produced any time of day, for current running forecasts and historical weather forecasts. Along with the functionality users may have shortcut codes, meaning a user may obtain the most current weather forecast for that 'Location', 'Weather Model Name' or 'Weather Model Run'. In addition, the Progression based weather symbology structure may allow for either "specific" or 'rolling symbols', meaning a user can request a specific or rolling 'Target Dates'. From that core information, the Progression weather symbol can be further extended to include calendar, seasonal, monthly, weekly daily or hourly weather forecast data, for any specific location, for any weather forecast variable, for any preliminary estimated values such as "Yo complete" or 'Fast& Full' or Progress or pre-calculated values (e.g., "Change" from previous and/or "Anomaly/Difference" from Climatology) or Ensemble based statistics in the symbol itself All of this weather information can then be easily combined in a manner consistent for data Analysis, Charting and/or aligning with other market data in either "Exchange Time" or "Interval Start" time. See FIGS. 6A-6C.

3) Accuracy based weather symbology may use a 'location', a 'Weather Model Name' and an optional Weather Model Run' to extract all weather forecasts produced for a specific time in the future "Forecast Valid Day or Model Hour". This symbol may use the "!" for a rolling notation, so the user can always extract a particular 'Forecast Valid Day' in the future. For example a 'Day 1' may be a different "Date" with each new 'Weather Model Run Date', so Day 1 is rolling. The Accuracy based weather symbols can accommodate any weather forecast, produced any time of day, and operate during current running forecasts and historical weather forecasts. In addition the Accuracy based weather symbology structure may allow for 'rolling symbols' related to a "Forecast Valid Day" (e.g., as opposed to a specific 'Forecast Valid Date'/like used in a Progression's 'Target Date'). From that core information, returned from the weather symbology, the Accuracy weather symbol can be further extended to include, for example, calendar, seasonal, monthly, weekly daily or hourly weather forecast data, for any specific location, for any weather forecast variable, for any 'Fast& Full' or Progress, or Ensemble based statistics in the symbol itself. All of this weather information can then be easily combined in a manner consistent for data Analysis, Charting and/or aligning with other market data in either "Exchange Time" or "Interval Start" time. See FIGS. 7A and 7B.

There are many sources of quality weather forecasts from various government entities, such as weather agencies, educational institutions, national research laboratories, military as well as private companies. The initial focus is from two primary government weather forecast entities; being the American government NOAA and European government ECMWF. Each of the two entities produces multiple weather forecast products (a few examples of these weather forecast models include GFS, GFS ENS, GFS ENS EXT, CFS ENS, ECMWF, ECMWF ENS, and ECMWF ENS EXT, SEAS, SEAS EXT), which generally have the greatest influence on market prices related to numerous traded instruments around the globe. Four of these weather forecast models are from the United States (GFS, GFS ENS, GFS ENS EXT, CFS ENS) and the remaining five (ECMWF, ECMWF ENS, ECMWF EXT, SEAS and SEAS EXT) are from Europe. Four of these weather Forecast Models are produced four times per day (Model Runs), the remaining five are produced in less frequent updates (e.g., daily or twice per week, etc..).

Tables 1 and 2 below include a list of weather forecast models and weather forecast variables which are included in the 'weather symbology' of the present disclosure. In particular, Table 1 illustrates an example list of weather forecast models for the weather symbology of the present disclosure. Table 2 illustrates an example list of weather forecast variables for the weather symbology of the present disclosure. In Table 2, H represents an Hourly variable and D represents a Daily variable.

The 'weather symbology' described in the present disclosure may be configured to operate with all nine of these example weather models, as well as any and all other weather forecasts, either in the public or private domain.

TABLE 1

Example list of weather forecast models for the weather symbology
CITY FORECAST DATA

| Weather Model Name | Code | Spatial Resolution | Domain | Model Runs | Forecast Duration | Temporal Resolution |
|---|---|---|---|---|---|---|
| GFS | GFS | ¼ degree (aka 18 mile/ 28 km grid) | Global Forecast | 0z, 6z, 12z, 18z | 16 days 0-384 hrs | Hourly - 120 3 hr 121-384 |
| GFS Ensemble | GEFS | ¼ degree (aka 18 mile/ 28 km grid) | Global Forecast | 0z, 6z, 12z, 18z | 16 days 0-384 hrs | 3 hr- 192 6 hr 198-384 |
| ECMWF | ECM | ¼ degree (aka 18 mile/ 28 km grid) | Global Forecast | 0z, 12z | 10 days 0-240 hrs | Hourly - 90 3 hr 93-144 6 hr 150-240 |
| ECMWF | ECM | ¼ degree (aka 18 mile/ 28 km grid) | Global Forecast | 6z, 18z | 10 days 0-240 hrs | Hourly - 90 |
| ECMWF ENS | ECE | ¼ degree (aka 18 mile/ 28 km grid) | Global Forecast | 6z, 18z | 15 days 0-360 hrs | Hourly - 90 3 hr 93-144 |
| ECMWF ENS | ECE | ¼ degree (aka 18 mile/ 28 km grid) | Global Forecast | 0z, 12z | 15 days 0-360 hrs | Hourly 90 3 hr 93-144 6 hr 150-360 |
| ECMWF ENS EXT | ECMR | ¼ degree (aka 18 mile/ 28 km grid) | Global Forecast | 2x per week Monday & Thursday | 16-46 days | Daily |
| CFS | CFS | ½ degree | Global Forecast | 0z only | 0-9 months | Daily |
| SEAS | SEAS | ¼ degree (aka 18 mile/ 28 km grid) | Global Forecast | 1x month | 0-7 months | Daily |

TABLE 2

Example (non-limiting) list of a weather forecast variables for the weather symbology.

| Time Frame | Field Name | Front End Long | Short |
|---|---|---|---|
| | | WEATHER META DATA SPECIFICS | |
| | Time | Receipt Time | Receipt Time |
| | nstime | Nstime | nstime |
| | ns_exchange time | ns_exchange time | ns_exchange time |
| | Line_id | Line_id | Line_id |
| | sequence_number | sequence_number | sequence_number |
| | sequence_series | sequence_series | sequence_series |
| | flags | Flags | flags |
| | utcdatetime | UTC Forecast Valid Date and Forecast Valid Tme | UTC Date and Time |
| | localdatetime | LOCAL Forecast Valid Date and Forecast Valid Tme | Local Date and Time |
| | fastvfull | Ensemble Member fast vs full | ENS Fast or Full |
| | filetime | File Time | File Time |
| | location | Location | Location |
| | Model | Forecast Model Name | Model Name |
| | modeldate | Model Run Date | MR Date |
| | modelrun | Forecast Model Run | MR |
| | forecasthour | Forecast Model Hour | Mhr |
| | interpolated | Interpolated Value | Intrpl |
| | blended | Forecast and METAR are Blended | Blended |
| | localdate | Local Date | Local Date |
| | localhour | Local Hour | Local Hr |
| | ensemblevariable | Ensemble Variable | Ens Varbl |
| | utcdate | UTC Date | UTC Date |
| | utchour | UTC Hour | UTC Hr |
| | localforecastday | Local Forecast Day | Local Day |
| | percentcomplete | Percent Complete | % Comp |
| | | LIQUID PRECIPITATION | |
| H | APCP | Accum Precip 6 hr reset | APCP |
| H | APCPNO | Accum Precip hourly Interpolated | AccPrecip H Intrpl |
| D | DAYPRECIP | Daily Precipitation | Daily Precip |
| D | DAYPRECIP_Chng_6 h | Daily Precip 6 Hr Change | D Precip 6 hr CHG |
| D | DAYPRECIP_Chng_12 h | Daily Precip 12 Hr Change | D Precip 12 hr CHG |
| D | DAYPRECIP_Chng_18 h | Daily Precip 18 Hr Change | D Precip 18 hr CHG |
| D | DAYPRECIP_Chng_24 h | Daily Precip 24 Hr Change | D Precip 24 hr CHG |
| D | DAYPRECIP_Diff_10 YAvg | Daily Precip 10 yr Anomaly | D Precip 10 yr ANOM |
| D | DAYPRECIP_Diff_15 YAvg | Daily Precip 15 yr Anomaly | D Precip 15 yr ANOM |
| D | DAYPRECIP_Diff_30 YAvg | Daily Precip 30 yr Anomaly | D Precip 30 yr ANOM |
| D | DAYPRECIP_Diff_30 YClimo | Dally Precip Official 30 yr Anomaly | D Precip o30 yr ANOM |
| | | SNOW & RUNOFF | |
| H | WATR | Snow Water Runoff | SWRO |
| H | WATRNO | Snow Water Runoff Hourly interpolated | Runoff H Intrpl |
| D | DAYWATR | Daily Snow Water Runoff | D Runoff |
| D | WEASD | Snow Water Equivalent | SWE |
| H | WEASDNO | Snow Water Equivalent Hourly Interpolated | SWE H Intrpl |
| D | DAYWEASD | Daily Snow Water Equivalent | D SWE |
| H | SNOD | Snow Depth | SD |
| D | SNOD_Avg | Daily Avg Snow Depth | Avg SD |
| | | SOLAR | |
| H | DLWRF | Downward Long Wave Radition Flux | Long Wave Rad |
| H | DLWRFNO | Downward Long Wave Radition Flux Hourly interpolated | LWRad H intrpl |
| D | DLWRF_Avg | Downward Long Wave Radition Flux Daily Avg | LWRad D |
| H | DSWRF | Downward Short Wave Radition Flux | Short Wave Rad |
| H | DSWRFNO | Downward Short Wave Radition Flux Hourly Interpolated | SWRad H Intrpl |
| D | DSWRF_Avg | Downward Short Wave Radition Flux Daily Avg | SWRad D |
| H | GFLUX | Surface Ground Heat Flux W/m^2 | Grnd Heat Flux |
| H | GFLUXNO | Surface Ground Heat Flux W/m^2 Hourly Intrpl | Grnd Heat Flux H Intrpl |

TABLE 2-continued

Example (non-limiting) list of a weather forecast variables for the weather symbology.

| Time Frame | Field Name | Front End Long | Short |
|---|---|---|---|
| H | WILT | Wilt hourly | H Wilt |
| D | WILT_Avg | Daily Avg Surface Ground Heat Flux W/m^2 | DAvg Gmd Heat Flux |
| WIND SPEED & DIRECTION | | | |
| H | GUST | Wind Gust max per hour | Gust hr |
| H | WINDS_10 m | 10 Meter Wind Speed | 10M W Speed |
| H | WINDD_10 m | 10 Meter Wind Direction | 10M W Dir |
| H | TMP_80 m | 80M Temp | 80 m T |
| H | PRES_80 m | 80 m Pressure | 80 m Pres |
| H | SPFH_80 m | 80M Specific Humidity | 80 m SpcH |
| H | WINDS_80 m | 80M Wind Speed | 80 m WS |
| H | WINDD_80 m | 89M Wind Direction | 80 m WD |
| AGRICULTURE | | | |
| D | GUST_D_MAX | Daily Avg Wilt | Davg Wilt |
| H | SOILW_0_0.1 m | Soil Moisture 0 cm 100 cm deep | Soil Mo 0-100 cm |
| D | SOILW_0_0.1 m_Avg | Daily Avg Soil Moisture 0 cm-100 cm deep | DAvg Soil Mo 0-100 cm |
| H | SOILW_0.1_0.4 m | Soil Moisture 100 cm-400 cm deep | Soil Mo 100 cm-400 cm |
| D | SOIlW_0.1_0.4 m_Avg | Daily Avg Soil Moisture 100 cm-400 cm deep | DAvg Soil Mo 100 cm-400 cm |
| H | SOILW_0 4_1 m | Soil Moisture 400 cm-1 m deep | Soil Mo 400 cm-1 m |
| D | SOILW_0.4_1 m_Avg | Daily Avg Soil Moisture 400 cm-1 m deep | DAvg Soil Mo 400 cm-1 m |
| H | SOILW_1_2 m | Soil Moisture 1 m-2 m deep | Soil Mo 1 m-2 m |
| D | SOILW_1_2 m_Avg | Daily Avg Soil Moisture 1 m-2 m deep | DAvg Sod Mo 1 m-2 m |
| H | TSOIL_0_0.1 m | Soil Temp 0 cm-100 cm deep | Soil T 0-100 cm |
| D | TSOIL_0_0.1 m_Avg | Daily Avg Soil Temp 0 cm-100 cm deep | DAvg Soil T 0-100 cm |
| H | TSOIL_0.1_0.4 m | Soil Temp 100 cm-400 cm deep | Soil T 100 cm-400 cm |
| D | TSOIL_0.1_0.4 m_Avg | Daily Avg Soil Temp 100 cm-400 cm deep | DAvg Soil T 100 cm-400 cm |
| H | TSOIL_0.4_1 m | Soil Temp 400 cm-1 m deep | Soil T 400 cm-1 m |
| D | TSOIL_0.4_1 m_Avg | Daily Avg Soil Temp 400 cm-1 m deep | DAvg Soil T 400 cm-1 m |
| H | TSOIL_1_2 m | Soil Temp 1 m-2 m deep | Soil T 1 m-2 m |
| D | TSOIL_1_2 m_Avg | Daily Avg Soil Temp 1 m-2 m deep | DAvg Soil T 1 m-2 m |
| SKY & SURFACE - HOURLY | | | |
| H | TCDC_ALL | Total Cloud Cover entire atmosphere | Cloud All |
| H | TCDC_HIGH | Total Cloud Cover highest level | Cloud High |
| H | TCDC_LOW | Total Cloud Cover lowest level | Cloud Low |
| H | TCDC_MID | Total Cloud Cover mid level | Cloud Mid |
| H | PRMSL | Mean Sea Level Pressure | MSLP |
| H | VIS | Visibility | Vis |
| H | DPT_2 m | 2M Dew Point | 2 m DP |
| H | RH_2 m | 2M Relative Humidity | 2 m RH |
| H | SPFH_2 m | Specific Humidity | Spec Hum |
| H | TMP_Hourly_2 m | 2M Hourly Temp | 2 mT Hourly |
| H | TMP_Hourly_2 m_Chng_12 h | 2M Hourly Temp 12 Hr Change | 2 m hrT 12 hr CHG |
| H | TMP_Hourly_2 m_Chng_18 h | 2M Hourly Temp 18 Hr Change | 2 m hr T 18 hr CHG |
| H | TMP_Hourly_2 m_Chng_24 h | 2M Hourly Temp 24 Hr Change | 2 m hr T 24 hr CHG |
| H | TMP_Hourly_2 m_Chng_6 h | 2M Hourly Temp 6 Hr Change | 2 m hr T 6 hr CHG |
| SKY & SURFACE DAILY | | | |
| D | TMP_D_Avt_2 m | 2M Daily Avg Temp | 2 m DAvgT |
| D | TMP_D_Avg_2 m_Chng_6 h | 2M Daily Avg Temp 6 Hr Change | 2 m DAvgT 6 hr CHG |
| D | TMP_D_Avg_2 m_Chng_12 h | 2M Daily Avg Temp 12 Hr Change | 2 m DAvg T 12 hr CHG |
| D | TMP_D_Avg_2 m_Chng_18 h | 2M Daily Avg Temp 18 Hr Change | 2 m DAvg T 18 hr CHG |
| D | TMP_D_Avg_2 m_Chng_24 h | 2M Daily Avg Temp 24 Hr Change | 2 m DAvg T 24 hr CHG |
| D | TMP_D_Avg_2 m_Diff_10 YAvg | 2M Daily Avg Temp 10 yr Anomaly | 2 m DAvg T 10 yr ANOM |
| D | TMP_D_Avg_2 m_Diff_15 YAvg | 2M Daily Avg Temp 15 yr Anomaly | 2 m DAvg T 15 yr ANOM |
| D | TMP_D_Avg_2 m_Diff_30 YAvg | 2M Daily Avg Temp 30 yr Anomaly | 2 m DAvg T 30 yr ANOM |

TABLE 2-continued

Example (non-limiting) list of a weather forecast variables for the weather symbology.

| Time Frame | Field Name | Front End Long | Short |
|---|---|---|---|
| D | TMP_D_Avg_2 m_Diff_o30 YClimo | 2M Daily Avg Temp Official30 yr Anomaly | 2 m DAvg T o30 yr ANOM |
| D | TMP_D_MAX_2 m | 2M Daily Max Temp | 2 mD_XT |
| D | TMP_D_MAX_2 m_Chng_6 h | 2M Daily Max Temp 6 Hr Change | 2 mD_XT 6 hr CHG |
| D | TMP_D_MAX_2 m_Chng_12 h | 2M Daily Max Temp 12 Hr Change | 2 mD_XT 12 hr CHG |
| D | TMP_D_MAX_2 m_Chng_18 h | 2M Daily Max Temp 18 Hr Change | 2 mD_XT 18 hr CHG |
| D | TMP_D_MAX_2 m_Chng_24 h | 2M Daily Max Temp 24 Hr Change | 2 mD_XT 24 hr CHG |
| D | TMP_D_MAX_2 m_Diff_10 YAvg | 2M Daily Max Temp 10 yr Anomaly | 2 mD_XT 10 yr ANOM |
| D | TMP_D_MAX_2 m_Diff_15 YAvg | 2M Daily Max Temp 15 yr Anomaly | 2 mD_XT 15 yr ANOM |
| D | TMP_D_MAX_2 m_Diff_30 YAvg | 2M Daily Max Temp 30 yr Anomaly | 2 mD_XT 30 yr ANOM |
| D | TMP_D_MAX_2 m_Diff_30 YClimo | 2M Daily Max Temp Official30 yr Anomaly | 2 mD_XT o30 yrANOM |
| D | TMP_D_Min_2 m | 2M Daily Min Temp | 2 mD_NT |
| D | TMP_D_Min_2 m_Chng_12 h | 2M Daily Min Temp 12 Hr Change | 2 mD_NT 12 hrCHG |
| D | TMP_D_Min_2 m_Chng_18 h | 2M Daily Min Temp 18 Hr Change | 2 mD_NT 18 hr CHG |
| D | TMP_D_Min_2 m_Chng_24 h | 2M Daily Min Temp 24 Hr Change | 2 mD_NT 24 hrCHG |
| D | TMP_D_Min_2 m_Chng_6 h | 2M Daily Min Temp 6 Hr Change | 2 mD_NT 6 hr CHG |
| D | TMP_D_Min_2 m_Diff_10 YAvg | 2M Daily Min Temp 10 yr Anomaly | 2 mD_NT 10 yr ANOM |
| D | TMP_D_Min_2 m_Diff_15 YAvg | 2M Daily Min Temp 15 yr Anomaly | 2 mD_NT 15 yr ANOM |
| D | TMP_D_Min_2 m_Diff_30 YAvg | 2M Daily Min Temp 30 yr homely | 2 mD_NT 30 yr ANOM |
| D | TMP_D_Min_2 m_Diff_30 YClimo | 2M Daily Min Temp Official30 yr Anomaly | 2 mD_NT o30 yANOM |
| DEGREE DAYS - DAILY | | | |
| D | HDD | Heating Degree Day 65 degrees | HDD |
| D | CDD | Cooling Degree Day 65 degrees | CDD |
| | Gas Weeks HDD_NG Wks | Heating Degree Day 65 degrees (NGwk) | HDD NGwk |
| | Gas Weeks CDD NG WKs | Cooling Degree Day 65 degrees (NGwh| | CDD NGwk |
| D | GWDD | GWDD | GWDD |
| D | GWDD_Chng_6 h | GWDD 6 Hr Change | GWDD 6 hr CHG |
| D | GWDD_Chng_12 h | GWDD 12 Hr Change | GWDD 12 hr CHG |
| D | GWDD_Chng_18 h | GWDD 18 Hr Change | GWDD 18 hr CHG |
| D | GWDD_Chng_24 h | GWDD 24 Hr Change | GWDD 24 hr CHG |
| D | GWDD_Diff_10 YAvg | GWDD 10 yr Anomaly | GWDD 10 yr ANOM |
| D | GWDD_Diff_15 YAvg | GWDD 15 yr Anomaly | GWDD 15 yr ANOM |
| D | GWDD_Diff_30 YAvg | GWDD 30 yr Anomaly | GWDD 30 yr ANOM |
| D | GWDD_Diff_o30 YAvgDlFF | GWDD Official 30 yr Anomaly | GWDD o30 yrANOM |
| | Gas Weeks GWDD_NG WKs | Gas Weighted Temp (NG weeks) | GW Temp (NGwk) |
| | Gas Weeks GWDD_Chng 6 h_NG WKs | Gas Weighted Temp 12 Hr CHNG (NGwk) | GW T 12 hr CHG (NGwk) |
| | Gas Weeks GWDD_Chng 12 h_NG WKs | Gas Weighted Temp 18 Hr CHNG (NGwk) | GW T 18 hr CHG (NGwk) |
| | Gas Weeks GWDD_Chng 18 h_NG WKs | Gas Weighted Temp 24 Hr CHNG (NGwk) | GW T 24 hr CHG (NGwk) |
| | Gas Weeks GWDD_Chng 24 h_NG WKs | Gas Weighted Temp 6 Hr CHNG (NGwk) | GW T 6 hr CHG (NGwk) |
| | Gas Weeks GWDD_Diff_10 YAvg_NG WKs | Gas Weighted Temp 10 yr Anomaly (NGwk) | GW T 10 yr ANOM (NGwk) |
| | Gas Weeks GWDD_Diff_15 YAvg_NG WKs | Gas Weighted Temp 15 yr Anomaly (NGwk) | GW T 15 yr ANOM (NGwk) |
| | Gas Weeks GWDD_Diff_30 YAvg_NG WKs | Gas Weighted Temp 30 yr Anomaly (NGwk) | GW T 30 yr ANOM (NGwk) |
| | Gas Weeks GWDD_Diff_o30 YAvgDlFF_NG WKs | Gas Weighted Temp Official 30 yr Anomaly (NGwk) | GW T o30 yr ANOM (NGwk) |
| D | GWAvgT | Gas Weighted Daily Avg Temp | GW Avg Temp |
| D | GWAvgT_Chng_12 h | Gas Weighted Avg Tamp 12 Hr CHNG | GW AvgT 12 hr CHG |
| D | GWAvgT_Chng_18 h | Gas Weighted Avg Tamp 18 Hr CHNG | GW AvgT 18 hr CHG |

TABLE 2-continued

Example (non-limiting) list of a weather forecast variables for the weather symbology.

| Time Frame | Field Name | Front End Long | Short |
|---|---|---|---|
| D | GWAvgT_Chng_24 h | Gas Weighted Avg Temp 24 Hr CHNG | GW AvgT 24 hr CHG |
| D | GWAvgT_Chng_6 h | Gas Weighted Avg Temp 6 Hr CHNG | GW AvgT 6 hr CHG |
| D | GWAvgT_Diff_10 YAvg | Gas Weighted Avg Temp 10 yr Anomaly | GW AvgT 10 yr ANOM |
| D | GWAvgT_Diff_15 YAvg | Gas Weighted Avg Temp 15 yr Anomaly | GW AvgT 15 yr ANOM |
| D | GWAvgT_Diff_30 YAvg | Gas Weighted Avg Tamp 30 yr Anomaly | GW AvgT 30 yr ANOM |
| D | GW AvgT_Diff_o30 VAvgDIFF | Gas Weighted Avg Temp Official 30 yr Anomaly | GW AvgT o30 yr ANOM |
| Gas Weeks | GWAvgT_NG WKs | Gas Weighted Avg Temp (NG weeks) | GW Avg Temp (NGwk) |
| Gas Weeks | GWAvgT_Chng_12 h_NC WKs | Gas Weighted Avg Temp 12 Hr CHNG (NGwk) | GW AvgT 12 hr CHG (NGwk) |
| Gas Weeks | GWAvgT_Chng_18 h_NG WKs | Gas Weighted Avg Temp 18 Hr CHNG (NGwkl | GW AvgT 18 hr CHG (NGwk) |
| Gas Weeks | GWAvgT.Chng_24 h.NG WKs | Gas Weighted Avg Temp 24 Hr CHNG (NGwk| | GW AvgT 24 hr CHG (NGwk) |
| GM Weeks | GWAvgT Chng_6 h NG WKs | Gas Weighted Avg Temp 6 Hr CHNG (NGwk) | GW AvgT 6 hr CHG (NGwk) |
| Gas Weeks | GWAvgT_Diff_10 YAvg_NG WKs | Gas Weighted Avg Tamp 10 yr Anomaly (NGwb| | GW AvgT 10 yr ANOM (NGwk) |
| Gas Weeks | GWAvgT_Diff_15 YAvg_NG WKt | Gas Weighted Avg Temp 15 yr Anomaly (NGwk) | GW AvgT 15 yr ANOM (NGwk) |
| Gas Weeks | GWAvgT_Diff_30 YAvg_NG WKt | Gas Weighted Avg Temp 30 yr Anomaly (NGwk) | GW AvgT 30 yr ANOM INGwk) |
| Gas Weeks | GWAvgT_Diff_o30 YAvgDIFF_NG WKs | Gas Weighted AvgTemp Official 30 yr Anomaly (NGwk) | GW AvgT o30 yr ANOM (NGwk) |
| D | GWMaxT | Gas Weighted Max Temp | GW Max Temp |
| D | GWMaxT_Chng_12 h | Gas Weighted Max Temp 12 Hr CHNG | GW XT 12 hr CHG |
| D | GWMaxT_Chng_18 h | Gas Weighted Max Temp 18 Hr CHNG | GW XT 18 hr CHG |
| D | GWMaxT_Chng_24 h | Gas Weighted Max Temp 24 Hr CHNG | GW XT 24 tM CHG |
| D | GWMaxT_Chng_6 h | Gas Weighted Max Temp 6 Hr CHNG | GW XT 6 hr CHG |
| D | GWMaxT_Diff_10 YAvg | Gas Weighted Max Temp 10 yr Anomaly | GW XT 10 yr ANOM |
| D | GWMaxT_Diff_15 YAvg | Gas Weighted Max Temp 15 yr Anomaly | GW XT 15 yr ANOM |
| D | GWMaxT_Diff_30 YAvg | Gas Weighted Max Temp 30 yr Anomaly | GW XT 30 yr ANOM |
| D | GWMaxT_Diff_o30 YAvgDIFF | Gas Weighted Max Temp Official 30 yr Anomaly | GW XT o30 yr ANOM |
| Gas Weeks | GWMaxT_NG WKs | Gas Weighted Max Temp (NG weeks) | GW Max Temp (NGwk) |
| Gas Weeks | GWMaxT_Chng_12 h.NG WKs | Gas Weighted Max Temp 12 Hr CHNG (NGwk) | GW XT 12 hr CHG (NGwk) |
| Gas Weeks | GWMaxT_Chng18 h.NG WKs | Gas Weighted Max Temp 18 Hr CHNG (NGwk) | GW XT 18 hr CHG (NGwk) |
| Gas Weeks | GWMaxT_Chng_24 h.NG WKt | Gas Weighted Max Temp 24 Hr CHNG (N6 wk) | GW XT 24 hr CHG (NGwk) |
| Gas Weeks | GWMaxT_Chng_6 h.NG WKs | Gas Weighted Max Temp 6 Hr CHNG (NGwk) | GW XT 6 hr CHG (NGwk) |
| Gas Weeks | GWMaxT_Diff_10 YAvg_NG WKs | Gas Weighted Max Temp 10 yr Anomaly INGwk) | GW XT 10 yr ANOM (NGwk) |
| Gas Weeks | GWMaxT_Diff_15 YAvg_NG WKs | Gas Weighted Max Temp 15 yr Anomaly (NGwk) | GW XT 15 yr ANOM INGwk) |
| Gas Weeks | GWMaxT_Diff_30 YAvg_NG WKs | Gas Weighted Max Temp 30 yr Anomaly (NGwk) | GW XT 30 yr ANOM (NGwk) |
| Gas Weeks | GWMaxT_Diff_o30 YAvgCLIMO_NG WKs | Gas Weighted Max Temp Official 30 yr Anomaly (NGwk) | GW XT o30 yr ANOM (NGwk) |
| D | GWMinT | Gas Weighted Min Temp | GW Min Temp |
| D | GWMinT_Chng_12 h | Gas Weighted Min Temp 12 Hr CHNG | GW NT 12 hr CHG |
| D | GWMinT_Chng_18 h | Gas Weighted Min Temp 18 Hr CHNG | GW NT 18 hr CHG |
| D | GWMinT_Chng_24 h | Gas Weighted Min Temp 24 Hr CHNG | GW NT 24 hr CHG |
| D | GWMinT_Chng_6 h | Gas Weighted Min Temp 6 Hr CHNG | GW NT 6 hr CHG |
| D | GWMinT_Diff_10 YAvg | Gas Weighted Min Temp 10 yr Anomaly | GW NT 10 yr ANOM |

TABLE 2-continued

Example (non-limiting) list of a weather forecast variables for the weather symbology.

| Time Frame | Field Name | Front End Long | Short |
|---|---|---|---|
| D | GWMinT_Diff_15 YAvg | Gas Weighted Min Temp 15 yr Anomaly | GW NT 15 yr ANOM |
| D | GWMinT_Diff_30 YAvg | Gas Weighted Min Temp 30 yr Anomaly | GW NT 30 yr ANOM |
| D | GWMinT_Diff_o30 YAvgDIFF | Gas Weighted Min Temp Official 30 yr Anomaly | GW NT o30 yr ANOM |
| | Gas Weeks GWMinT_NG WKs | Gas Weighted Min Temp (NG weeks) | GW Min Temp (NGwk) |
| | Gas Weeks GWMinT_Chng_12 h_NG WKs | Gas Weighted Min Temp 12 Hr CHNG (NGwk) | GW NT 12 hr CHG (NGwk) |
| | Gas Weeks GWMinT_Chng_18 h_NG WKs | Gas Weighted Min Temp 18 Hr CHNG (NGwk) | GW NT 18 hr CHG (NGwk) |
| | Gas Weeks GWMinT_Chng_24 h_NG WKs | Gas Weighted Min Temp 24 Hr CHNG (NGwk) | GW NT 24 hr CHG (NGwk) |
| | Gas Weeks GWMinT_Chng_6 h_NG WKs | Gas Weighted Min Temp 6 Hr CHNG (NGwk) | GW NT 6 hr CHG (NGwk) |
| | Gas Weeks GWMinT_Diff_10 YAvg_NG WKs | Gas Weighted Min Temp 10 yr Anomaly (NGwk) | GW NT 10 yr ANOM (NGwk) |
| | Gas Weeks GWMinT_Diff_15 YAvg_NG WKs | Gas Weighted Min Temp 15 yr Anomaly (NGwk) | GW NT 15 yr ANOM (NGwk) |
| | Gas Weeks GWMinT_Diff_30 YAvg_NG WKs | Gas Weighted Min Tamp 30 yr Anomaly (NGwk) | GW NT 30 yr ANOM (NGwk) |
| | Gas Weeks GWMinT_o30AvgDIFF_NG WKs | Gas Weighted Min Temp Official 30 yr Anomaly (NGwk) | GW NT o30 yr ANOM [NGwk] |

Components of DID system 102 (FIG. 1) and/or weather integration server 116 (FIG. 2) of the present disclosure may be embodied on a single computing device. In other examples, components of DID system 102 and/or weather integration server 116 may be embodied on two or more computing devices distributed over several physical locations, connected by one or more wired and/or wireless links. It should be understood that DID system 102 of the present disclosure refers to a computing system having sufficient processing and memory capabilities to perform the specialized functions described herein.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

Figure 3B:
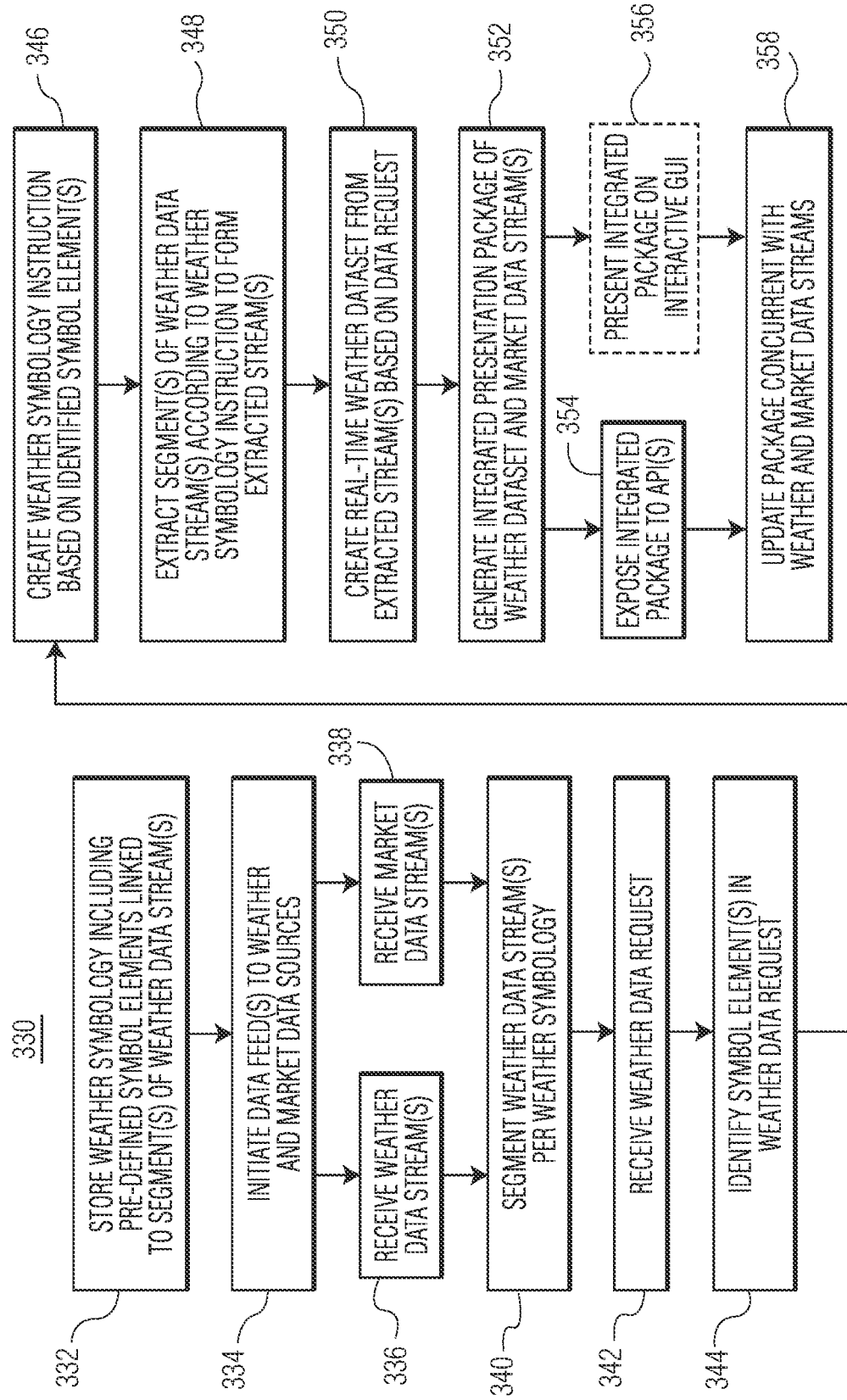
FIG. 3B is a flowchart diagram of an example method of generating integrated weather and market data for streaming data, according to another aspect of the present disclosure.

Those skilled in the art will appreciate that DID system 102 (of FIG. 1) may be configured with more or less components to conduct the methods described herein with reference to FIGS. 3A and 3B. The methods described herein (that may be conducted by DID system 102 of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components associated with components 204-216 of weather integration server 116 of FIG. 2. With respect to FIGS. 3A and 3B, although these flowcharts may illustrate a specific order of method steps, it is understood that the illustrated methods are exemplary, and that the order of these steps may differ. Also, in some examples, two or more steps may be performed concurrently or with partial concurrence.

FIG. 3A is a flowchart diagram of an example method 300 of generating integrated weather and market data associated with data distribution environment 100 of FIG. 1, and weather integration server 116 and time series server 118 of FIG. 2, according to an aspect of the present disclosure.

At step 302, weather integration server 116 may store a pre-defined weather symbology (e.g., in storage 214). The weather symbology may include one or more pre-defined symbol elements, one or more variables and one or more pre-defined rules for combining and/or arranging elements among the symbol elements to form a weather symbology instruction having a pre-defined instruction structure. As discussed herein, the inclusion of one or more symbol elements in the pre-defined instruction structure may be used to create a variety of weather symbology instructions. In general, a weather symbology instruction may include symbol elements including at least one weather observation location, a weather structure (such as a weather perspective) and weather forecast model information. The weather symbology instruction may include additional variable information (such as condition(s) and/or function(s)) for generating desired weather forecast/observations data that may be integrated with market data, and that may provide actionable knowledge. In some examples, the symbol elements may be linked to different segments of weather data stream(s) associated with weather data source(s) 104.

At step 304, data collector 112 may collect weather data among weather data source(s) 104. In some examples, the weather data may include weather observations data for one or more observation locations and weather forecast model data for one or more weather forecast models (including, in some examples, different model runs). At step 306, data collector 112 may collect market data among market data source(s) 106. In some examples, collected weather data (step 304) may be distributed to weather integration server 116 and collected market data (step 306) may be distributed to time series server 118 (e.g., by data feed distributor 114).

In some examples, weather integration server 116 may segment the collected weather data (step 304) into one or more segments based on the weather symbology (stored in step 302). It is understood that both the weather data and the market data may change over time and that steps 304 and 306 may include repeatedly collecting the weather and market data respectively, as the corresponding data changes. It is also understood that updates to the weather data may occur at different frequencies than updates to the market data. In some examples, the collection of weather and market data (steps 304 and 306) may include the capture of (real-time) weather data stream(s) and (real-time) market data stream(s) (e.g., via one or more data feeds).

At step 308, DID system 102 may generate interactive GUI 120 including weather impact dashboard 122 for display on user device(s) 108. In some examples, a configuration of weather impact dashboard 122 may depend on an underlying client application/service 126 for which it is launched (e.g., a trading desktop, a mobile application, a spreadsheet application, an API, etc.). At step 310, time series server 118 may receive a weather data request (e.g., data request 224) from user device(s) 108 via interactive GUI 120.

At step 312, time series server 118 may determine a weather symbology instruction based on the received weather data request (step 310). In some examples, the weather data request may directly include the weather symbology instruction. In some examples, time series server 118 may convert the weather data request into the weather symbology instruction having the pre-defined instruction structure, in accordance with the pre-defined rules and pre-defined symbology elements (step 302) stored in storage 214.

At step 314, time series server 118 may determine a pre-defined weather structure (e.g., a perspective) from the weather symbology instruction (determined in step 312). At step 316, time series server 118 may create a weather forecast (and/or observations) dataset (also referred to as weather forecast/observations dataset) from among the collected weather data, based on the weather symbology instruction including the weather structure indicated in the weather symbology instruction. For example, time series server 118 may obtain the corresponding weather perspective among the weather structure(s) (from storage 216), and may extract at least a portion of the segmented weather data 218 (from among the collected observation data and at least a portion of the weather forecast model data) based on the symbol elements/variable(s) in the weather symbology instruction. The extracted weather forecast/observation(s) data associated with the weather symbology instruction and any other data and/or information associated with the corresponding weather structure may then form the weather forecast/observations dataset. The weather forecast/observations dataset may also be formed as a function of exchange time and interval time, for ease of integration with the collected market data.

At step 318, time series server 118 may generate an integrated presentation package comprising a combination of the weather forecast/observations dataset (step 316) and a portion of the collected market data (step 306), configured in such a manner so that the weather forecast/observations dataset is integrated with the portion of the collected market data. At step 320, the integrated presentation package (step 318) may be presented on interactive GUI 120 via weather impact dashboard 122. In some examples, the integrated presentation package may be presented in such a manner to permit user interaction, including, in some examples, user-customization of the integrated presentation package. At optional step 322, DID system 102 may expose the integrated presentation package to one or more APIs. In some examples, step 320 may not be performed and step 322 may be performed instead. In some examples, steps 308 may not be performed and step 310 may include receiving a weather data request via user device(s) 108, without being received via an interactive GUI (e.g., via client application(s)/service(s) 126).

At step 324, the integrated presentation package may be updated (e.g., on weather impact dashboard 122, via one or more APIs) concurrent with changes to the weather data, the market data and/or user input (including changes in real-time). In some examples, the weather and market data may each include real-time data streams, such that steps 318 and 320 (and/or optional step 322) may generate and present the presentation package in real-time, using real-time streaming data.

FIG. 3B is a flowchart diagram of an example method 330 of generating integrated weather and market data for streaming data associated with data distribution environment 100 of FIG. 1, and weather integration server 116 and time series server 118 of FIG. 2, according to an aspect of the present disclosure.

At step 332, a pre-defined weather symbology may be stored, for example, in storage 214. As described herein, the weather symbology may include pre-defined symbol elements that may be linked to one or more segments of one or more weather data streams. In some examples, storage 214 may also store one or more rules for generating weather symbology instruction(s). In some examples, DID system 102 may include a pre-defined market symbology, similar to the weather symbology, that may be linked to one or more segments of one or more market data streams.

At step 334, one or more data feeds to weather data source(s) 104 and market data source(s) 106 may be initiated, for example, via data collector 112. In example method 330, weather data source(s) 104 and market data source(s) 106 may provide streaming data via corresponding data feed(s). In some examples, data collector 112 may also receive other data/information from among weather data source(s) 104 and market data source(s) 106 in a non-streaming manner, such as, periodically, in response to an event, condition and the like. At step 336, data collector 112 may receive one or more weather data streams from weather data source(s) 104 (via respective data feed(s) initiated in step 334). At step 338, data collector 112 may receive one or more market data streams from market data source(s) 106 (via respective data feed(s) initiated in step 334).

At step 340, the received weather data stream(s) (in step 336) may be segmented (e.g., separated and/or indexed), for example, by weather integration server 116, based on the weather symbology (stored in step 332), to form segmented (streaming) weather data. For example, the weather data stream(s) may be segmented in accordance with the (linked) pre-defined symbol elements. In this manner, a particular segment of the segmented weather data that is linked to a particular pre-defined symbol element may be extracted and the extracted (streaming) segment used to create an integrated presentation package, stream to user device(s) 108, provided to an external system for further analysis and the like. In some examples, time series server 118 may be configured to segment the received market data stream(s) into one or more segments based on a pre-defined market symbology.

At step 342, time series server 118 may receive a weather data request (e.g., via interactive GUI 120, via client application(s)/service(s) 126, etc.). At step 344, time series server 118 may identify one or more requested symbol elements (and in some examples, one or more variables) in the received weather data request (step 344). At step 346, time series server 118 may create at least one weather symbology instruction based on the identified symbol element(s) (and, in some examples any variables) as identified in step 344. In some examples, the received weather data request (step 342) may directly include in a weather symbology instruction, so that steps 344 and 346 may be skipped.

At step 348, time series server 118 may extract one or more segments of the segmented weather data stream(s) according to the weather symbology instruction (step 346) to form one or more extracted weather stream(s) associated with the weather symbology instruction. In particular, the identified symbol elements, that are linked to corresponding segments of the segmented weather data stream(s) may be used to extract particular segment(s) of the segmented weather data stream(s). In some examples, any variables (e.g., conditions, functions) in the weather symbology instruction may be used to further extract segment(s) and/or portion(s) of segment(s) of the segmented weather data stream(s).

At step 350, time series server 118 may create a real-time (streaming) weather dataset from the extracted weather stream(s), based on the weather data request (step 342). More particularly, a weather structure that may be indicated in the weather symbology instruction (determined from the weather data request) may be obtained from storage 216, and may be used to create the real-time weather dataset from the extracted weather stream(s). The real-time weather dataset may be formed as a function of exchange time and interval time, for ease of integration with the market data stream(s).

At step 352, time series server 118 may generate an integrated presentation package of the real-time weather dataset and one or more market data stream(s) (received at step 338). In some examples, time series server 118 may also extract one or more segments among similarly segmented market data stream(s) based on any market data symbology (e.g., indicated in the weather data request, based on pre-defined parameter(s) set by DID system 102, based on pre-defined parameter(s) indicated by the user, and the like).

At step 354. DID system 102 may expose the integrated presentation package to one or more APIs. At optional step 356, the integrated presentation package may be presented on weather impact dashboard of interactive GUI 120. In some examples, step 354 may not be performed and step 356 may be performed instead. In some examples, both steps 354 and 356 may be performed.

At step 358, the integrated presentation package may be updated (e.g., via one or more APIs, on weather impact dashboard 122, etc.) concurrent with changes to the weather data stream(s), the market data steam(s) and/or user input.

Referring to FIG. 3C, hierarchical diagram 360 illustrating example weather symbology 362 and use of weather symbology 362 to form various presentation packages 370 are shown. In general, weather symbology 362 may include one or more weather symbol elements 364 (e.g., weather model sources, weather model locations and weather functions also referred to as weather perspectives). Weather symbology 362 may also include one or more weather variables 366 (e.g., functions and/or conditions). Symbol element(s) 364 and weather variable(s) 366 may be linked to particular segments of one or more weather data streams. A combination of symbol element(s) 364 and weather variable(s) 366 may be arranged into at least one weather symbology instruction (having the instruction structure described herein) in order to extract the particular linked segments of the weather data stream(s) to form a weather dataset. Similarly, time series server 118 may use market data symbology 368 (symbol elements/variables associated with, for example, commodity prices, supply/demand data, equity prices, earning per share data, fixed income data, municipal bonds, etc.) to extract particular segments from market data stream(s). Time series server 118 may combine the weather dataset (from among weather symbology 362 and market data symbology 368) to form one or more presentation packages 370 (e.g., charts, watchlists, tables, grids, alerts, data feeds, data associated with object oriented programming languages (e.g., Python™), spreadsheet-formatted data (such as with RTD links), etc.). Presentation package(s) 370 may be presented to user device(s) 108 via client application(s) service(s) 126. In some examples, presentation packages(s) 370 may be further configured into one or more weather workbooks 372 (e.g., natural gas (North America (NA), Europe (EU)), power, global crude oil, etc.) for presentation on trade desktop 374.

In general, weather symbology 362 may be configured to instantly convert weather data into accurate and actionable knowledge, tailored specifically for traded instruments, via one or more (interactive) presentation packages. In some examples, weather data may be accessed in real-time suing weather symbology 362. Because of the weather symbology of the present disclosure, extremely large streams of weather and price data may be converted into Actionable Knowledge (such as presentation packages 370, weather workbooks 372 and the like). Of significance, weather symbology 362 provides a mechanism to rapidly break down streaming weather data into the smallest possible building blocks in a manner configured to be integrated with market data handled by time series server 118, and for interactive presentation on trading desktop 374. The actionable knowledge (e.g., components 370, 372) created by DID system 102 allows users to instantly and easily interact with both weather and price data streams (e.g., including through time and space). Still further, weather symbology 362 allows user to create any user-customizable weather display. In some examples, weather symbology 362 may be configured to treat weather data similar to a traded instrument, so that weather symbol element 364/weather variable 366 may be entered directly into a chart, table, watchlist, etc.. to view the weather data directly. Yet further, weather symbology 362 also allow the weather data to be accessed from multiple directions (e.g., three separate directions, catering to (in some examples) three primary weather workflows (e.g., guidance, progression and accuracy).

Description of Weather Symbology

Next, a detailed description of the weather symbology of the present disclosure is provided.
1) General: All symbols (also referred to as symbol elements) have the same basic structure. In general, a weather symbology instruction includes a same pre-defined weather symbology instruction structure:
   a. Location {space} Function {underscore}_Model Run {Dash}-Wx Model . {dot} field name
      i. EX: KORD MR0!_12z-GFS
      ii. wx variables can be added at the end of the weather symbol
      iii. 'Model Run' is an optional field
      iv. Dates are expressed as YYMMDD (2 digits each)

1. If a specific hour of the day (or model hour) is required, it accepts 1-3 digits:
   a. YYMMDDHHH
   v. Model runs (2 digits along with a "z", for example 06z)
   vi. Rolling Symbols have a bang "!"
2) Guidance (aka Model Runs): All weather symbols below can access any time aggregations such as seasonal, monthly, weekly and as an example both "Daily" weather forecast fields (e.g., days 1-16) or "Hourly" weather forecasts (e.g., model hours 1-384). See FIG. 5.
   a. ROLLING
      i. KORD MR0! (Model Run Now) is the current model (whatever wx model is running now, or the last model to run (if in between model runs). This instruction extracts the latest weather model which is coming in now or the last model to have run.
         1. EX: KORD MR0!-GFS
      ii. KORD MR0!_12z-GFS is requesting the latest 12z model run.
         1. To access any previous model run of the 12z see below. If the 12z was omitted the symbol would return the last run of the GFS, whichever model run was the most current.
      iii. MR1! (1 through 99) is that many "model runs" ago" for whatever comes after it. Will go back x # of runs for the suffix. So MR1! 12x-GFS will be yesterday's 12z GFS, MR1! GFS will be 1 model run ago.
         1. KORD MR1!-GFS (for −1 model run back, from which ever model run of the GFS is current)
         2. KORD MR1!_12z-GFS (for the previous days run of the specific 12z GFS)
   b. Specific
      i. Daily
         1. KORD MR200301-GFS (YY,MM,DD): returns all the GFS weather forecast model runs which were produced on Mar. 1, 2020 (aka Model Run Date) This function provides extraction of a historical weather forecast from specific "model run dates" and for specific weather models and model runs.
      ii. Model Run Specific
         1. KORD MR200301_12z-GFS (YY,MM,DD): returns only the 1 model run (i.e. 12z) of the GFS which was produced on Mar., 1, 2020 and is the 12z. This function provides extraction of a historical weather forecast from specific "model run dates" and for specific weather models and runs.
3) Progression (aka Forecast Dated Day & Forecast Dated Hour): Provides an analysis of how the forecast models changed over time for a specific Forecast Valid 'Day', 'Date' or 'time of day' (aka hour) on a specific Date also known as the 37 Target Date. Can be displayed in "Exchange time" or "interval start"). Note: when charting these symbols it may be useful to 'chart' using "exchange time" (on the x axis) to view this progression data in the correct order (i.e. as it was released by model run), considering the Forecast Valid 'day/date' is locked into the symbol (i.e. the Forecast Valid data is normally plotted on the x axis using local day/date. See FIGS. 6A-6C.
   a. Specific:
      i. Daily Forecast: KORD FDD200301_12z-GFS (YY,MM,DD): This symbol provides a history of all the 12z GFS weather forecasts, which pertain to that specific target 'Date' which is noted in the symbol; e.g., Mar., 1, 2020. Note: If the "12z" was omitted in this symbol, the alternate symbol design would return "all model runs" of the GFS, which provided a (daily) forecast for that specific date.
      ii. Hourly Forecast: KORD FDH20030113_12z-GFS (YY,MM,DD,HH) Same as above, but provides a specific hour (aka time of day) on a specific date. This symbol provides a history of all the 12z GFS Forecasts and may return the weather forecasts which pertain to that specific 'Date', e.g., Mar., 1, 2020 at 1 pm "local time" for that specific location. In an example, this specific "time of day" is noted by hour "13", which is appended to the date. The "13" represents the "local time" of day, for that specific location. The last 2 digits range from 01 (1 am) to 24 (midnight). Note: If the "12z" was omitted in this symbol, the new symbol would return "all model runs" of the GFS, which provided an "Hourly" forecast for that time of day, for that specific date.
   b. Rolling
      i. Daily Forecast: KORD FDD2!-12z-GFS : This symbol acts exactly in the same manner as above, except that the specific "Date" may be unknown (just the Forecast Valid "Day" may be known). For example if a user did not know tomorrow's "Date" this rolling symbology structure may be used to lock into the "Date" which is now "Day2".
         1. In summary: This symbol provides a history of all the 12z GFS weather forecasts, which pertain to that specific target "Date" which is now noted in the symbol; as "Day2". Tomorrow that same "Day2" element in the weather symbol, will refer to a different specific "Forecast valid Date".
         2. Note: If the "12z" was omitted in this symbol, the new symbol would return "all 4 model runs" of the GFS, which provided a daily forecast for that specific 'Date', which is currently Day 2.
         3. Note because "Day 1" equals "Today". That is different than the manner in which we normally count. For example, FDD7! is 6 days from today.
      ii. Hourly Forecast: KORD FDD2_H13!-12z-GFS : Provides a history of all the 12z Forecasts and may return the weather forecasts which pertain to that specific "Forecast Day" at that specific "Time of Day" on tomorrow Day 2, being "Local Hour 13" which is 1 pm. Note: These times are expressed as the local hour of the specific location's day/date.
         1. If the "12z" was omitted in this symbol, the new symbol would return "all 4model runs" of the GFS, which provided a Hourly forecast for that specific date & time which is currently defined as Model Hour 120.
         2. Note the H is two (2) digits ranging from 1-24, with 1=1 am and 24=midnight.
      iii. Model Hour: KORD FDH012z-GFS : Returns the history of 12z GFS weather forecasts for only model hour 0. This is independent of what every the local day/time is related to the forecast Valid period (acting very similar to an accuracy workflow like the KORD FCH13!_12z-GFS example (below).
1. If the "12z" was omitted in this symbol, the new symbol would return "all 4model runs" of the GFS, which provided a Hourly forecast for Model Hour 0.
2. Note that H is two (2) digits ranging from 0-384.
4) Accuracy (aka Forecast Continuation Day & Forecast Continuation Hour): This symbology structure may line up the weather forecast data in a manner which allows a user to easily match the extracted weather forecasts with weather observations. These observations can then be subtracted from the extracted forecasts to derive forecast accuracy statistics such as Bias, root mean square error (RMSE), Error, standard deviation (std) of error, etc. In summary, this Accuracy based symbology may return all historical weather forecast information in a manner which lines up all previous weather forecasts for a specific (rolling) days in the future (like all the 'Day 1' forecasts would be lined up (then all day 2, 3, 4, etc.) or specific (rolling) "model hours" in the future (like model hour 3, 6, 9, 12, etc..) See FIGS. 7A and 7B.
   a. Rolling
      i. Daily Forecast: KORD FCD1!_12z-GFS : Provides the "Day 1" forecast from all 12z GFS weather forecasts stored in a database.
         1. Note: If the "12z" was omitted in this symbol, the new symbol would return "all 4 model runs" of the GFS.
      ii. Hourly Forecast: KORD FCH13!_12z-GFS : Provides the "model hour 13" forecast from all 12z GFS weather forecasts stored in a database. Note: These are forecast "model hours" and range from 0-384 as opposed to the manner in which "Forecast Valid" date & time of day is used (as in FDH above) which starts at '1' indicating 1am local time, for a specific location.
         1. Note: If the "12z" was omitted in this symbol, the new symbol would return "all 4 model runs" of the GFS.
5) METAR SYMBOLOGY: METAR is one particular source of global weather observations. METAR reports weather observations from key airports (globally) in a relatively timely manner, so there is typically little (if any) cleaning to this weather observation data stream.
   a. General Structure <Location><Suffix>
      i. KORD-METR
6) MISCELLANEOUS (MISC.):
   a. AutoListing: save the user time from typing in many different symbols.
      i. MR's
         1. *<Location>MR! <Model>-returns 4 current model runs
         2. Example: *KORD MR!-GFS
         3. *<Location>MR!<Model><N-N>-returns the last N Model Runs
         4. Example: *KORD MR!_12z-GFS 0-2
      ii. FDD's(Progression)
         1. *<Location>FDD!<Model>-returns FDD 1-16
         2. Example: *KORO FDD!_12z-GFS
         3. *<Location>FDD!<Model><N-N>- returns the last N FDD
         4. Example: *KORO FDD!_12z-GFS 1-5
         5. *<Location>FDH!<Model>-returns all hourly symbols
         6. Example: *KORO FDH!_12z
         7. *<Location>FDH!<Model><N-N>-returns N hourly symbols
         8. Example: *KORO FDH!_12z 1-12
      iii. FC's (Accuracy)
         1. *<Location>FCD!<Model>-returns all continuous daily history symbols
         2. Example: *KORO FCD!_12z
         3. *<Location>FCD!<Model><N-N>-returns N continuous daily history
         4. Example: *KORO FCD!_12z 1-12
   b. Forecast Valid Days: 1-16 (or beyond, depending upon the duration of the various wx forecast models): Day 1=today (there is no Day 0). In some examples, "Day 1=today", so "Forecast Valid Day 4" is "3 days" from now (For example: (1) today/Monday, (2) tomorrow/Tuesday, (3) next day/Wednesday, (4) target day/Thursday).
   c. Model Runs (00z-23z). Most Weather Forecast Models are 00z, 06z, 12z, 18z)
   d. Forecast Valid Hours in a Specific 'Date' or 'Day' (e.g., in local time)
      i. Range from 1-24 (e.g., 13=1:00 pm local time)
   e. Forecast 'Model Hours', in some examples, may be from the start of the weather model run and extend out into the future. In some examples, weather forecast models are 384 or 240 hours into the future.
      i. Range from 0-384 (for example).
   f. Ensemble Variables
      i. Location_{underscore} Ensemble variable {space} Function_{underscore} Model Run {Dash}-Wx Model
         1. EX: KORD_MEAN MR0!_12z-GFS
      ii. In some examples, a default variable for Ensemble models is the "MEAN" or average of all perturbations
      iii. Other selectable Ensemble variables may include:
         1. MAX (highest ensemble member)
         2. MIN (lowest ensemble member)
         3. MEAN (Average of all ensemble members or also can be used as 50% of all members)
         4. +1/−1 STD (1 standard deviation is derived which can be added or subtract from the MEAN)
         5. PER10 ($10^{th}$ percentile of all members)
         6. PER25 ($25^{th}$ percentile of all members)
         7. PER75 ($75^{th}$ percentile of all members)
         8. PER90 ($90^{th}$ percentile of all members)
      iv. GFS ENS: Fast vs Full-
         1. Fast may be derived using, for example, 50% of the total Ensemble members. For example, the first 10, of the 20 ensemble members. These preliminary values have an extraordinarily high correlation to capture the directional change (and magnitude) of the Full forecast. The benefit to providing this directional perspective is receiving this information approximately 30 seconds before all ensemble members can be modeled and transmitted to other users. This concept works for streaming Ensemble models (e.g., GFS ENS), when ALL Ensemble members are computed.
      v. Interpolated Values:
         1. In some examples systems of the present disclosure may receive weather forecasts (which may arrive "As-Is"), and interpolate the forecast hours which were not forecasted by the weather model. In some examples, systems of the present disclosure may extract the "Trailing Minimum" and "Trailing Maximum" temperatures from the weather forecast grib files, and then using a diurnal pattern based upon data (or a blend of data), may place these trailing Minimum & Maximum values between the reported forecasts which reside on the top of each hour.

vi. % Complete :
1. This is a unique element of the present disclosure which allows users an advantage, viewing official daily weather forecast information a few minutes prior to the rest of the marketplace. This process may provide "preliminary forecasted values" for daily Max, Min, Avg temperature, or daily GWDD, Heating Degree Day (HDD), Cooling Degree Day (CDD) values, when the weather forecast model is partially (e.g., 50%) completed for any forecast Day and provide real-time updates as that forecast Day runs through 100% complete. The preliminary Daily values of the present disclosure may provide users insight, a few minutes in advance of other services, who only publish a forecast Day at 100%.

Figure 8A:
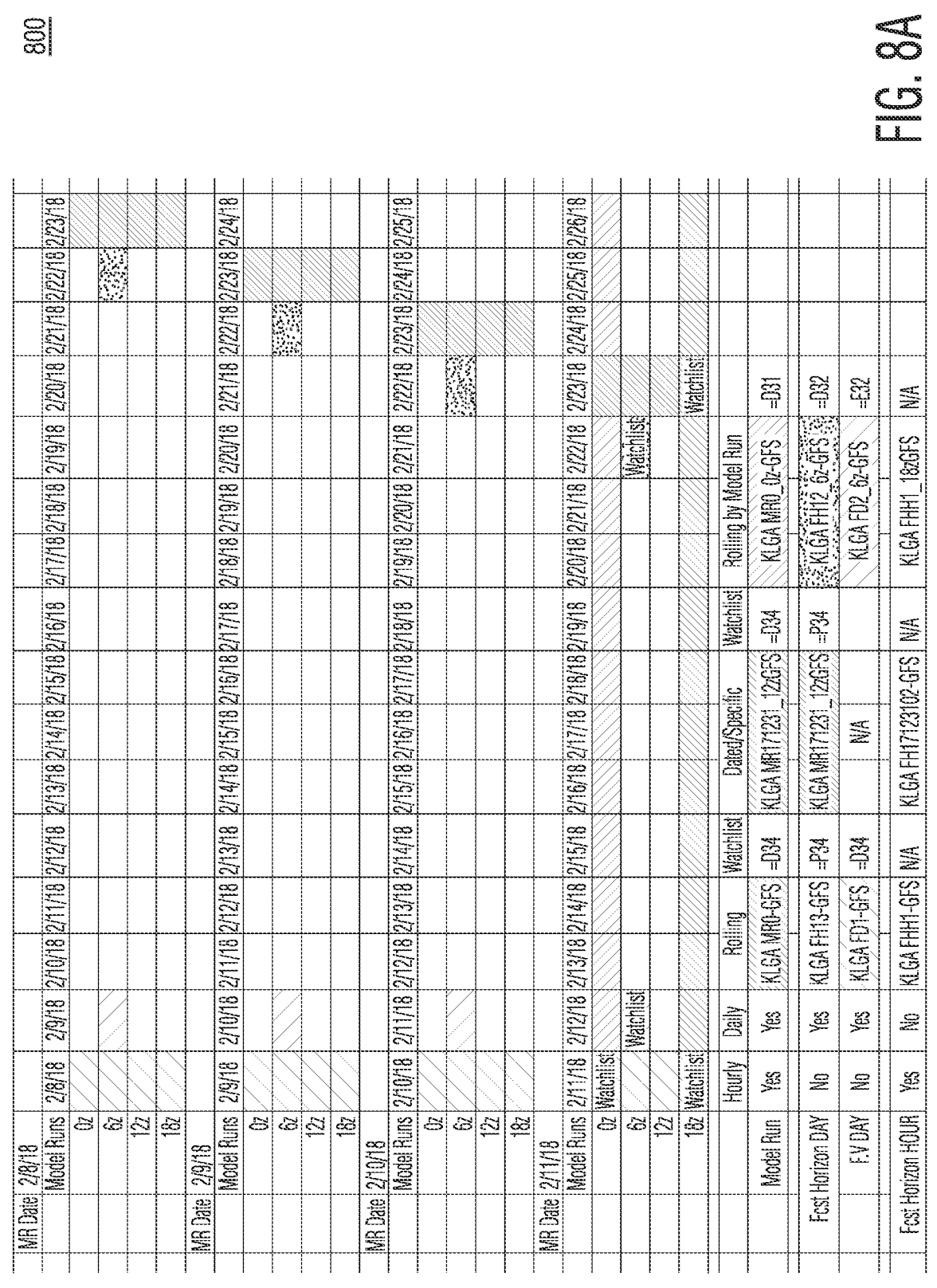
Figure 8B:
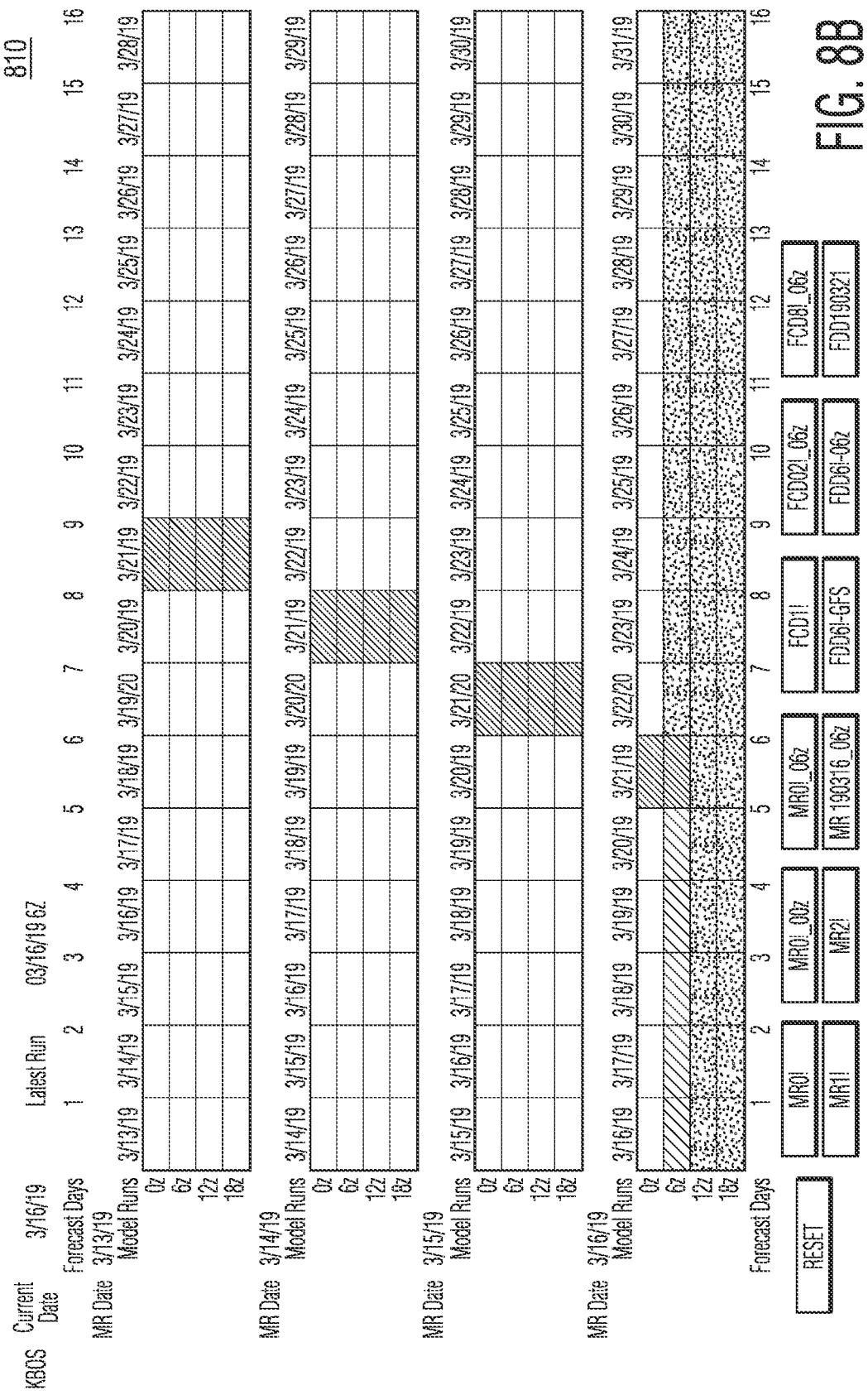
FIG. 8B is an example user interface illustrating examples of various weather symbology structures, according to an aspect of the present disclosure.

FIGS. 8A and 8B provide for specific operational examples of how the various weather symbology structures operate using sample weather forecasts. For example, FIG. 8A illustrates example interactive GUI 800 of a spreadsheet application, illustrating examples symbology construction, according to an aspect of the present disclosure. FIG. 8B illustrates example interactive GUI 810 illustrating examples of various weather symbology structures for a spreadsheet application.

Table 3 provides brief descriptions of example weather terminology used throughout the present disclosure.

TABLE 3

Example Weather Symbology Terminology

| Term | Description |
|---|---|
| Receipt Time (e.g., exchange time) | The time reported is the time at which the file arrived at the server(s). |
| Location | Locations may be global airport codes (ICAO) and/or custom regions designed to represent specific geographic regions related to a specific commodity (such as a gas weighted Energy Information Administration (EIA) region-based commodity or one or more Independent System Operator (ISO) regions to mimic an entity that controls and monitors the operation of an electrical power system for a given geographic region). |
| Example Weather Models/Model Names | GFS- GFS (¼ degree spatial resolution. Time steps: mhr 0-120 @1 hr; mhr 121-384 @3 hr - run 4x per day). <br> GEFS - GFS Ensemble (¼ degree spatial resolution. Time steps: mhr 0-120 @1 hr - mhr 121-384 @3 hr. run 4x per day. Fast = 17 members/Full = 35 members. <br> ECM- ECMWF's high resolution model (¼ degree spatial resolution for surface variables and 1 degree resolution for upper air variables. Time steps: mhr 0--90@1 hr__mhr 93-144 @3 hr__mhr 150-240 @6 hr__0z & 12z ONLY. 06 & 18z mhr 0-90 @ 1 hr. <br> ECE - ECMWF Ensemble model (ENS) (½ degree spatial resolution for surface variables and 1 degree resolution for upper air variables. Time steps: mhr 0--90@1 hr__mhr 93-144 @3 hr__mhr 150-240 @6 hr__0z & 12z ONLY. 06 & 18z mhr 0-90 @ 1 hr__mhr 93-144@3 hr. Full = 52 members. <br> ECEX- ECMWF Ensemble Extension (ENS) (½ degree spatial resolution for surface variables and 1 degree resolution for upper air variables. Time steps: mhr 0--384 @24 hr - run 2x per week). <br> GEFSX - GFS Ensemble EXTENSION (¼ degree spatial resolution. Time steps: mhr 0-120 @1 hr - mhr 121-384 @3 hr. run 1x per day. Fast = 11 members/Full = 22 members. <br> CFSX - CFS Ensemble EXTENSION (¼ degree spatial resolution. Time steps: mhr 0-5,400 (9 mo) @6 hr -. run 1x per day. Full = 5 members. <br> SEAS - ECMWF"s Seasonal Model (¼ degree spatial resolution. Time steps: mhr 0-5,040 (7 mo) @6 hr -. run 5th of every month. Full = 5 members. <br> Note that the spatial resolution is subject to change based upon the sources. |
| Model Run | Currently 0z, 6z, 12z, 18z. <br> This may change depending upon modification by weather agencies to modify the frequency of model runs. |
| Model Hour (aka Forecast Hour) | Currently integers between 0-384. 0 hour is the initial hour from which the weather forecast is initialized and the model physics then prognosticates forward into the future. |
| Time Steps/ Reporting interval | Is the difference between Model Hours described above. For example if the forecasted model hours were 0, 3, 6, 9, 12, etc., the model would possess '3 hour' time steps. |
| Forecast Valid Date | A particular time for which a weather forecast will pertain to a calendar 'Date'. Dates are based upon midnight-to-midnight local time of the forecasted location. "FV Dates" are mostly used in "Specific Dates" for the weather symbology structure. |

TABLE 3-continued

Example Weather Symbology Terminology

| Term | Description |
| --- | --- |
| Forecast Valid Day | A particular time for which a weather forecast will pertain to a calendar 'Day' in the future, which is based upon midnight-to-midnight local time of the forecasted location. Mostly used in "Rolling Dates" for the weather symbology structure. For example; Day 2 represents a forecast for tomorrow, regardless of which specific calendar date it represents. |
| Forecast Valid Hour (Time of Day) | A particular weather forecast for a particular time of Day or Date, which is based upon midnight-to-midnight local time of the forecasted location. This Forecast Valid Hour can be applied in either "specific" or rolling" weather symbology structure. For example; HH01 is 1:00am in the morning, local time. |
| How Model Hour relates to Forecast Valid Day/FV Date/FV Time of Day (these are expressed in local time for the forecast location) | Each Model Hour provides a global forecast which may correspond to a specific Forecast Valid Day, Date and Time, given the global time zone of the specific forecast location. For example, Model Hour 1 may be equal to 1am London time, but may directly correspond to 7pm Chicago time (which is 6 hrs behind London).<br>FV Day = Day 1, 2, 3, etc . . .<br>FV Date = a specific calendar date<br>FV Time of Day = a specific time on a specific Date |
| Percent Complete | AKA "Preliminary Daily Values" provides users an early view of what the forecasted daily value will (likely) be a few minutes in advance. Percent Complete displays the percentage of potential hourly data used to derive a daily value for a specific forecast date/day. For example, the second forecast day (for some location) consists of 24 forecast hours. When 12 of those 24 files are received, a preliminary daily value may be generated for that specific day, As each subsequent forecast hour updates from the forecast model, so will the % complete, unit 100% is achieved for that specific forecast day. |
| "As-Is" model data (aka "Raw" model data) | This refers to the specific model hours in which a weather forecast model provides a forecast. |
| Interpolated | This refers to the forecast hours in between the "As-Is model data" from which the weather forecast model did not provide weather forecast data. The present disclosure implements a sophisticated method to interpolate those in between hours. |
| Blended | Indicates whether a weather forecast data is combined with observation data. |
| Ensemble Models | Ensemble runs may produce eight (8) distinct outputs regarding ensemble statistics for a given variable.<br>Max - The highest ensemble member<br>Min - The lowest ensemble member<br>Mean - The average of all ensemble members.<br>Std - 1 standard deviation of all the ensemble members.<br>10% - - $10^{th}$ percentile of the ensemble values.<br>25% - - $25^{th}$ percentile of the ensemble values.<br>50% - - $50^{th}$ percentile of the ensemble values can be displayed by using the "Mean" (listed above).<br>75% - - $75^{th}$ percentile of the ensemble values.<br>90% - - $90^{th}$ percentile of the ensemble values. |
| Ensemble Member Count | This is how many ensemble members are included in the analysis. For GEFS 'Fast', an early look at the ensemble data may be provided using a portion (e.g., 22) of the total (e.g., 45) GEFS ensemble members. |
| Guidance Charts | Plot weather forecasts going out into the future (standard weather charts) |
| Progression Charts | May "lock" a particular "Forecast Valid Date or Time of Day" (also known as the "Target Date") and show how the previous weather forecasts have changed over time for that "Forecast Valid" Day, Date or Time of Day. |
| Target Date | Used in a progression chart it is the specific Date and/or Time of Day which is held constant from which an examination of how all the previous weather forecast Models/Model Runs have changed (overtime) for that particular Day/Date/Time. |
| Alpha Charts | This is the unique display in the marketplace and exclusive to aspects of the present disclosure. Streaming weather forecasts as they are made available into the public domain in conjunction with real-time market prices, can more easily expose the relationship between changing weather perspectives and changes in traded instruments. |
| NOAA | National Oceanic and Atmospheric Administration<br>www.noaa.gov |
| NCEP | National Center for Environmental prediction<br>www.ncep.noaa.gov |
| ECMWF | European Center of Medium Range Weather Forecasts www.ecmwf.int |
| CFSR | A source of global weather observations. The Re-Analysis data from the CFS weather forecast model may be used to compile, in some examples, greater than 41 analog years and at least four climatological datasets. |
| METAR | A source of streaming global weather observations from instrumentation located at airports. |

TABLE 3-continued

Example Weather Symbology Terminology

| Term | Description |
|---|---|
| Exchange Time (aka receipt time) | Is the time when the data is received. |
| Interval Start Time | A setting used in charts to allow for Future dates, so that weather forecast data may be plotted forward in time. |

Example: Weather Data with respect to Exchange Time and Price Data

Figure 4A:
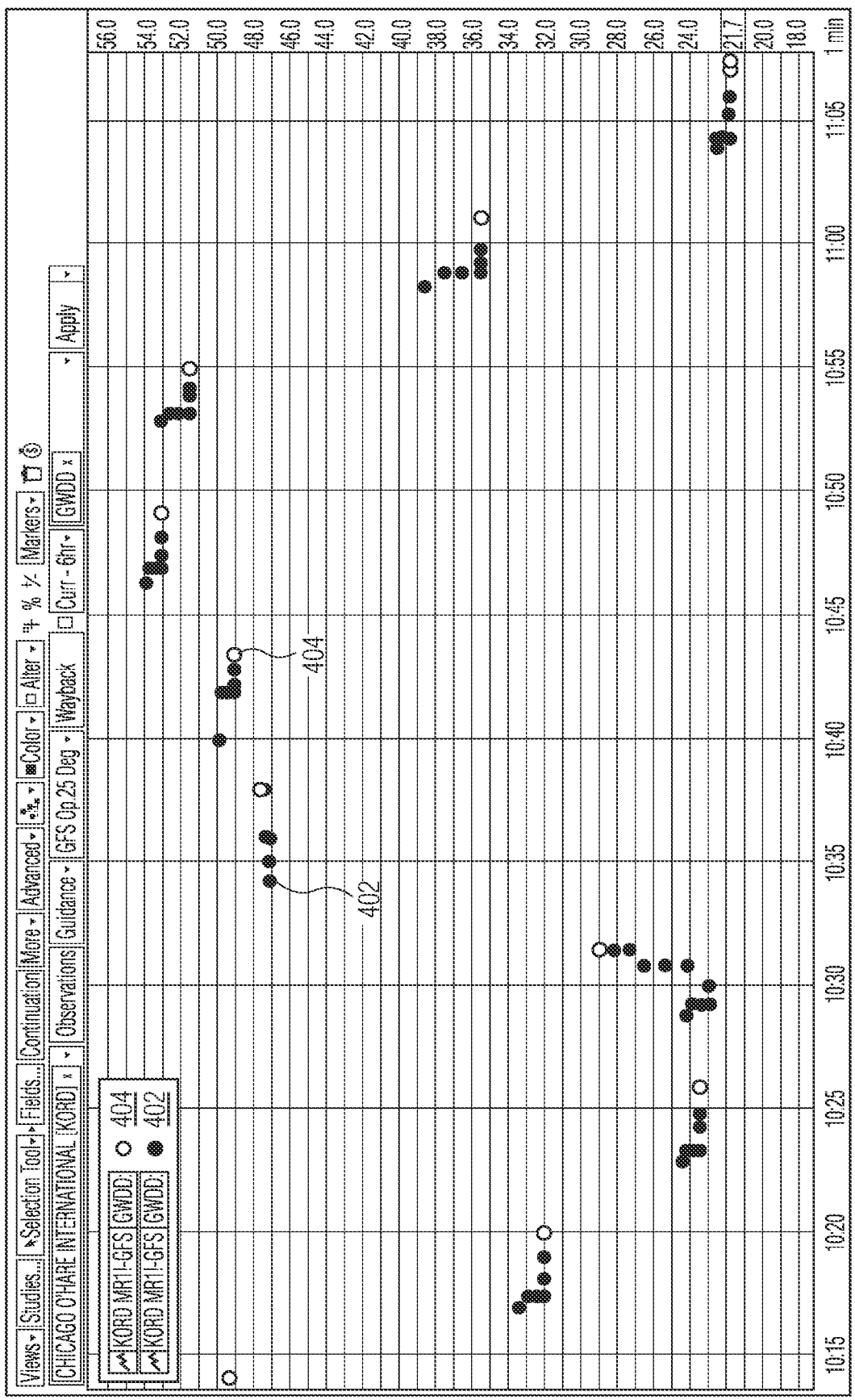
FIG. 4A is screenshot including a chart of example weather forecast data and price data as a function of exchange time, according to an aspect of the present disclosure.

The following is an example of charting weather data with respect to exchange time and price data. FIG. 4A is screenshot including a chart of example weather forecast data and price data as a function of exchange time. The example shown in FIG. 4A illustrates a scenario where each weather Forecast Valid Day is being produced by the weather forecast model (source). The x axis describes the "exchange time" which each dot (elements 402, 404) is received. Each dot 402 is a 'preliminary view' of that day's forecast element (such as daily average temperature, GWDD, HDD, CDD, etc.), in which a condition code ("% complete") may begin providing 'preliminary views' when a forecast day is 50% (for example) and may stop when that forecast day is completed at 100%. Dot 404 at the end of a forecast valid day is the 100% conclusion.

Not shown here, is the price of any traded commodity using a minute Open/High/Low/Close (OHLC) bar. In general, OHLC represents an example manner in which traded prices may be displayed, over some time interval (e.g., one minute, five minutes, fifteen minutes, one day, etc.). For example, trading data may be organized into one minute intervals and a single bar may depict the OHLC over each of the one minute time spans (or any suitable time period). In some examples, one minute OHLC bars may be displayed together with weather "tick" data to aid in identifying trading opportunities. The presentation of the combination of the two data sets on interactive GUI 120 provides advantages, including in makes it easy to visualize and track (including in real-time) when weather moves in a significant manner to move the price of a traded financial instrument.

Figure 4B:
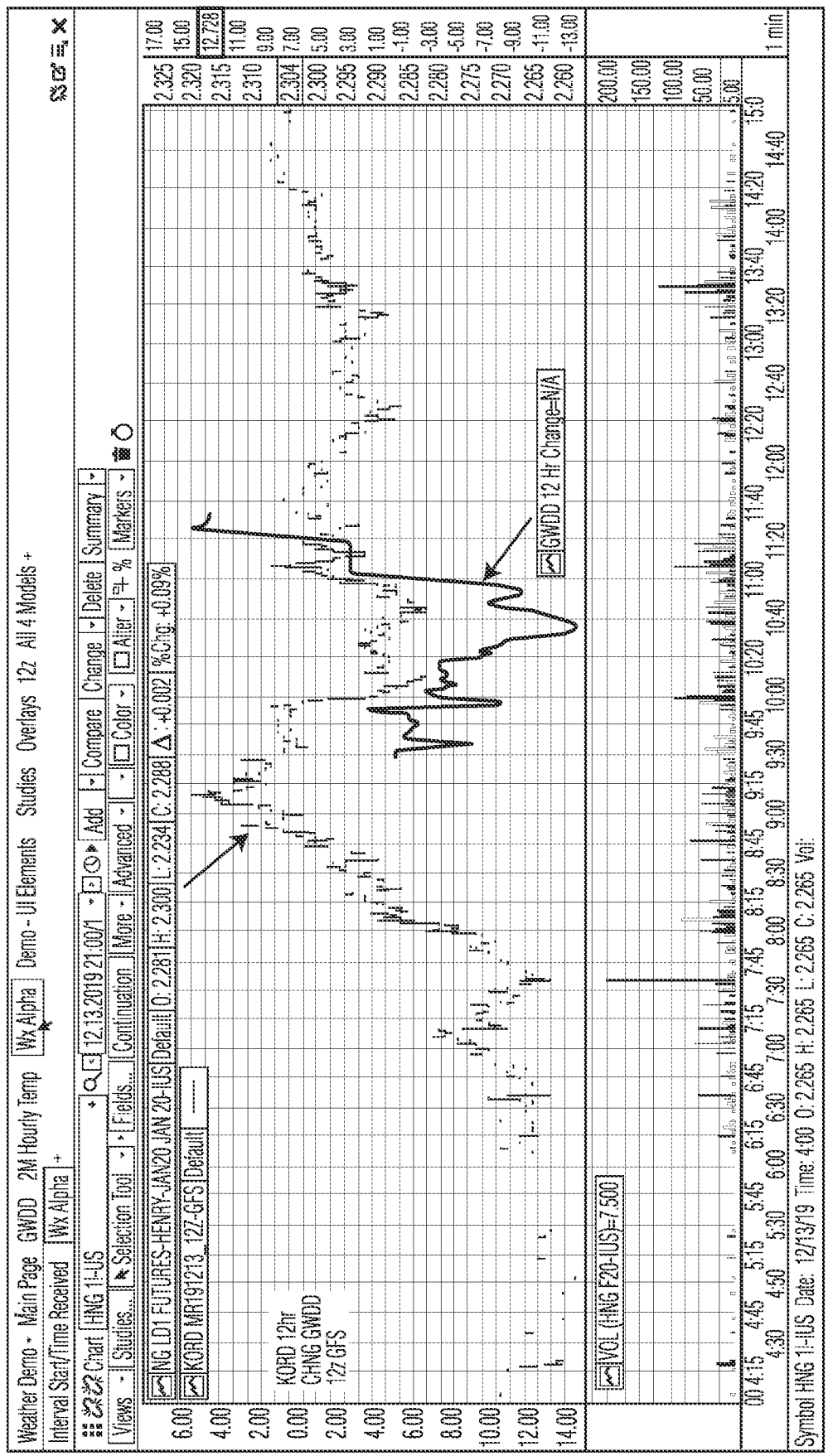
FIGS. 4B and 4C are screenshots of an example 16 day weather forecast for a particular location as a function of exchange time with respect to natural gas price data, according to an aspect of the present disclosure.
Figure 4C:
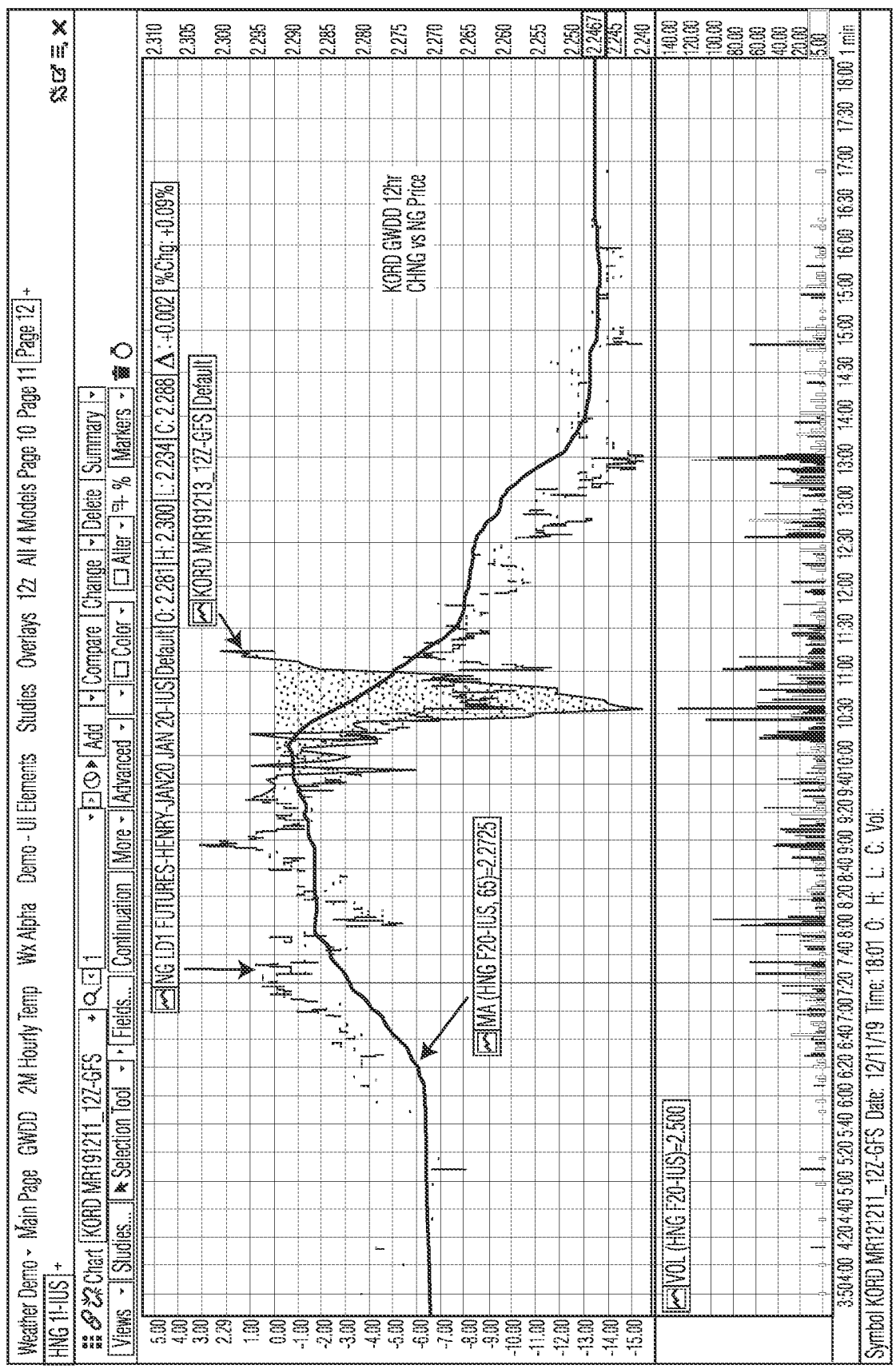

FIGS. 4B-4D are screenshots of an example 16 day weather forecast for a particular location as a function of exchange time with respect to natural gas price data. In particular, FIGS. 4B and 4C show an example 16 day weather forecast from the 12z GFS weather forecast model in 'exchange time' for the GWDD variable as it relates to the price of Natural gas at Henry Hub. FIG. 4D is a screenshot of an example weather alpha workflow chart as a function of exchange time. As shown in FIG. 4D, when GWDD goes down, price should go down and vice-a-versa.

Example of a Guidance Chart

Figure 5:
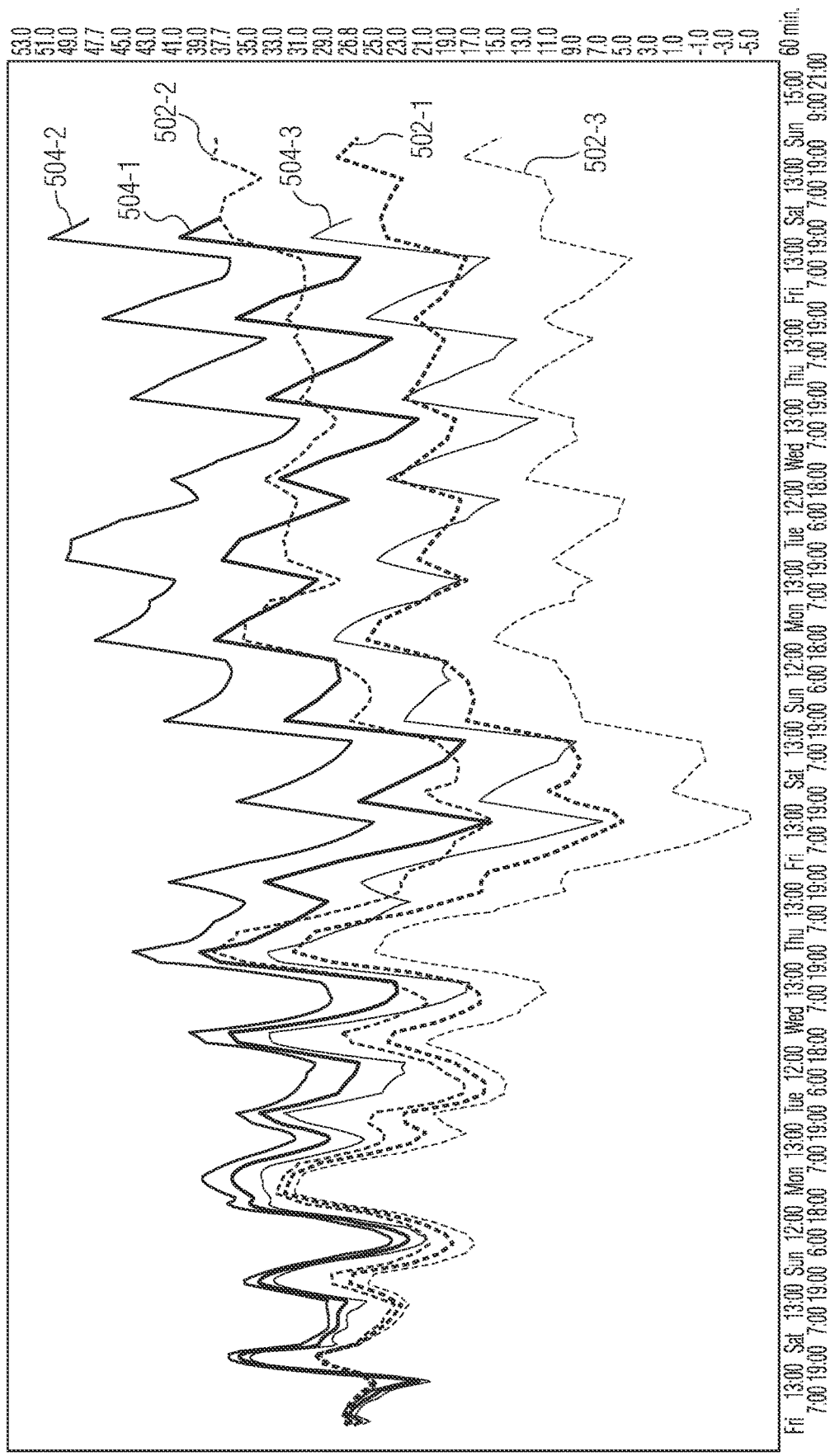
FIG. 5 is a screenshot including an example guidance chart associated with a guidance weather perspective, the guidance chart illustrating weather forecast data as a function of a forward time period, according to an aspect of the present disclosure.

In some examples, the weather symbology of the present disclosure may be used for guidance weather perspective workflows, and may be configured to generate guidance charts of weather forecast datasets. FIG. 5 is a screenshot including an example guidance chart associated with a guidance weather workflow, the guidance chart illustrating weather forecast data as a function of a forward time period. The example chart starts 'now' at the current hour and extends forward in time 16 days (hour-by hour or 0-384hours into the future) as seen on the x axis and Temperature displayed (in F) on the y axis for Chicago O'Hare airport. Set of curves 502 shows the 0z GEFS Ensemble mean (curve 502-1) as well as the +1 STD (curve 502-2) and −1STD (curve 502-2) around the mean (curve 502-1). Set of curves 504 shows the 0z ECE Ensemble mean (curve 504-1) as well as the +1 STD (curve 504-2) and −1STD (curve 504-2) around the mean (curve 504-1).

Table 4 is an example output of the data behind the same guidance chart with the weather symbology. In some examples, system 102 may provide users with the ability to plot this data in various presentation formats (e.g., a data grid, a spreadsheet, a watchlist) and may update the resulting data in real-time as the underlying data input(s) change.

TABLE 4

Example Weather Chart Output Data

| Date | Time | 0Z GEFS | +1STD 0z GEFS | 0z ECE | −1STD 0z GEFS | −1STD 0z ECE | +1STD 0z ECE |
|---|---|---|---|---|---|---|---|
| Feb. 21, 2020 | 22:00 | 24.4 | 37 | 38.3 | 11.9 | 28.1 | 48.5 |
| Feb. 21, 2020 | 21:00 | 24.3 | 36.8 | 38.9 | 11.9 | 28.7 | 49 |
| Feb. 21, 2020 | 20:00 | 24.2 | 36.6 | 39.4 | 11.8 | 29.2 | 49.6 |
| Feb. 21, 2020 | 19:00 | 24.1 | 36.5 | 40 | 11.8 | 29.7 | 50.2 |
| Feb. 21, 2020 | 18:00 | 24 | 36.3 | 40.5 | 11.8 | 30.1 | 50.9 |
| Feb. 21, 2020 | 17:00 | 23 | 35.4 | 38.1 | 10.6 | 28.1 | 48.2 |
| Feb. 21, 2020 | 16:00 | 22 | 34.4 | 35.7 | 9.5 | 25.8 | 45.6 |
| Feb. 21, 2020 | 15:00 | 20.9 | 33.5 | 33.4 | 8.3 | 23.5 | 43.2 |
| Feb. 21, 2020 | 14:00 | 19.9 | 32.6 | 31 | 7.1 | 21.1 | 40.8 |
| Feb. 21, 2020 | 13:00 | 18.8 | 31.8 | 28.6 | 5.9 | 18.6 | 38.6 |
| Feb. 21, 2020 | 12:00 | 17.8 | 31 | 26.2 | 4.7 | 15.9 | 36.5 |
| Feb. 21, 2020 | 11:00 | 17.9 | 30.8 | 26.5 | 5 | 16.4 | 36.5 |
| Feb. 21, 2020 | 10:00 | 18 | 30.7 | 26.7 | 5.4 | 16.9 | 36.5 |
| Feb. 21, 2020 | 9:00 | 18.2 | 30.6 | 26.9 | 5.7 | 17.3 | 36.6 |
| Feb. 21, 2020 | 8:00 | 18.3 | 30.6 | 27.2 | 6 | 17.7 | 36.7 |
| Feb. 21, 2020 | 7:00 | 18.4 | 30.6 | 27.4 | 6.2 | 17.9 | 36.9 |
| Feb. 21, 2020 | 6:00 | 18.5 | 30.6 | 27.6 | 6.5 | 18.2 | 37.1 |

TABLE 4-continued

Example Weather Chart Output Data

| Date | Time | 0Z GEFS | +1STD 0z GEFS | 0z ECE | −1STD 0z GEFS | −1STD 0z ECE | +1STD 0z ECE |
|---|---|---|---|---|---|---|---|
| Feb. 21, 2020 | 5:00 | 18.7 | 30.5 | 28.5 | 6.9 | 19.1 | 37.8 |
| Feb. 21, 2020 | 4:00 | 18.9 | 30.5 | 29.3 | 7.3 | 20 | 38.6 |
| Feb. 21, 2020 | 3:00 | 19.1 | 30.6 | 30.1 | 7.7 | 20.8 | 39.4 |
| Feb. 21, 2020 | 2:00 | 19.3 | 30.6 | 30.9 | 8.1 | 21.5 | 40.3 |
| Feb. 21, 2020 | 1:00 | 19.6 | 30.7 | 31.7 | 8.4 | 22.1 | 41.3 |
| Feb. 21, 2020 | 0:00 | 19.8 | 30.9 | 32.5 | 8.7 | 22.7 | 42.4 |
| Feb. 20, 2020 | 23:00 | 20.1 | 31 | 33.1 | 9.3 | 23.3 | 42.9 |
| Feb. 20, 2020 | 22:00 | 20.5 | 31.1 | 33.7 | 9.8 | 23.8 | 43.6 |
| Feb. 20, 2020 | 21:00 | 20.8 | 31.3 | 34.3 | 10.4 | 24.3 | 44.2 |
| Feb. 20, 2020 | 20:00 | 21.2 | 31.5 | 34.8 | 10.8 | 24.8 | 44.9 |
| Feb. 20, 2020 | 19:00 | 21.5 | 31.8 | 35.4 | 11.2 | 25.2 | 45.7 |

Example: Progression Charts

Figure 6A:
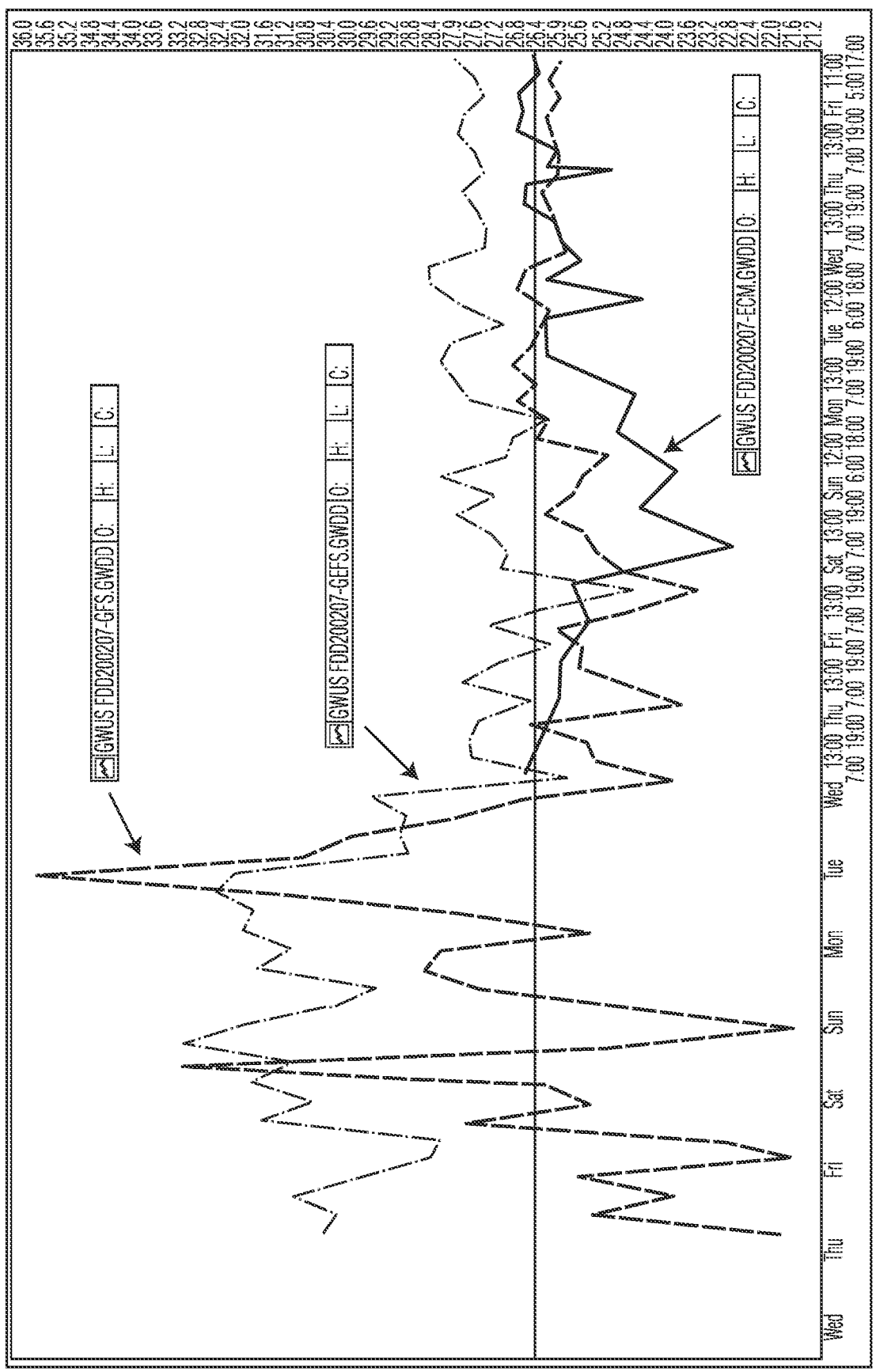
FIG. 6A is a screenshot including an example progression chart associated with a progression weather perspective, according to an aspect of the present disclosure.
Figure 6B:
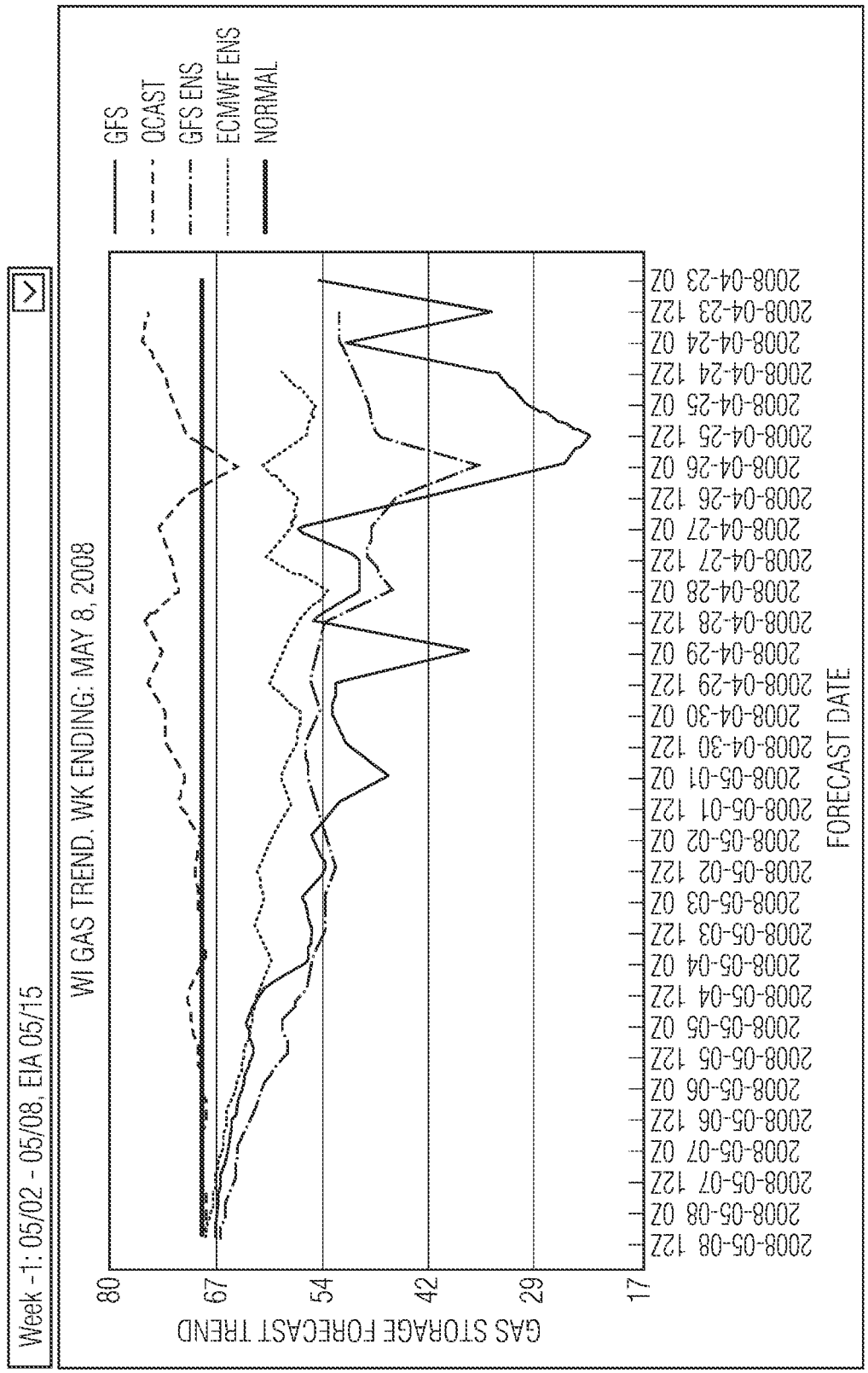
FIG. 6B is a screenshot of an example progression chart illustrating natural gas storage estimates and weather model progression as a function of forecast date, according to an aspect of the present disclosure.
Figure 6C:
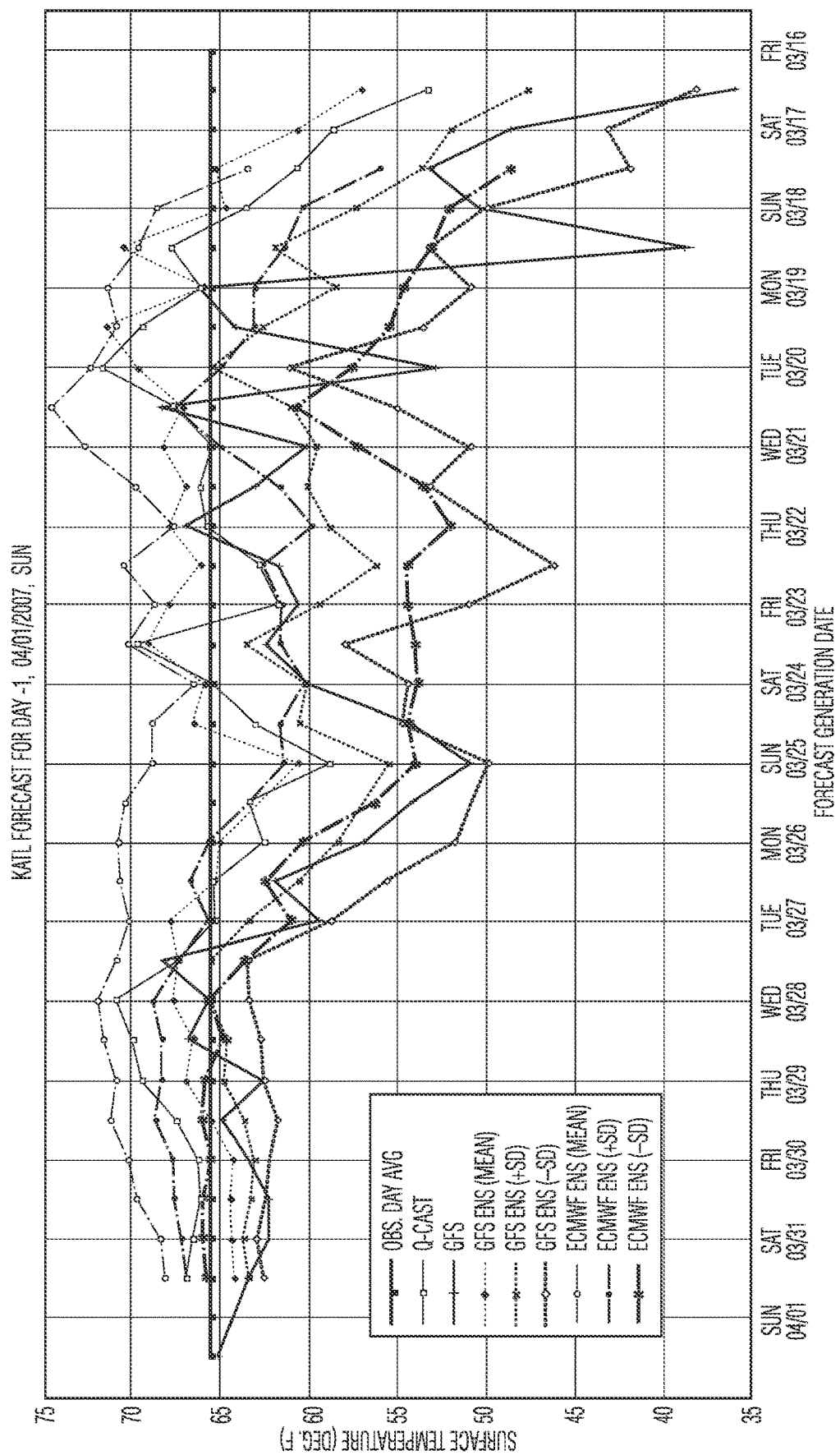
FIG. 6C is an example progression chart for several weather models as a function of forecast date, according to an aspect of the present disclosure.

In some examples, the weather symbology of the present disclosure may be used for progression weather perspective workflows, and may be configured to generate progression charts of weather forecast datasets. FIGS. 6A-6C show the convergence of weather forecast models, as the forecast changes over time, from day-to-day for a specific Forecast Valid Day, using Progression charts of the present disclosure. In particular, FIG. 6A is a screenshot including an example progression chart associated with a progression weather workflow; FIG. 6B is a screenshot of an example progression chart illustrating natural gas storage estimates and weather model progression as a function of forecast date; and FIG. 6C is an example progression chart for several weather models as a function of forecast date.

In FIG. 6A, as shown in the far left (16 days ago), there was more risk for today's forecast (Friday February 7$^{th}$), which appeared to flatten out approximately 5 days prior to today February 7$^{th}$ (yet the models still show a few degrees difference). FIG. 6B, illustrates example natural gas storage estimates (reads in the opposite direction of FIG. 6A, from right to left).

Example: Accuracy Charts

In some examples, the weather symbology of the present disclosure may be used for accuracy weather perspective workflows, and may be configured to generate accuracy charts of weather forecast datasets. FIG. 7A is an example initiation screen for generating an accuracy chart. In some examples, the weather symbology may easily organize weather forecast model data using the FCD and FCH commands, allowing weather forecast accuracy to be quickly understood via presentation on interactive GUI 120. It may be appreciated that any knowledge of which weather forecast is most likely to be correct may be an informational advantage, particularly for interacting with market data.

FIG. 7B is an example accuracy chart associated with an accuracy weather workflow. This data display shown in FIG. 7B is an example using the weather symbol structure of the present disclosure using the Accuracy style codes which begin with FCD.

Example: System Operation

An example of system operation of weather integration server 116 is provided below. In this example, MR refers to a Model Run, MRD refers to a Model Run Date, MRH refers to a Model Run Hour, MR0 refers to a Model Run Offset, FDD refers to a Forecast Dated Date, DD refers to a Dated Date, DDO refers to a dated date offset, FCD refers to a Forecast Continuation Day, CDO refers to a Continuation Day Offset, FDH refers to a Forecast Dated Hour, DH refers to a Dated Hour, DHO refers to a Dated Hour Offset, FCH refers to a Forecast Continuation Hour, CHO refers to a Continuation Hour Offset., "LOC" refers to location and "REQ" refers to request. In Table, 5, DM represents a data manager (such as for data cache(s) 124).

Table 5 below illustrates non-limiting examples of system operation according to aspects of the present disclosure.

TABLE 5

Examples of System Operation

| Request | Request Type | Rolling/Specific | DM | Underlying Symbol |
|---|---|---|---|---|
| KBOS MR0!-GFS Latest Model Run for Boston from GFS MODEL: GFS LOC: KBOS REQ: MR MRO: 0 | MR MRD is calculated from Reference date (Today), Number of Runs in the day and MRO. NO MRH - use latest model run hour. | Rolling REF_DATE: 2019 Mar. 16 (Today) | Return current day's latest Forecast data. Keeps user updated of new model runs. Confirmed clear down for all model run changes. | KBOS MR190316_6z-GFS Key gets updated every model run. User may be updated every model run. Chart user may clear down and re-request historical data every new model run. Users may receive data updates (hourly/ daily) as new data comes in from data feed. |

TABLE 5-continued

Examples of System Operation

| Request | Request Type | Rolling/Specific | DM | Underlying Symbol |
|---|---|---|---|---|
| | | | | Underlying symbols are updated on model run changes. Ex for GFS:<br>1. KBOS MRYYMMDD_0z-GF<br>2. KBOS MRYYMMDD_6z-GF<br>3. KBOS MRYYMMDD_12z-GF<br>4. KBOS MRYYMMDD_18z-GF |
| KBOS MR1!-GFS<br>Latest Model Run (01) for Boston from GFS<br>MODEL: GFS<br>LOC: KBOS<br>REQ: MR<br>MRO: −1 | MR<br>MRD is calculated from Reference date (Today), Number of Runs in the day and MRO. NO MRH - use latest model run hour. | Rolling<br>REF_DATE: 2019 Mar. 16 (Today)<br>MRO: −1<br>1 run back | DM may return expired symbol. User may get updates on current model runs for symbol and source. Live Chart request may generate new historical request for each model run update. | Expired Symbol.<br>No Underlying symbol.<br>User may be updated every model run.<br>Chart user may clear down and re request historical data every new model run. |
| KBOS MR0!_00z-GFS<br>Latest 00z for Boston from GFS<br>MODEL: GFS<br>LOC: KBOS<br>REQ: MR<br>MRO: 0<br>MRH: 00z | MR<br>MRD is calculated from Reference day(Today), Number of Runs in the day and MRO. | Rolling<br>REF_DATE: 2019 Mar. 16 (Today) | If current day has MRH: 0Z DM may return latest forecast data for today with MRH (00z). Else may return expired symbol. | KBOS MR 190316_0z-GFS<br>User may be updated every model run and requested MRH.<br>Chart user may clear down and re-request historical data every new model run. |
| KBOS MR1!_0Z-GFS<br>Last Model Hour 00z<br>for Boston from GFS<br>MODEL: GFS<br>LOC: KBOS<br>REQ: MR<br>MRO: −1<br>MRH: 00z | MR<br>MRD can be calculated from reference day(Today), Number of Runs in the day, MRO and MRH. | Rolling<br>REF_DATE: 2019 Mar. 16 (Today) | DM may return expired symbol. User may receive updates on current model runs for symbol and source. Live Chart request's may generate new historical request for each model run update and MRH. | Expired Symbol,<br>No Underlying symbol<br>User may be updated every model run and requested MRH.<br>Chart user may clear down and re request historical data every new model run. |
| KBOS MR190316_0z-GFS<br>Return Model run: 2019 Mar. 16 at Model run: 00z data for Boston from<br>MODEL: GFS<br>LOC: KBOS<br>REQ: MR | MR<br>MRD is from request (Use format to determine specific) | Specific<br>MRD: Mar. 16, 2019<br>MRH = 00z | DM may return data if current day is specific day and has date for MRH (00z) And no further updates. | KBOS MR190316_0z-GFS<br>Same as client symbol |

TABLE 5-continued

Examples of System Operation

| Request | Request Type | Rolling/Specific | DM | Underlying Symbol |
|---|---|---|---|---|
| MRD: Mar. 16, 2019<br>MRH: 00z | | | if MRD is current day but MRH is in a future DM may wait until that MRH is received in data feed. | |
| KBOS MR 190316_6z-GFS<br>Return Model run: 2019 Mar. 16 at Model run: 00z data for Boston from<br>MODEL: GFS<br>LOC: KBOS<br>REQ: MR<br>MRD: Mar. 16, 2019<br>MRH: 06z | MR<br>MRD is from request (Use format to determine specific) | Specific<br>MRD: Mar. 16, 2019<br>MRH = 06z | DM may return data if current day is specific day and has date for MRH (00z) and no further updates.<br>if MRD is current day but MRH is in future DM may wait until that MRH received in data feed. | KBOS MR 190316_6z-GFS Client symbol |
| KBOS FDD8!-GFS<br>7 h Forecast Dated Day from Today(Current day: 1)<br>MODEL: GFS<br>LOC: KBOS<br>REQ: FDD<br>DDO: 8 | FDD<br>Forecast Dated Date is calculated from Reference Date and DDO<br>Ex:<br>Today:<br>2019 Mar. 16<br>DDO: 8 days (note current day: 1)<br>Interested Date:<br>2019 Mar. 23<br>Database Options: Find all Model Run Dates (or time indexed field)which may have particular FDD.<br>Or use an index for Forecast Date to find Data. | Rolling<br>REF_DATE:<br>2019 Mar. 16 (Today) | If current day has the interested forecast date, DM may return the latest forecast data for that date.<br>Keeps user updated for new runs which have the FDD. | KBOS FDD190323-GFS<br>Key gets updated every day.<br>User may be updated every model run.<br>Chart user may clear down and re request historical data if needed. |
| KBOS FDD190321-GFS<br>Data from all Model runs with forecast for 2019 Mar. 21<br>MODEL: GFS<br>LOC: KBOS<br>REQ: FDD<br>FDD: 2019 Mar. 16 | FDD<br>FDD is from request.<br>Database Options: Find all Model Run Dates (or time indexed field) which may have particular FDD.<br>Or use an index for Forecast Date to find Data. | Specific<br>FDD:<br>2019 Mar. 16 | May return expired symbol if FDD is not current day.<br>Subscribes and Returns data if FDD is Current Date and in future.<br>No further updates after FDD goes out of scope. | KBOS FDD190321-GFS Client symbol |

TABLE 5-continued

Examples of System Operation

| Request | Request Type | Rolling/Specific | DM | Underlying Symbol |
|---|---|---|---|---|
| KBOS FDD12!_00z-GFS 12<sup>th</sup> Forecast Dated Day from Today with Model Run Hour of 00z. i.e., 00z runs with forecast date of 2019 Mar. 27 MODEL: GFS LOC: KBOS REQ: FDD DDO: 12 MRH: 00z | FDD Forecast Dated Date is calculated from Reference Date and DDO. Ex: Today: 2019 Mar. 16 DDO: 12 days Interested Date: 2019 Mar. 27 Database Options: Find all Model Run Dates (or time indexed field) which may have particular FDD. Or use an index for Forecast Date to find Data. | Rolling REF_DATE: 2019 Mar. 16 (Today) | If current day has the interested FDD and MRH, DM may return the latest forecast data for that date. Keeps user updated for new runs which have the FDD and MRH. | KBOS FDD190327_00z-GFS Key gets updated every day. User may be updated every model run and requested MRH. Chart user may clear down and re request historical data if needed. |
| KBOS FCD1!-GFS Forecast Day 1 (from possible total 16 (1-17)) Model Runs MODEL: GFS LOC: KBOS REQ: FCD CDO: 1 Model Run Limit: Max Model Runs, going back to n model runs | FCD Use the Model Run Limit and filter with FCD. Confirm max 'n' model runs limit with DM. | Rolling REF_DATE: 2019 Mar. 16 (Today) | Subscribes and Returns data for all model runs for that Forecast Day (1-17). First Watchlist record returned may be latest update for current day. | No Underlying symbol. User may be updated every model run. |
| KBOS FCD1!_06z-GFS Forecast Day 1 (from possible total 16) Model Runs MODEL: GFS LOC: KBOS REQ: FCD CDO: 1 MRH: 06z Model Run Limit: Max Model Runs, going back to n model runs | FCD Use the Model Run Limit and filter with FCD and MRH. Confirm max 'n' model runs limit with DM. | Rolling REF_DATE: 2019 Mar. 16 (Today) | Subscribes and Returns data for all model runs for that Forecast Day (1-17) with MRH of 06Z Watchlist may be empty if there is no record for FCD and MRH. But DM may update after referenced Forecast Day comes in a Model Run. | No Underlying symbol User may be updated every model run and requested MRH. |

Example: Model Run Updates to Users

In some examples, weather integration server 116 may provide one or more model run updates in response to latest model run requests and/or rolling back requests from users (e.g., via user device(s) 108).

For a Latest Model Run (MR0) Request, a model run update may be sent for every new model run for the related source and location. In some examples, the model run update may be used by the chart user to clear a history, such that no new history request may be needed.

For a Rolling Back (MRNN<1-99>) Request, in some examples, when a user subscribes for a model run going backwards, an expired symbol response may be provided (or a different weather response indicating the information is historical). From there on forward, the user may be provided with updates for every new model run for that location and source.

In some examples, an expired symbol response and model run update may be used by all users (e.g., data may get updates for individual fields) to clear state and chart users re-request historical data from one or more databases.

In some examples, when a new model run starts, all chart users may need the chart to be re-drawn (which may cause weather integration server 116 to receive a request for historical data (if not cached) for a previous model run). To avoid all chart users requesting historical data at a same time during new model runs, weather integration server 116 may include logic to pre-request data at a pre-defined user interval before a new run starts.

In some examples, for any rolling request if the user request includes a model run hour, the user may be notified when that specific model run hour is received from a weather data source(s) data feed.

Example: Forecast Dated Date Requests (FDD) and Forecast Continuation Day (FCD)

In some examples FDD requests, FDH requests and/or FCD requests may be received that may be subscribed to via a previous model run, a current model run and/or for a future model run. FDD and FDH requests relate to the progression weather perspective, and FCH requests relate to the accuracy weather perspective (described above).

For example, when a user requests data for FDD and FCD and are subscribed to current model run, the resulting chart(s) may be updated for every new model run for the related source and location. In some examples, for every new day runs (e.g., 00z), all users with charts open may have charts re-drawn for FDD/FDH and may request historical data for that FDD/FDH and FCD/FCH.

For future model runs, a user may subscribe for a future symbol. In this example, the user may receive no forecast data response and may receive an update on that symbol when the future event occurs.

In some examples, users may not need to re-request historical data for new model run updates.

Example: Weather Field Filtering

In some examples, a filter option may be provided in weather impact dashboard 122. The filter option may provide users (e.g., via user device(s) 108) the ability to include a filter option to a weather impact request. In one example, the format for a filter option may be:
filters="field_1=<value>&field_2=<value>"

For example, for filtering by daily symbol (interval type=D) and with 100% complete, the following filters option may be used: filters="interval type=D& PercentComplete=100", where the term "interval type" may include Hourly (H, default) and Daily (D). In some examples, if the interval type is not specified, system 102 may lookup interval type after inspecting the fields. In some examples, an additional optional filter DEBUG=T&columns=* may be used to request all fields.

Example: Model Run Information

In one non-limiting example, weather integration server 116 may provide model run information for GFS and GEFS weather data models. The model run information may include model hours (e.g., 0z, 6z, 12z, 18z, based on GMT), may provide about 385 hourly records and about 209 daily records.

Example: Symbology Specification

Next, an example symbology specification is described, according to an aspect of the present disclosure.

In this non-limiting example, the symbology for forecasts may include at least five different methods to retrieve a symbol and/or data. Example retrieval methods may include: (i) by symbol type and field, (ii) by symbol type and aggregation, (iii) by model run and model run date, (iv) by valid day/date-time and (v) by valid day or date. FIG. 8A illustrates an example user interface illustrating examples of symbology construction.

Table 6 illustrates an example symbol list and available fields that may be used for retrieval by symbol type and field. Table 7 illustrates an example symbol list and available aggregations that may be used for retrieval by symbol type and aggregation.

TABLE 6

Example Symbol List and Available Fields

| Symbol Type | Example | Intraday | Daily |
|---|---|---|---|
| Model Run - Rolling | KORD MR0-GFS | Yes | Yes |
| Model Run - Specific | KORD MR190228__12z-GFS | Yes | Yes |
| Model Run - Rolling run | KORD MR0__0z-GFS | Yes | Yes |
| Horizon Day - Rolling | KORD FH13-GFS | No | Yes |
| Horizon Hour - Rolling | KORD FHH1-GFS | Yes | No |
| Horizon Day - Specific | KORD FH190228-GFS | No | Yes |
| Horizon Hour - Specific | KORD FH19022812-GFS | Yes | No |
| Horizon Day - Rolling run | KORD FH12__12z-GFS | No | Yes |
| Horizon Hour - Rolling run | KORD FHH1__18z-GFS | Yes | No |
| Valid Day - Rolling | KORD FD1-GFS | No | Yes |
| Valid Day - Rolling run | KORD FD1__12z-GFS | No | Yes |

TABLE 7

Example Symbol List and Available Aggregations

| Symbol Type | Example | Intraday? | Daily? |
|---|---|---|---|
| Model Run - Rolling | KORD MR0-GFS | Yes (hourly) | Yes |
| Model Run - Specific | KORD MR190228__12z-GFS | Yes (hourly) | Yes |
| Model Run - Rolling run | KORD MR0__0z-GFS | Yes (hourly) | Yes |
| Horizon Day - Rolling | KORD FH13-GFS | Yes (4 model run) | Yes |
| Horizon Hour - Rolling | KORD FHH1-GFS | Yes (4 model run) | Yes |
| Horizon Day - Specific | KORD FH190228-GFS | Yes (4 model run) | Yes |
| Horizon Hour - Specific | KORD FH19022812-GFS | Yes (4 model run) | Yes |

TABLE 7-continued

Example Symbol List and Available Aggregations

| Symbol Type | Example | Intraday? | Daily? |
|---|---|---|---|
| Horizon Day - Rolling run | KORD FH12__12z-GFS | Yes (1 point) | Yes |
| Horizon Hour - Rolling run | KORD FHH1__18z-GFS | Yes (1 point) | Yes |
| Valid Day - Rolling | KORD FD1-GFS | Yes (4 model run) | Yes |
| Valid Day - Rolling run | KORD FD1__12z-GFS | Yes (1 point) | Yes |

The model run and model run date retrieval method represents a 'vanilla' way of viewing the data. In this example, the time series may be comprised of the different model hours over that model date. The data may appear similar to a forward curve in the future. The model run and model run date retrieval may also include options such as synthetic rolling model run retrieval method and a synthetic rolling model run and model time retrieval method. The synthetic rolling model run method may programmatically include the most current model run (versus the previous or previous+1) models. The synthetic rolling model run and model time method may programmatically include the most current model run/by selected model time (versus the previous or previous+1) models.

In some examples, the symbology may support one or more types of constructions. Table 8 provides an example list of symbol types for various constructions. In some examples, it may be desirable that, similar to the continuation symbols, all metadata reflect a prompt-most dataset in a series. In Table 8, the terms horizontal, diagonal and vertical/column refers to the viewing of the symbology elements with respect to the columns and rows of the spreadsheet shown in FIG. 8B. For example, horizontal refers viewing the symbology with respect to a row, vertical refers to viewing the symbology with respect to a column and diagonal refers to viewing the symbology with respect to a diagonal line (across a combination of rows and columns).

TABLE 8

Example List of Symbols for Various Constructions

| Symbol Type | Symbol | Notes |
|---|---|---|
| Model Run - Rolling | KORD MR0-GFS | Points to core (horizontal) |
| Model Run - Specific | KORD MR190228__12z-GFS | Core (horizontal) |
| Model Run - Rolling run | KORD MR0__0z-GFS | Points to core (horizontal) |
| Horizon Day - Rolling | KORD FH13-GFS | Diagonal |
| Horizon Hour - Rolling | KORD FHH1-GFS | Diagonal |
| Horizon Day - Specific | KORD FH190228-GFS | Diagonal |
| Horizon Hour - Specific | KORD FH19022812-GFS | Diagonal |
| Horizon Day - Rolling run | KORD FH12__12z-GFS | Diagonal |
| Horizon Hour - Rolling run | KORD FHH1__18z-GFS | Diagonal |
| Valid Day - Rolling | KORD FD1-GFS | Continuations of core (vertical/column) |
| Valid Day - Rolling run | KORD FD1__12z-GFS | Continuations of core (vertical/column) |

The valid day/date-time retrieval method may allow the user to select a point in time (e.g., noon on Friday) and analyze how the forecast has changed on each model run. This retrieval method may be akin to viewing a future going towards expiry, with each model run being a session. In some examples, this retrieval method may be used for intraday (e.g., hourly) values.

The valid day or date retrieval method is similar to the date-time retrieval method, except that the dataset in the valid day/date retrieval method may include a daily aggregation and a greater number of symbols. The valid day/date retrieval method may also include an option such as a synthetic rolling valid day or date retrieval method, which may provide the ability to use indices to obtain rolling valid dates.

In some examples, the symbology may be constructed with the following elements:
　　Location+Model Name (e.g., GFS)+Model Run
For forecast valid days, the symbology may include:
　　Location+Model Name+Forecast Continuation <Roll number>
For forecast horizon days (also referred to as Target Date), the symbology may include:
　　Location+Model name+Forecast Horizon/Target Date <date/time>

In some examples, the symbology may include additional condition codes, including one or more of a Daily % Complete code, an Interpolated code, and a Fast/Full code. For example, "fast" and "full" selections may be handled by one or more associated condition codes. In some examples, the symbology may include additional commodity codes for different % Complete values (e.g., ¼th, ⅛th, 1/24th, etc., depending on the model and forecast day). In some examples, the "%Complete" value may be provided at 50% or higher.

In some examples, the symbology may include different selection presentation behavior depending on which condition codes are selected. In some examples, a default behavior for presenting any charts may include presenting a highest percent complete available for any point. In some examples, if a "100% complete" code is selected, then no other % complete conditions may be shown. In some examples, a default behavior for a "Fast/Full" condition code may include presenting a "latest" (typically full) (e.g., unless the full information hasn't yet arrived). In some examples, if "Full" code is selected, the "Fast" value may not be shown. In some examples, if the "Interpolated" condition code is selected as the default behavior, interpolated data may be presented. % Complete, for example (e.g., ¼ths, ⅛ths, 1/24ths, depending on the model and forecast day).

In some examples, the symbology may include condition codes for the front end (e.g., an interactive GUI, a spreadsheet, etc.), such as condition codes in "Time and Sales", and may provide additional fields for a forecast valid hour/day. In some examples, the symbology may provide for updates to values in one or more charts. In some examples, the symbology may provide the ability to filter tick charts by "% complete" and/or interpolation by symbol. In some examples, a same symbol and different % completes may be provided in a same chart. In some examples, data may be pulled into a spreadsheet via time and/or sales information.

In some examples, the symbology may use metadata including, without being limited to, one or more of latitude ("Lat"), longitude ("Long"), altitude, elevation, a description, description information from ICAO/WMO/WBAN/USAF/CRN/SNOTEL (if available), station start, station end and time zone. In some examples, the symbology may use one or more of interval start information (e.g., start of a hour/day referenced), interval end information (e.g., end of an hour/day referenced) and received time information. In some examples, a default selection behavior may be provided, such as in a GUI, in flex metadata and the like. Table 9 provides examples of default interval type by symbol.

TABLE 9

Examples of Default interval type by symbol

| Symbol Type | Symbol | Start | End | Received |
|---|---|---|---|---|
| Model Run - Rolling | KORD MR0-GFS | Yes | Yes | Yes |
| Model Run - Specific | KORD MR190228__12z-GFS | Yes | Yes | Yes |
| Model Run - Rolling run | KORD MR0__0z-GFS | Yes | Yes | Yes |
| Horizon Day - Rolling | KORD FH13-GFS | Yes | Yes | Yes |
| Horizon Hour - Rolling | KORD FHH1-GFS | Yes | Yes | Yes |
| Horizon Day - Specific | KORD FH190228-GFS | Yes | Yes | Yes |
| Horizon Hour - Specific | KORD FH19022812-GFS | Yes | Yes | Yes |
| Horizon Day - Rolling run | KORD FH12__12z-GFS | Yes | Yes | Yes |
| Horizon Hour - Rolling run | KORD FHH1__18z-GFS | Yes | Yes | Yes |
| Valid Day - Rolling | KORD FD1-GFS | Yes | Yes | Yes |
| Valid Day - Rolling run | KORD FD1__12z-GFS | Yes | Yes | Yes |

In some examples, system 102 may provide an example display frequency of at least about 10,000 points a minute (e.g., at irregular intervals), and may include an example latency of less than about 1 second response to desktop and/or client applications (e.g., client application(s)/service(s) 126). In some examples, weather integration server 116 may provide an example non-historical forecast decay, where, after 48 hours from release, non-historical data may decay, and where all historical data may remain (including, in some examples, remaining indefinitely).

In some examples, weather integration server 116 may include history requirements such as no backfill for missing data and example corrections (including no corrections options) for data having any errors.

In some examples, weather integration server 116, in addition to providing fields for the presentation of integrated weather data, may provide ensemble fields (which may reflect the set of ensemble runs). Non-limiting examples of ensemble fields may include temperature, GWDDD and precipitation. In some examples, weather integration server 116 may also provide one or more ensemble field sets including, without being limited to, an average, a minimum, a maximum, a standard deviation, 10%, 25%, 50%, 75% and/or 90% variables.

In some examples, weather integration server 116 may provide user-selectable options for watchlist values. In some examples, values may be with respect to a "Latest" received.

For example, a watchlist value for a model run may refer to a latest point in time, a watchlist value for a valid day may refer to a most recently received value, and a watchlist for a horizon day may refer to a most recently received value. In some examples, a same field may be configured to have different values for a same location, depending on the symbology term used. In some examples, interval start and interval end fields in the watchlist may update with a latest update. In some examples, the watchlist may provide a cleardown style behavior. In some examples, cleardown logic may not be applied, when a rolling contract points to a new model run dataset which doesn't yet have data (e.g., a blank value may be shown). For example KORD FVD18-GFS.GWDD may be presented as blank while the model run is now starting to be available, but the value for day 18 is not completed. The use of cleardown logic in suitable circumstances (and not using cleardown logic in some circumstances) may be useful for viewing the data in the watchlist.

In some examples, weather integration server 116 may provide various types of data usage (e.g., depending upon the type of client application/service 126). In some examples, data usage for a trading desktop may include presentation of about 1 to 20 charts (where each chart may include about 1 to about 25 time series points), about 1 to about 10 grids (where each grid may include at least thousands of individual requests) and may provide one or more spreadsheets (where users may maybe greater than about 5000 datapoint requests and may provide greater than about 100 time series refreshes at a time).

Examples of an Interactive GUI

Next, examples of an interactive GUI 900 for providing interactive tools for viewing and interacting with integrated weather and market data are described with respect to FIGS. 9A-9H. In some examples, interactive GUI 900 may represent an example of weather impact dashboard 122 (FIG. 1).

Figure 9A:
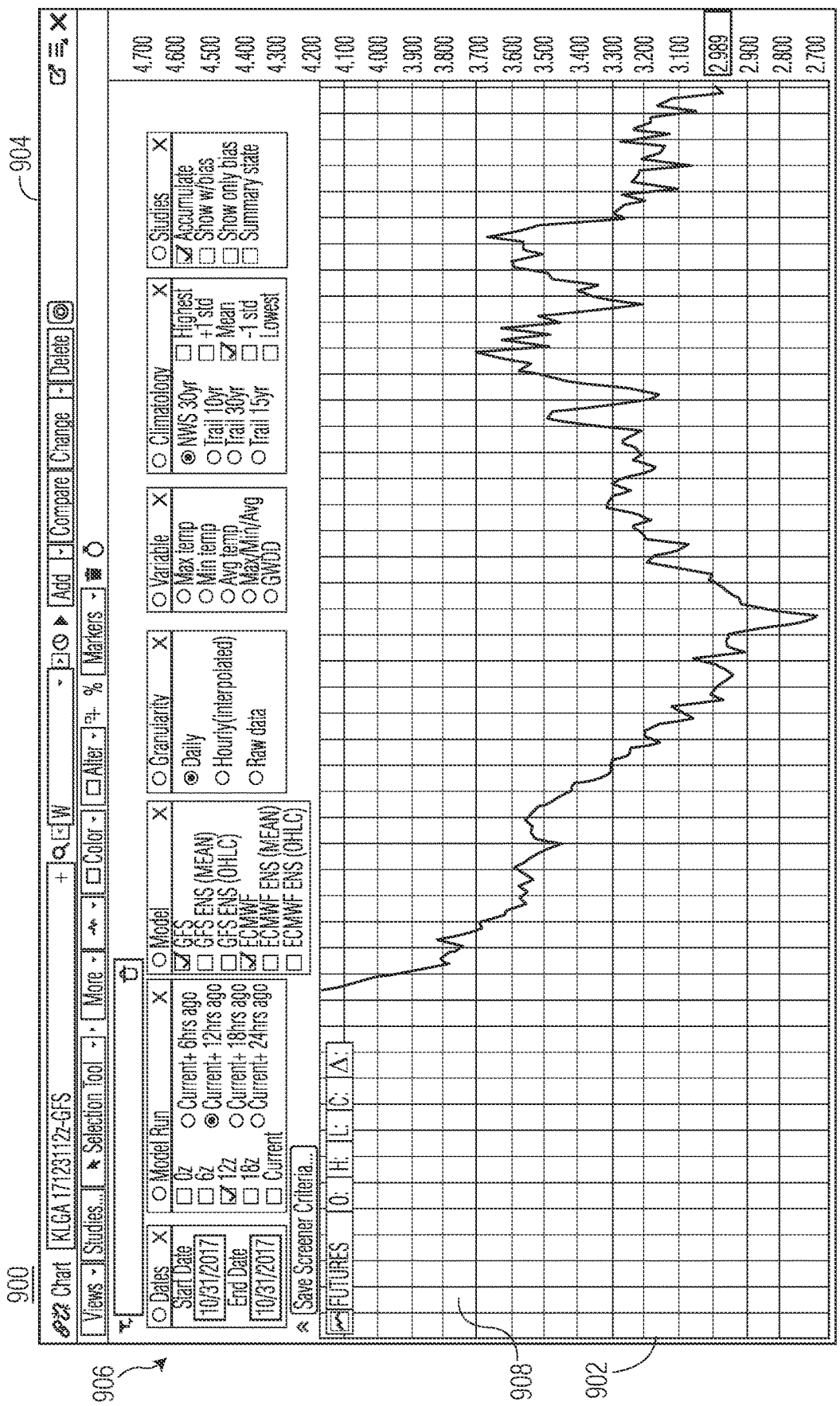
Figure 9B:
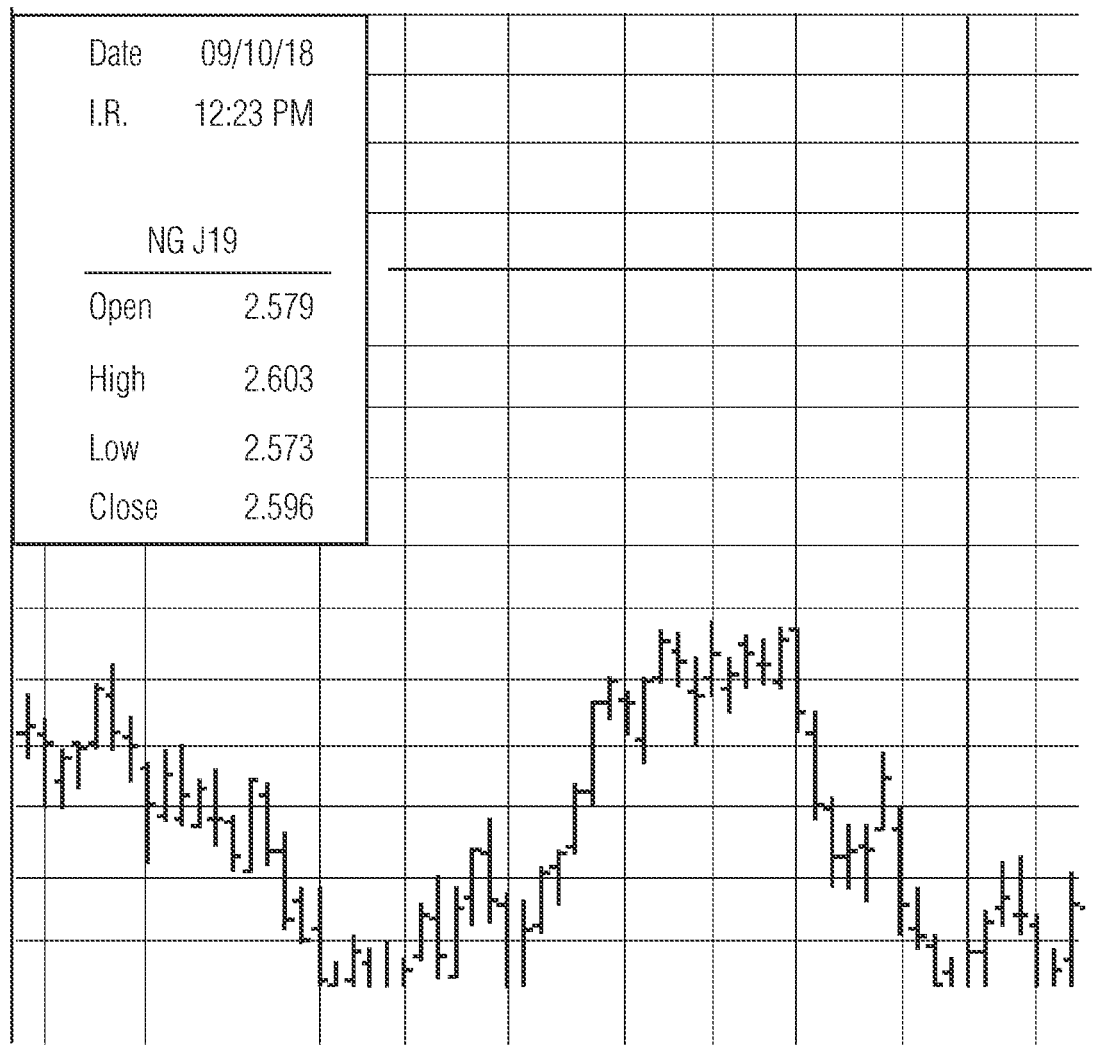
Figure 9C:
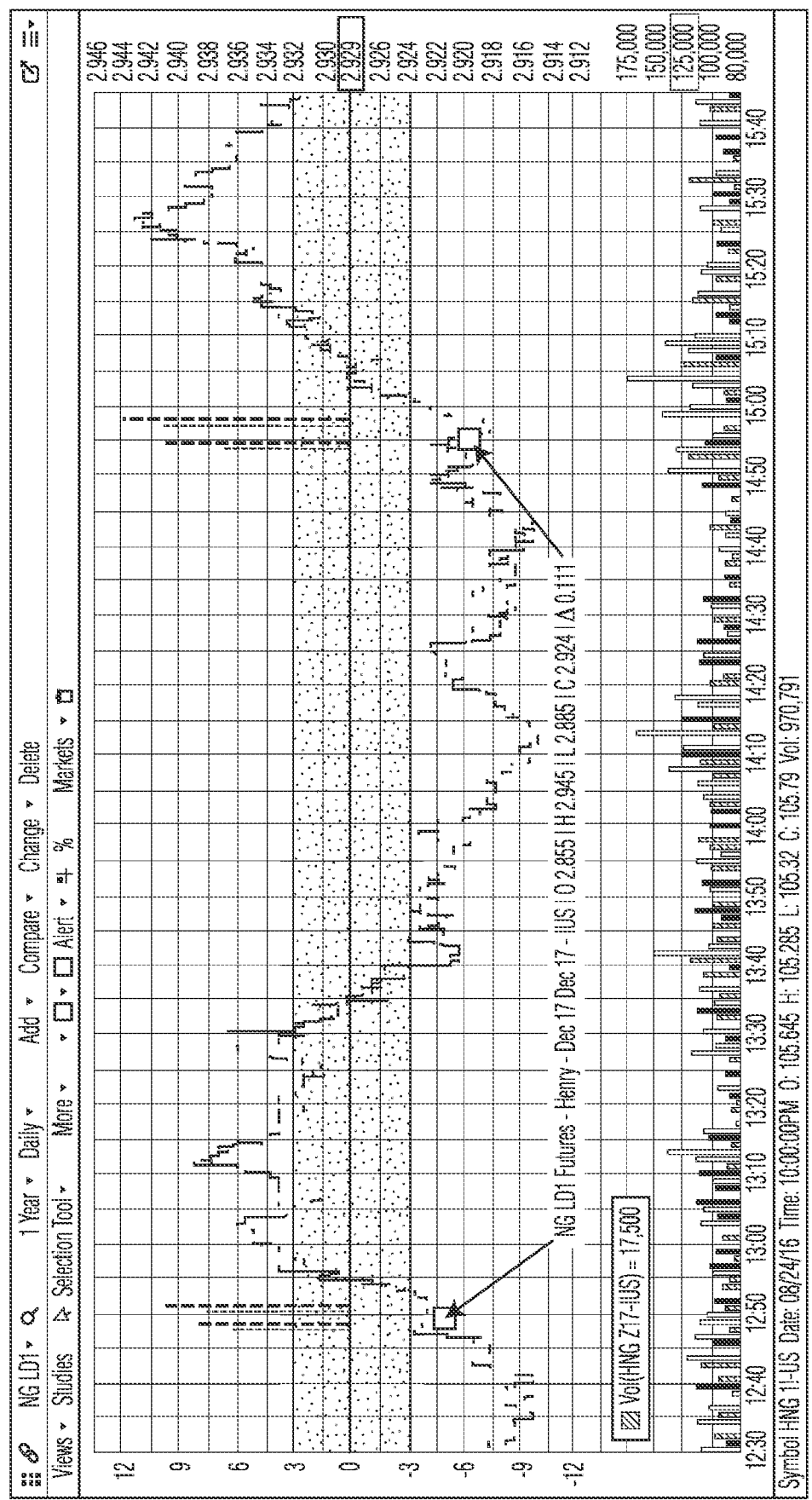
Figure 9D:
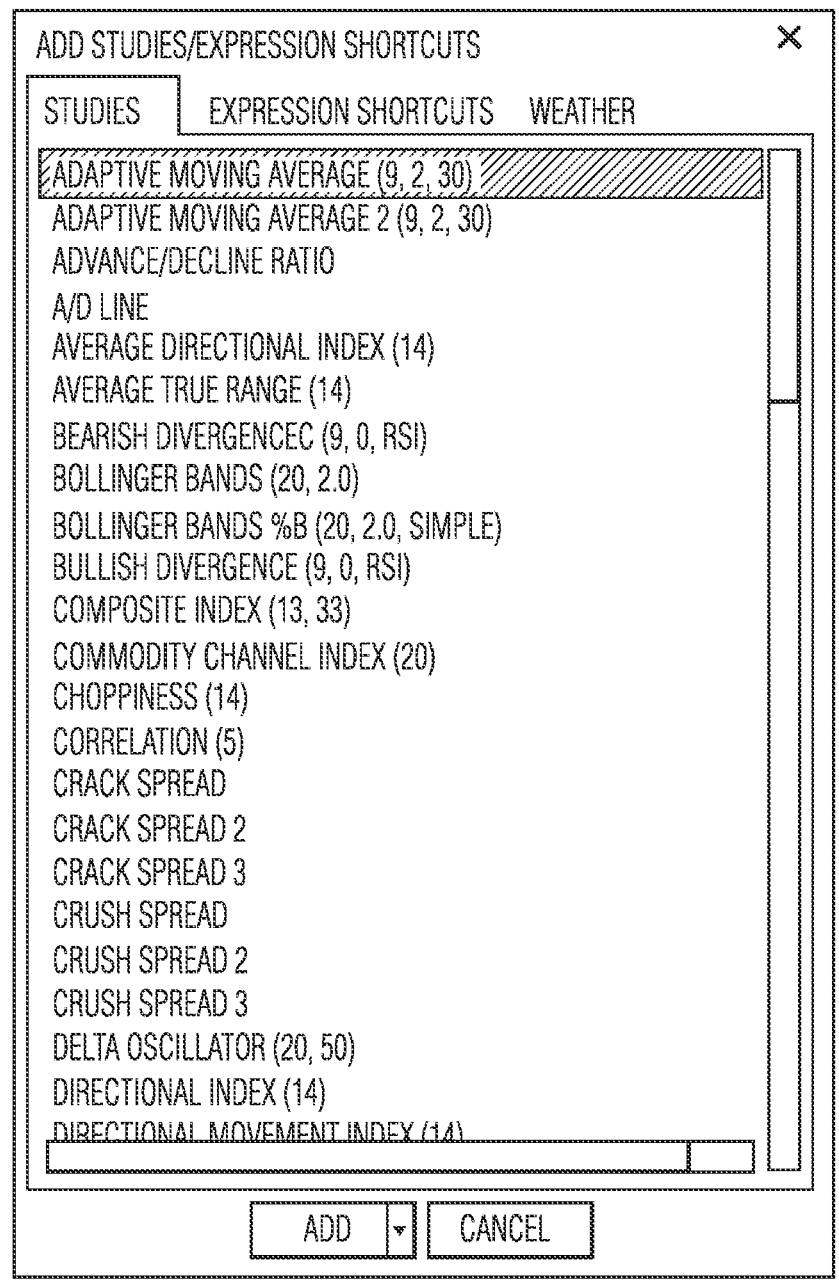

In some examples, interactive GUI 900 may include one or more windows, such as window 902 and window 904. In some examples, window 902 may include user input region 906 (e.g., for providing a weather data request that may correspond to a weather symbology instruction). In some examples, window 902 may further include display region 906 for displaying weather and/or market data. In some examples, display region 906 may include an interactive display. FIGS. 9B shows a portion of display region 910 of interactive GUI 900 illustrating an example chart. FIG. 9C shows window 912 of interactive GUI 900 illustrating an example integrated weather and market data chart. FIG. 9D shows window 914 of interactive GUI 900, illustrating options for bias and bias adjusted overlays. FIG. 9E shows window portion 916 of interactive GUI 900, illustrating options for creating a customizable marker. FIG. 9F shows window 918 of interactive GUI 900, illustrating options for creating condition alerts. FIG. 9G shows window 920 of interactive GUI 900, illustrating options for managing custom markers. FIG. 9H shows a portion of window 922 of interactive GUI 900, illustrating an example grid display. It should be understood that FIGS. 9A-9H represents a non-limiting example user interface, and that a differing interface configured in accordance with this disclosure may be provided for providing presentation and interaction with integrated weather and market data.

In some examples, interactive GUI 900 may include global controls such as time zone support and at least one weather properties section for selecting weather properties (e.g., Celsius/Fahrenheit, Mm/in (precip), M/Feet (Waves), Hpa/inhg/mmhg (pressure) and Mph/kmh/mps (wind)). In some example, interactive GUI 900 may include user-selectable options for chart presentation (e.g., an ability to add interval start/end/received to any chart (interval start=Forecast Valid), an ability to add %complete, an ability to add various conditions codes (e.g., %complete, fast/full, interpolated, not interpolated), and an ability to add various interval time values (e.g., received, start, end)).

In some examples, interactive GUI 900 may include user-selectable options for weather objects. For example, users may be able to apply various criteria to their charts through the boxes shown in user input region 906 of window 902 (FIG. 9A). In some examples, criteria boxes can be hidden/displayed when clicking the screener button in the upper right corner (in window 902). In some examples, if the user has entitlements for weather, and a weather symbol is entered into the top left, in some example a button will appear.

In some examples, configurable objects in a weather window may include location region control (this is a type-ahead search only on weather symbols), model run (e.g., 0z, 6z, 12z, 18z, current model run, current+6 hrs ago, current+12 hrs ago, current+18 hrs ago, current+24 hrs ago), model (e.g., GFS, GEFS, etc.), symbol granularity (daily, synthetic hourly, raw data), climatology overlay (e.g., NWS 30 yr, Trail 30 yr, Trail 15 yr, Highest, 1+ std, Mean, −1 std, Lowest), and studies (e.g., accumulate, show with bias, show only bias, summary stats only).

In some examples, interactive GUI 900 may provide an ability to save a criteria and view modify existing weather window views. In some examples, interactive GUI 900 may be configured to provide a display of data based on criteria that can be filtered through user entry, selection, suggested values, other, to filter results based on users' needs. Example controls available may include checkboxes, radio buttons, ranges and/or manually entered alpha/numerical values. In some examples, users may be permitted to temporarily turn on/off criteria by clicking on, for example, a green light at upper left of criteria box for what if scenarios. In some examples, criteria boxes may be collapsed to offer more screen real estate for a data view. This operation may be performed, for example, by clicking a double arrow on the bottom left of toolbar. Criteria filtered entries may still visible in collapsed mode. In some examples, users may be permitted to still modify criteria filters in collapsed mode by clicking on highlighted text. In some examples, users may save criteria sets for easy recall of filtered sets.

In some examples, interactive GUI 900 may provide options for studying the impact of weather data on market data. For example, interactive GUI 900 may provide climatology overlays. In some examples, statistical ranges for the overlays may take a portion of or all weather series in a chart as input. Examples of the statistical ranges may include a highest high, an upper 1 sigma, a lower 1 sigma, a lowest low and a mean. In some examples, interactive GUI 900 may also provide options for bias and bias adjusted overlays (see, FIG. 9D).

In some examples, interactive GUI 900 may provide user-selectable options for markers enhancement. In some examples, the markers enhancement options may include the ability to create a new customizable marker (e.g., when a user clicks "Customize" from the Markers drop down, they may see a window similar to custom alerts). (See FIGS. 9E and 9F.) In some example, the markets enhancement options may include a way to toggle between all events where the expression is true, and when the first event occurs (cross over). For example, If KORD DIFF-GFS >4 AND KORD Change-GFS >4. In some examples, markers may use an interval start for cross reference. In some examples, markers may contain metadata on hover (e.g., value, expression, time received). In some examples, a window may be provided for managing custom markers (see FIG. 9G).

In some examples, interactive GUI 900 may be configured to provide a user with options to generate a watchlist. One example use case is using the FV day type symbols to pull in GWDD as the data arrives. In some examples, interactive GUI 900 may include additional weather colorization logic for the watchlists.

In some examples, interactive GUI 900 may be configured to generate one or more grids. In some examples, a grid may be the primary location for creating displays of this weather data. In some examples, the grid may include an ability to pull out history for any hourly point, daily point, and any historical field. In some examples, additional grid syntax may be provided to filter on new weather condition codes (e.g., interpolated, %complete, fast vs. full). In some examples, additional grid syntax may be provided to request data by different timeline indices (e.g., start, end, received). In some examples, additional grid coloration logic may be provided for weather (e.g., which may be user defined in weather global parameters). See FIG. 9H for an example of a grid.

Referring next to FIGS. 10A-10K, examples of an interactive GUI 1000 for providing interactive tools for viewing and interacting with integrated weather and market data are described, according to another aspect of the present disclosure. In some examples, interactive GUI 1000 may represent an example of weather impact dashboard 122 (FIG. 1). It should be understood that FIGS. 10A-10K represent a non-limiting example user interface, and that a differing interface configured in accordance with this disclosure may be provided for providing presentation and interaction with integrated weather and market data.

Figure 10A:
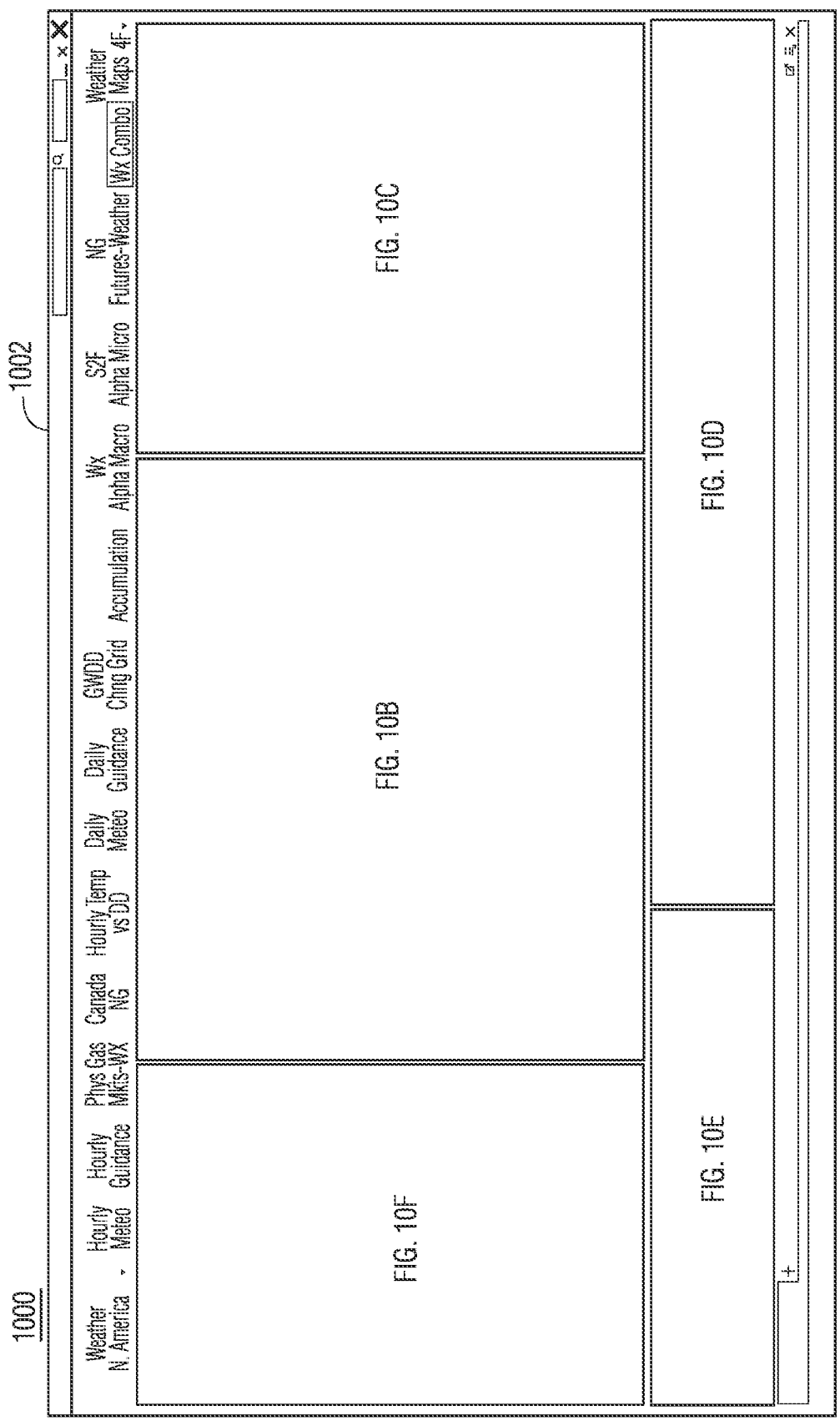

In some examples, interactive GUI 1000 may include weather landing page 1002, as shown in FIG. 10A. Weather landing page 1002 may include various regions 1004-1014 (shown in detail in respective FIGS. 10B-10F) for viewing and interacting with user-customizable weather and market data in real-time (including weather data integrated with market data), and for creating user-customizable watchlists and alerts. In some examples, weather landing page 1002 may include weather alpha region 1004 (shown in FIG. 10B), map region 1006 (shown in FIG. 10C), model status region 1008 (shown in FIG. 10D), watchlist region 1010 (shown in FIG. 10F), drill around region 1012 (shown in FIG. 10F) and alerts region 1014 (shown in FIG. 10E). Weather landing page 1002 may also include one or more additional selectable tabs (e.g., hourly meteorology, hourly guidance, etc.) as shown in FIG. 10A) which may open one or more additional windows, pop-up windows and/or regions in weather landing page 1002.

Figure 10B:
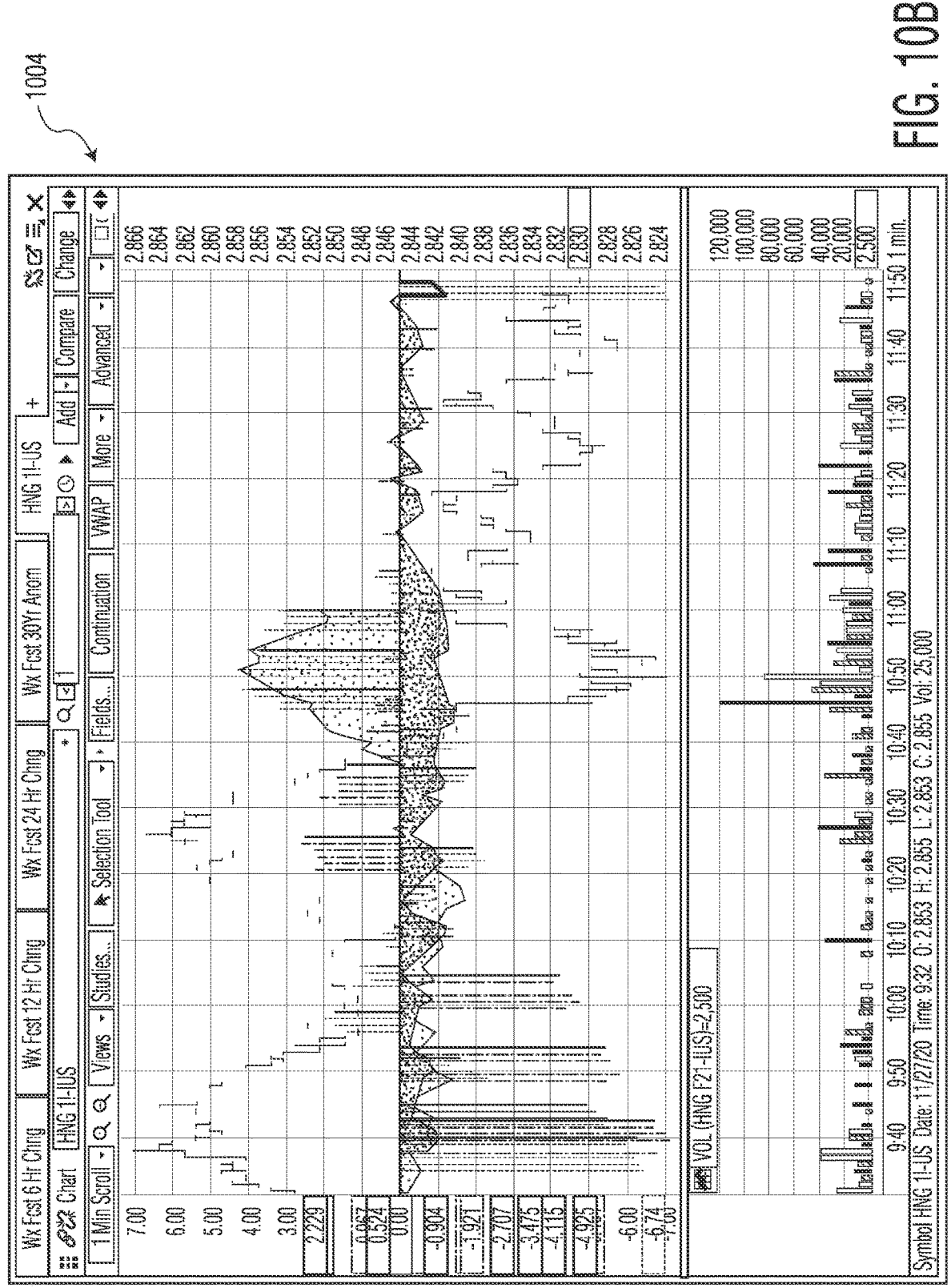

Referring to FIG. 10B, in some examples, weather alpha region 1004 may be configured to present live streaming weather-alpha data for display and user-interaction, including integrated live streaming weather data and live streaming market price data. Weather alpha region 1004 may also be configured be configured to receive user input (e.g., via one or more user buttons, drop down menus, text boxes and the like). In some examples, hovering over a location by a pointing device (e.g., a mouse) may cause weather alpha region 1004 to present additional information. In some examples, weather alpha region 1004 may be configured to present live streaming weather and price in accordance with a specific location (e.g., a specific trading location) in an graphical format. In some examples, the weather data may be expressed in one or more "trader" time periods (e.g., NG weeks, Calendar weeks, etc.) to better match any time periods for transacting in any desired financial instruments.

In general, weather alpha region 1004 may be configured to depict how weather forecasts (e.g., changing weather perceptions and/or anomalistic weather) may move commodity prices, in real-time. Weather alpha region 1004, may be used, together with the weather symbology of the present disclosure to create unique (and user-customizable) financial weather workflows and provide unique transformational integrated weather and price visualizations. Such unique and customizable integrated weather and price visualizations are exclusive to the present disclosure and do not exist in conventional systems. Although it is generally known that weather versus price relationships may exist, challenges exist in quantifying market efficiencies/inefficiencies of market price digesting this information, as well as any frequency of occurrences, a market breadth of weather impacts and a magnitude of the price changes related to changing weather perceptions. Interactive GUI 1000 (including weather alpha region 1004), through the unique integrated and customized presentation of live weather and market data, significantly improves this type of weather/price analysis and provides such data and information in an easily accessible manner for various types of users (e.g., in the financial community), and brings a once analog weather market into a streamlined digital workflow.

In some examples, weather alpha region 1004 may include options for providing weather alpha information according to an alpha micro presentation or an alpha macro presentation. For an alpha micro presentation, weather alpha region 1004 may provide the fastest and most detailed views of changing weather perspectives (e.g. from key government entity forecasts) overlaid with real-time market prices. In some examples, an alpha micro presentation may use preliminary daily values processed in real-time from hourly forecast data, to deliver an early view of forecasted daily temps & GWDD, minutes in advance of alternate weather providers. For an alpha macro presentation, weather alpha region 1004 may provide a comprehensive qualitative review over an entire trading day (or multiple trading days) showing how various weather forecast models (including various model runs) have influenced market prices (for any instrument). In some examples, the alpha macro presentation may provide a quick qualitative view of a directional relationship between weather and price data.

Figure 10C:
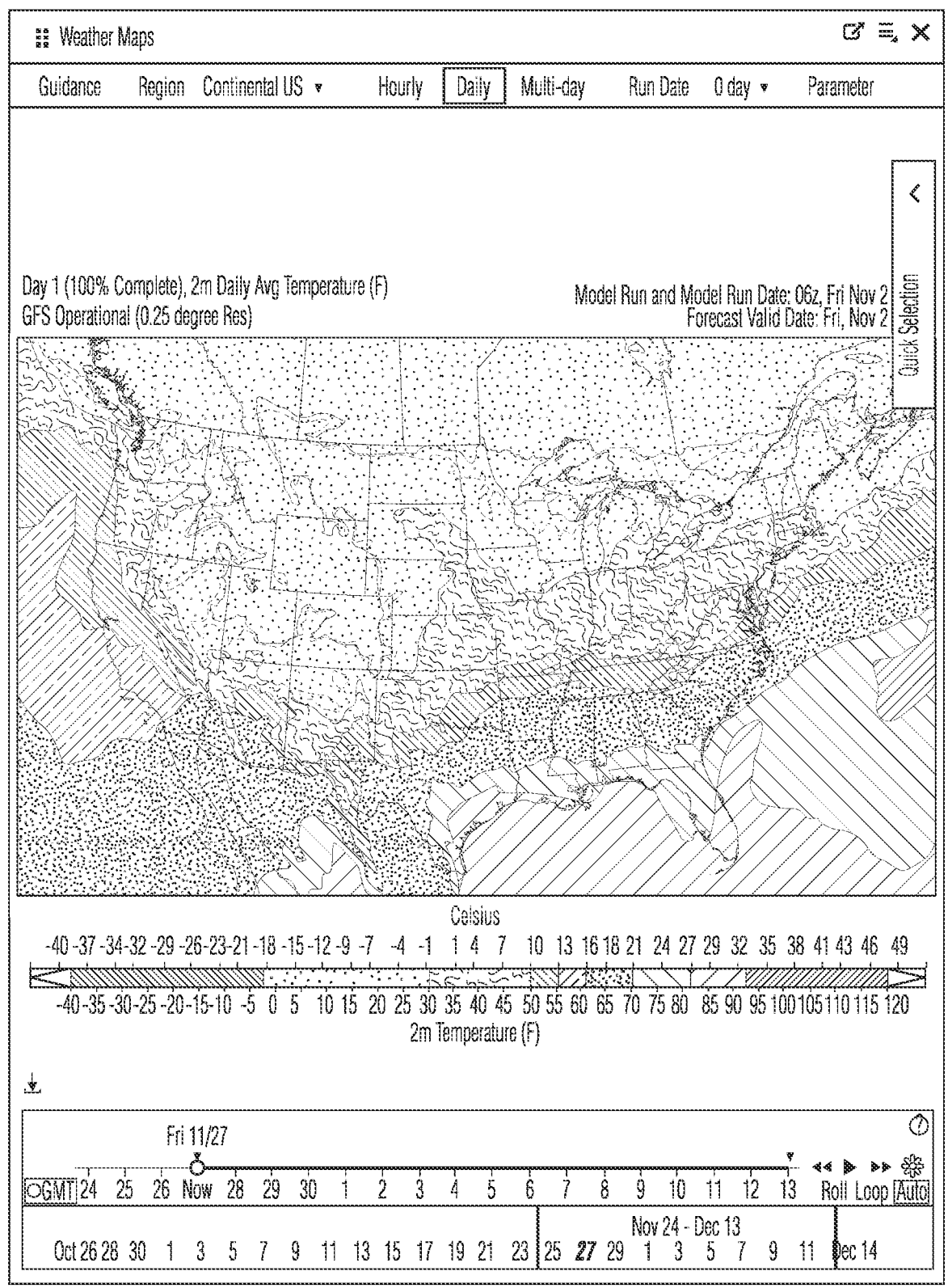

Referring to FIG. 10C, map region 1006 may be configured to present one or more weather maps, including live streaming weather maps. In some examples, the weather map(s) may presented in a graphical format and may include various colorizations (e.g., to indicate weather information such as temperature gradations). In some examples, map region 1006 may provide user input options for selecting and customizing various types of weather maps. The presented weather maps in map region 1006, working in concert with the presented weather and price information in weather alpha region 1004, may allow the user to view big picture impacts of weather, for example, the impacts of weather about to enter into a region of interest of a weather map. In some examples, map region 1006 may deliver weather nap(s) within seconds after government entity weather forecasts are made available into the public domain. In some examples, the weather maps may include maps related to one or more of hourly weather data, daily weather data, multi-day weather data, seasonal/performance data, weather anomaly data and change of weather. The weather maps may include one or more comprehensive maps covering the Earth's sub-surface, surface, upper air, along with liquid/frozen precipitation, renewables, etc.

In some examples, weather map(s) presented in map region 1006 may depend on a particular weather workflow. In a guidance workflow, weather map(s) may be presented in such a manner to easily compare a number of weather forecasts for relative agreement/disagreement (e.g., a forecast risk). In a progression workflow, weather map(s) may be presented in such a manner to hold target data constant to view how all weather forecasts have changed over time for a specific target date. In a performance workflow, weather map(s) may be presented in a manner to help understand weather forecast accuracy (e.g., by exploring warmer/coder bias or mean absolute error).

In some examples, seasonal map(s) may be configured in a manner to easily compare and contrast longer range weather forecasts (e.g., covering a balance-of-the-month, a prompt month, a next two seasons, etc.). In some examples, map region 1006 may include user options for selecting various streaming weather maps (e.g., geographic region, time period (e.g., hourly, daily, multi-day), model run date, weather map type and/or popular maps). In some examples, options for a geographic region may include options for global, regional, tropics and GIS.

Referring to FIG. 10D, in some examples, model status region 1008 may provide real-time (e.g., up-to-date) status information of various weather model downloads. In some examples, model status region 1008 may include user-customizable options for presentation of model status information. In some examples, model hours may be organized into Forecast Valid Days (rows) based upon a selected time zone, and may display percentage (%) complete for the particular model. In general, the model status information presented in model status region 1008 may provide a snapshot of the weather models, to indicate when the weather forecast models have loaded and whether there are any delays and/or missing data. In some examples, the status information may be displayed in various colorizations. For example, for weather models/model runs, a green line may indicate the model is "currently running". A green status value may indicate that a specific model hour has arrived "on-time" as expected (e.g., based upon timestamps from the trailing fourteen days). A yellow status value may indicate that a specific model hour arrived slower than a trailing (for example) 14 day average (e.g., outside 1 standard deviation). A red status value may indicate that the specific model hour should have arrived (e.g. at least five minutes ago) and is still missing.

Referring to FIG. 10F, in some examples, watchlist region 1010 may provide one or more user-input options for creating a user-customizable watchlist of one or more selectable financial instruments that may be linked to a desired (e.g., optimal) weather location. In some examples, drill around region 1012 may include one or more drill-Around boxes associated with one or more financial instruments. The drill-around box(es) may provide one or more options related to one or more desired weather symbologies associated with the particular financial instrument(s).

Figure 10E:
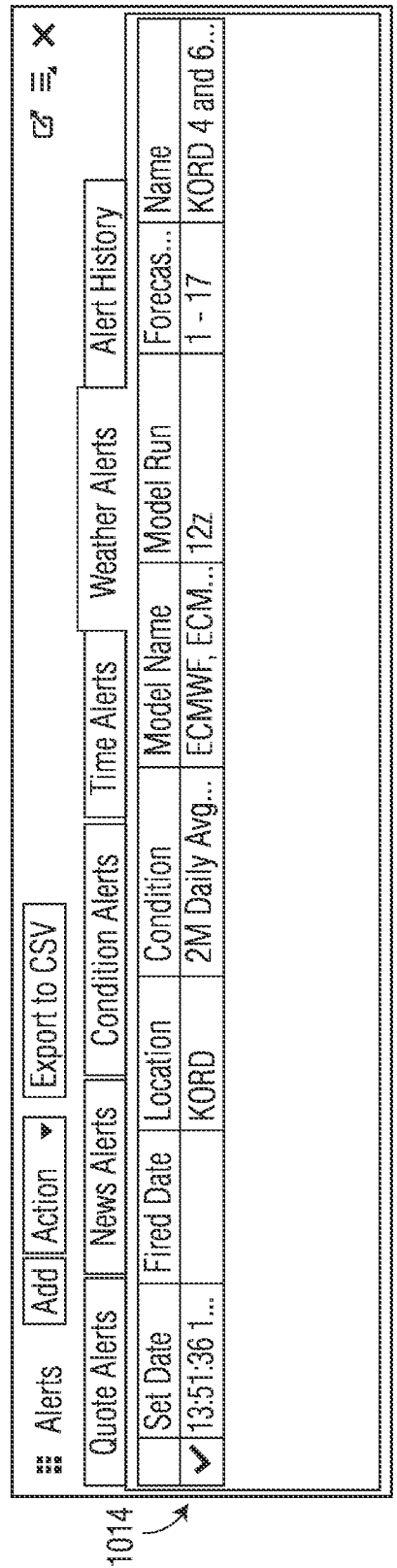

Referring to FIG. 10E, in some examples, alerts region 1014 may include user-input options for creating customizable weather alerts, such as changing weather forecast(s) that may be considered by the particular user to be "significant." In some examples, alerts region 1014 may present active weather alerts, options to allow a user to add new weather alerts and/or options to view a history of one or more (including all) weather alerts which have been triggered. The information provided in alerts region 1014 may allow users to more confidently cover more weather influenced instruments with greater precision and confidence. In some examples, an alert may direct a user to specifically designed workbook when the alert is triggered.

Although exemplary regions are depicted in FIG. 10A, alternate configurations for the regions are envisioned. For example, a graphical user interface may contain more or fewer regions. Additionally, the regions may be reorganized in any manner and display other pertinent information.

FIG. 10G illustrates an example weather alert set up window 1016 (window 1016 herein) of interactive GUI 1000. Window 1016 represents a wizard for creating user-customizable weather alerts. In general, customizable weather alerts may allow a user to monitor streaming weather forecasts, and identify (user-specified) changes expected (by the user) to have a market impact. Window 1016 may include one or more user input regions for adding a new (user-customizable) weather alert (which may be presented in alerts region 1014 (FIG. 10E). In a non-limiting example, window 1016 may include location input region 1018, alert threshold input region 1020, weather model selection region 1022 and notification selection region 1024.

Location input region 1018 may provide a user input region for user input of one or more desired weather location. Alert threshold input region 1020 may include options for user input of one or more thresholds, to create one or more conditions for triggering an alert. In some examples, alert threshold input region 1020 may include options for scanning through historical data to select appropriate alert thresholds and/or a notes region for user input for indicating special notes (e.g., bullish/bearish) linked to an financial instrument. In some examples, weather model selection region 1022 may include user input options for selecting one or more models, one or more model runs, one or more forecast periods, forecast valid days to scan and at least one percentage complete value to utilize for the forecast. In some examples, notification selection region 1024 may include user input options for selecting one or more days a user desires the alert(s) to be active.

FIG. 10H illustrates an example weather perspective selection window 1026 of interactive GUI 1000 when workflow selector region 1028 is selected for a guidance workflow (also referred to herein as guidance window 1026). In general, weather perspective selection window 1026 represents a weather wizard for creating user-customizable charts for various weather perspectives (e.g., weather workflow(s), weather alpha(s)). The Guidance workflow may be configured to present weather data in a manner to help the user to understand forecast risk (e.g., relative agreement & disagreement among forecasts). The guidance workflow may provide another unique perspective to view same day weather forecasts, and how current weather forecasts relate to previous years.

Guidance window 1026 may include one or more user input regions for creating a user-customized guidance workflow. In a non-limiting example, guidance window 1026 may include location input region 1030 for selecting one or more weather locations, time interval input region 1032 for selecting hourly or daily time intervals, weather model selection region 1034 and observations selection region 1036. In some examples, weather model selection region 1034 may include user input for selecting one or more weather forecast models, one or more model runs, any ensemble statistics and one or more climatology options. Observations selection region 1036 may include user input options for observing the data, including real-time observations and historical weather forecasts.

In some examples, workflow selector region 1028 may include a weather workflow option for seasonal analysis (not shown). The seasonal analysis workflow may be configured to present data to easily compare years whose weather pattern(s) maybe similar to a current season, along with various climatologies. In some examples, the seasonal analysis workflow may be configured to overlay long range weather forecasts to gain a unique future perspective, which forecasts may be monitored in real-time as the forecast models are updated.

FIG. 10I illustrates an example weather perspective selection window 1038 of interactive GUI 1000 when workflow selector region 1028 is selected for an accumulation workflow (referred to herein as accumulation window 1038). In general, accumulation window 1038 may include user input regions similar to guidance window 1026, but with different options associated with creating an accumulation workflow. In general, the accumulation workflow may be configured to present data to provide a seasonal perspective to accumulated snow, precipitation, degree days, etc., to help analyze general market trends (e.g., seasons being above/below average).

FIG. 10J illustrates an example weather perspective selection window 1040 of interactive GUI 1000 when workflow selector region 1028 is selected for a progression workflow (referred to herein as progression window 1040). In general, progression window 1040 may include user input regions similar to guidance window 1026, but with different options associated with creating a progression workflow. In general, a progression workflow may be configured to present data to help users understand "convergence" of weather forecasts (e.g. when forecasts begin to agree with each other) as well as run-to-run volatility and mean reversion information.

FIG. 10K illustrates an example weather perspective selection window 1042 of interactive GUI 1000 when workflow selector region 1028 is selected for an alpha micro workflow (referred to herein as alpha micro window 1040). In general, alpha micro window 1042 may include user input regions similar to guidance window 1026, but with different options associated with creating an alpha micro workflow. In some examples, workflow selector region 1028 may also include an alpha macro window for creating a user-customized alpha macro workflow (not shown). In some examples, the alpha macro workflow may provide a quick qualitative view of the directional relationship between weather and price data over multiple model runs and/or multiple days. In general, a weather alpha workflow (e.g., alpha macro, alpha micro) may be configured to present forecasted GWDD from each weather forecast model, as it is released in the public domain vs price data. In some examples, the weather alpha workflow may be configured for such that a user may quickly scan across many different weather models and model runs and identify if the weather may be driving market price(s).

Computer Architecture

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 11 illustrates a functional block diagram of a machine in the example form of computer system 1100 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 112-128 of DID system 102, weather data source(s) 104, market data source(s) 106 and/or user device(s) 108 may be implemented by a specialized machine, particularly programmed to perform certain functions, such as the example machine shown in FIG. 11 (or a combination of two or more of such machines).

Example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Processing device 1102 may include, without being limited to, a microprocessor, a central processing unit, an application-specific integrated circuit (ASIC), a field programmable gate array (FPGA), a digital signal processor (DSP) and/or a network processor. Processing device 1102 may be configured to execute processing logic 1104 for performing the operations described herein. Processing device 1102 may include a special-purpose processing device specially programmed with processing logic 1104 to perform the operations described herein.

Memory 1106 may include, for example, without being limited to, at least one of a read-only memory (ROM), a random access memory (RAM), a flash memory, a dynamic RAM (DRAM) and a static RAM (SRAM), storing computer-readable instructions 1108 executable by processing device 1102. Memory 1106 may include a non-transitory computer readable storage medium storing computer-readable instructions 1108 executable by processing device 1102 for performing the operations described herein. For example, computer-readable instructions 1108 may include operations performed by components 112-128 of DID system 102, including operations shown in FIGS. 3A and 3B. Although one memory device 1106 is illustrated in FIG. 11, in some examples, computer system 1100 may include two or more memory devices (e.g., dynamic memory and static memory).

Computer system 1100 may include communication interface device 1112, for direct communication with other computers (including wired and/or wireless communication) and/or for communication with a network. In some examples, computer system 1100 may include display device 1114 (e.g., a liquid crystal display (LCD), a touch sensitive display, etc.). In some examples, computer system 1100 may include user interface 1116 (e.g., an alphanumeric input device, a cursor control device, etc.).

In some examples, computer system 1100 may include data storage device 1110 storing instructions (e.g., software) for performing any one or more of the functions described herein. Data storage device 1110 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A method, the method comprising:
providing a data distribution system in communication with one or more weather data source systems, one or more market data source systems and at least one user device via at least one network, the data distribution system comprising a processing device and a memory storing computer-readable instructions;
collecting, by the data distribution system, weather data from among the one or more weather data source systems;
generating, by the data distribution system, at least one weather forecast dataset from among the collected weather data;
collecting, by the data distribution system, financial market data from among the one or more market data source systems;
integrating, by the data distribution system, the at least one weather forecast dataset and a portion of the collected financial market data in a manner indicating a correlation between the at least one weather forecast dataset and the portion of the collected financial market data;
generating, by the data distribution system, an interactive graphical user interface (GUI) for display on the at least one user device;
displaying, via the interactive GUI, a presentation package that includes the at least one weather forecast dataset integrated with said portion of the collected financial market data, the presentation package indicating the correlation between the at least one weather forecast dataset and the portion of the collected financial market data; and
updating the presentation package on the interactive GUI concurrent with changes to one or more of the weather data, the financial market data and user input received via the at least one user device.

2. The method of claim 1, the method further comprising:
storing, in at least one database accessible by the data distribution system, a weather symbology comprising one or more symbol elements linked to segments of the collected weather data and one or more pre-defined rules for generating weather symbology instructions having a pre-defined instruction structure.

3. The method of claim 2, the method further comprising:
receiving, via the interactive GUI, input comprising a weather data request from at least one user device, and determining, by the data distribution system, a weather symbology instruction based on at least one requested symbol element indicated in the received weather data request and in accordance with the one or more pre-defined rules.

4. The method of claim 3, wherein the generating of the at least one weather forecast dataset is based, at least in part, on the weather symbology instruction.

5. The method of claim 3, wherein the weather symbology further includes one or more weather variables comprising at least one of predetermined fields and predetermined conditions, the weather symbology instruction further determined based on at least one requested weather variable among the one or more weather variables received in the weather data request.

6. The method of claim 3, wherein the weather symbology instruction is included in the weather data request or the weather data request is converted to the weather symbology instruction.

7. The method of claim 3, the method further comprising:
extracting, by the data distribution system, at least one segment among the segments of the collected weather data corresponding to the at least one requested symbol element in the weather symbology instruction.

8. The method of claim 3, wherein the at least one weather forecast dataset includes at least one weather forecast stitched together from among the collected weather data in accordance with the weather symbology instruction.

9. The method of claim 2, wherein the one or more symbol elements are associated with one or more of at least one weather forecast model, at least one weather observation location and at least one predetermined weather workflow structure.

10. The method of claim 9, wherein the at least one predetermined weather workflow structure includes one or more of at least one weather alpha, a guidance perspective, a progression perspective and an accuracy perspective.

11. The method of claim 9, wherein the interactive GUI includes at least one wizard window for user-customization of the at least one predetermined weather workflow structure.

12. The method of claim 1, wherein the collected weather data includes weather observation data and weather forecast model data.

13. The method of claim 12, wherein the weather observation data includes at least one of Meteorological Aerodrome Report (METAR) data and Climate Forecast System Reanalysis (CFS-R) data.

14. The method of claim 12, wherein the weather forecast model data is associated with at least one of a Global Forecast System (GFS), a GFS ensemble (GFS ENS), a GFS ensemble Extension (GFS ENS EXT), a Climate Forecast System (CFS) ensemble, a European Center for Medium-Range Weather Forecast (ECMWF), a ECMWF ensemble (ECMWF ENS), a ECMWF ensemble Extension (EX-CMWF ENS EXT), a ECMWF Seasonal (SEAS) and a ECMWF Seasonal Extension (SEAS EXT).

15. The method of claim 1, wherein the collected weather data and the collected financial market data includes at least one of streaming data and static data.

16. The method of claim 1, the method further comprising:
displaying, via the interactive GUI, at least one weather map generated from among the collected weather data.

17. The method of claim 1, wherein the generating of the at least one weather forecast dataset further comprises generating the at least one weather forecast dataset as a function of an exchange time associated with the collected financial market data.

18. The method of claim 1, the method further comprising:
exposing, by the data distribution system, the presentation package to at least one application programming interface (API).

19. The method of claim 1, wherein the interactive GUI is configured to operate on at least one of a trading desktop, a mobile application and a spreadsheet application.

20. The method of claim 1, wherein the weather data comprises one or more weather data streams received via at least one data feed, and wherein the financial market data comprises one or more financial market data streams received via the at least one data feed, the method further comprising:
segmenting, by the data distribution system, the received one or more weather data streams based on one or more pre-defined symbol elements to form at least one segmented weather data stream;
extracting by the data distribution system, one or more segments of the at least one segmented weather data stream to form at least one extracted weather stream;
generating, by the data distribution system, a real-time weather dataset from the at least one extracted weather stream;
integrating, by the data distribution system, the real-time weather forecast dataset with the received one or more financial market data streams to form part of an integrated presentation package;
at least one of: exposing, by the data distribution system, the integrated presentation package to at least one application programming interface (API) and displaying the integrated presentation package via the interactive GUI on a display of the at least one user device; and
updating the integrated presentation package concurrent with changes to one or more of the one or more weather data streams and the one or more financial market data streams,
wherein the integrated presentation package further includes an interactive presentation of one or more of at least one weather forecast map, at least one weather alpha region indicating a combination of weather forecast data and financial market data, at least one weather perspective chart associated with a predetermined weather perspective workflow, at least one model status region, at least one watchlist region, at least one alerts region, at least one chart, at least one table, at least one weather grid, at least one analytic value and at least one user input window for customizing the interactive presentation.

21. The method of claim 20, the method further comprising:
creating, by the data distribution system, the real-time weather dataset in accordance with a weather symbology instruction.

22. The method of claim 21, wherein the weather symbology instruction further includes one or more weather variables comprising at least one of predetermined fields and predetermined conditions, the weather symbology instruction being created in accordance with at least one weather variable among the one or more weather variables.

23. The method of claim 20, wherein the integrated presentation package is configured to be launched in at least one of a trading desktop, a mobile application and a spreadsheet application.

24. The method of claim 1, wherein the presentation package further includes an interactive presentation of one or more of at least one weather forecast map, at least one weather alpha region indicating a combination of weather forecast data and the collected financial market data, at least one weather perspective chart associated with a predetermined weather perspective workflow, at least one model status region, at least one watchlist region, at least one alerts region, at least one chart, at least one table, at least one weather grid, at least one analytic value and at least one user input window for customizing the interactive presentation.

* * * * *